United States Patent [19]

Moriya et al.

[11] Patent Number: 5,651,090

[45] Date of Patent: Jul. 22, 1997

[54] CODING METHOD AND CODER FOR CODING INPUT SIGNALS OF PLURAL CHANNELS USING VECTOR QUANTIZATION, AND DECODING METHOD AND DECODER THEREFOR

[75] Inventors: Takehiro Moriya, Tokorozawa; Naoki Iwakami, Yokohama, both of Japan

[73] Assignee: Nippon Telegraph and Telephone Corporation, Tokyo, Japan

[21] Appl. No.: 433,962

[22] Filed: May 4, 1995

[30] Foreign Application Priority Data

May 6, 1994 [JP] Japan ............................. 6-094227
Jul. 27, 1994 [JP] Japan ............................. 6-175335

[51] Int. Cl.[6] ........................................ G10L 3/02
[52] U.S. Cl. .................... 395/2.31; 395/2.12; 395/2.38
[58] Field of Search ........................... 395/2.31, 2.28, 395/2.38, 2.12, 2.16

[56] References Cited

U.S. PATENT DOCUMENTS 4,963,030  10/1990  Makur .
5,475,789  12/1995  Nishiguchi .

FOREIGN PATENT DOCUMENTS 0230001  7/1987  European Pat. Off. .
0364647  4/1990  European Pat. Off. .
0527632  2/1993  European Pat. Off. .
5-248972  9/1993  Japan .

OTHER PUBLICATIONS

Gersho, Allen, et al., "Fully Vector–Quantized Subband Coding with Adaptive Codebook Allocation," Institute of Electrical and Electronics Engineers, International Conference on Acoustics, Speech and Signal Processing (ICASSP), San Diego, Mar. 19–21, 1984, vol. 1, Conf. 1984, pp. 10.7.1–10.7.4.

*Primary Examiner*—Allen R. MacDonald
*Assistant Examiner*—Robert C. Mattson
*Attorney, Agent, or Firm*—Pollock, Vande Sande & Priddy

[57] ABSTRACT

Power normalization parts calculate the average powers of input signals of a plurality of channels for each frame and divide the signals by the calculated average powers to generate normalized signals and, at the same time, generate weights corresponding to the normalization gains. The normalized signals of the plurality of channels are combined in a combining part into predetermined sequences and outputted therefrom as one or more interleaved signal vectors. The combining part combines the weights from the power normalization part into the same sequences of the normalized signal and outputs one or more interleaved weight vectors. In a vector quantization part the signal vectors are vector quantized by the interleaved weight vectors corresponding thereto, respectively, and quantization indexes and normalization indexes are outputted as results of coding.

54 Claims, 20 Drawing Sheets

CODING METHOD AND CODER FOR CODING INPUT SIGNALS OF PLURAL CHANNELS USING VECTOR QUANTIZATION, AND DECODING METHOD AND DECODER THEREFOR

BACKGROUND OF THE INVENTION

The present invention relates to methods for coding and decoding signals of plural channels as a single unit or collectively and a coder and a decoder using such methods, respectively.

The signals of plural channels herein mentioned are such as audio signals of right and left channels, multichannel signals, combinations of acoustic and image signals, plural sequence signals obtained by distributing a single channel signal into a plurality of sequences at regular time intervals, or plural signal sequences obtained by splitting a single channel signal into a plurality of frequency bands; the present invention is applicable to any signals as long as they are signal sequences that may develop power imbalance therebetween.

A known typical method for high efficiency coding of an acoustic signal, such as a speech or musical signal, is a transform coding method according to which frequency domain coefficients (sample values at respective frequencies of the frequency characteristic of the acoustic signal), obtained by a time-to-frequency transformation (a Fourier transform) of the acoustic signal on a frame-by-frame basis, are normalized using the envelope (or spectral envelope) of the frequency characteristics of the acoustic signal and the resulting residual coefficients are vector quantized. Another typical coding method is a CELP (Coded-Excited Linear Prediction Coding) method according to which a speech signal is subjected to an LPC (Linear Predictive Coding) analysis in the time domain and prediction coefficients thus obtained are used as filter coefficients to synthesize speech from an excitation signal by a synthesis filter; the excitation signal is coded with a frequency component vector and a noise component vector so that the distortion of the synthesized speech is minimized.

In FIGS. 1A and 1B there are shown a coder 10 and a decoder 50 employing the conventional transform coding method. In the coder 10, a musical, speech or similar acoustic signal $A_T$, fed as a digital signal sequence from an input terminal 11, is input into an MDCT (Modified Discrete Cosine Transform) part 23, wherein it is transformed frame by frame, for example, at time intervals of 16 to 64 msec or so in the case of a musical signal and about 10 to 20 msec in the case of a speech signal, into frequency domain coefficients $A_F$. At the same time, the acoustic signal $A_T$ from the input terminal 11 is fed into a spectral envelope calculating part 24, wherein the spectral envelope of the input acoustic signal $A_T$ is calculated, then the envelope is quantized in a quantization part 25, from which an envelope index $I_E$ is provided, and in a normalization part 26 the frequency domain coefficients $A_F$ from the MDCT part 23 are divided by the quantized envelope Eq from the quantization part 25 into less fluctuant residual coefficients X. In a scalar quantization part 27 the residual coefficients X are scalar quantized; in this case, bits are allocated to respective frequency bands in accordance with the frequency characteristic of the input acoustic signal $A_T$. This bit allocation takes place in a bit allocation calculating part 28. An allocation index $I_B$ is provided as allocation information B from a coding part 29, and the residual coefficients X are scalar quantized in accordance with the bit allocation in the scalar quantization part 27, from which quantized residual coefficients Xq are provided.

In the decoder 50, as depicted in FIG. 1B, the indexes $I_E$ and $I_B$ input thereinto are decoded in decoding parts 62 and 63 into the spectral envelope Eq and the bit allocation information B, respectively. In a decoding part 64 the quantized residual coefficients Xq are decoded into the residual coefficients X' on the basis of the bit allocation information B. The decoded envelope Eq is provided to a de-normalization part 65, wherein it is de-normalized by being multiplied by the residual coefficients X', whereby the frequency domain coefficients are restored. The frequency domain coefficients, identified by $A_F'$, are provided to an IMDCT (Inverse Modified Discrete Cosine Transformation) part 66, wherein they are restored into an acoustic signal $A_T'$ in the time domain by an inverse modified discrete cosine transformation; the acoustic signal $A_T'$ is fed to an output terminal 51.

FIG. 2A shows the configuration of a speech signal coder utilizing the CELP method which is basically equivalent to the one disclosed, for instance, in U.S. Pat. No. 5,195,137. A speech signal fed to the input terminal 11 is subjected to a linear predictive coding analysis in an LPC analysis part 12 for each frame of a fixed length to obtain linear prediction coefficients α, which are provided as filter coefficients to an LPC synthesis filter 13. In an adaptive codebook 14 is held an excitation vector E determined in the previous frame and provided to the synthesis filter 13. A segment of a length S is cut out of the excitation vector; such a segment is repeatedly connected until a frame length T is reached, by which an adaptive code vector (referred to also as pitch component vector) corresponding to a speech period component is generated. By changing the cutout length S, an adaptive code vector corresponding to a different pitch component can also be obtained. In a random codebook 16 there are recorded a plurality of random code vectors each of the frame length; when an index C is specified, the corresponding random code vector is read out from the random codebook 16. The adaptive code vector and the random code vector read out of the adaptive codebook 14 and the random codebook 16 are provided to multipliers 15 and 17, wherein they are multiplied by weighting factors (gains) $g_0$ and $g_1$ fed from distortion calculating/codebook search part 21. The multiplied outputs are added by an adder 18 and the adder output is applied as an excitation vector E to the synthesis filter 13 to synthesize a speech signal.

At first, the weighting factor $g_1$ is set to zero and a segment cutout length S is selected. The difference between the synthesized speech signal (vector) from the synthesis filter 13 excited by the adaptive code vector corresponding to the selected cutout length S and the input speech signal (vector) is calculated by a subtractor 19. The error vector thus obtained is provided to the distortion calculating/ codebook search part 21 after being assigned a psycho-acoustic weight, as required, in a psycho-acoustic weighting part 20. In the distortion calculating/codebook search part 21, the sum of the squares of elements of the weighted error vector (an intersymbol distance) is calculated and stored as distortion of the synthesized speech signal. By changing the cutout length S over a predetermined range of values while repeating the foregoing processings, the distortion calculating/codebook search part 21 determines the cutout length S of a particular value that minimizes the synthesized speech distortion. The excitation vector E, which is generated by such a manipulation, is fed to the synthesis filter 13 to synthesize a sound, which in turn is removed by the subtractor 19 from the input signal $A_T$ to obtain a noise component. Then, the random code vector that would minimize the distortion of the synthesized noise is selected from the random codebook 16, using the noise component as a target value of the synthesized noise when using the random code vector from the random codebook 16 as the excitation vector E; and the index C is obtained which corresponds to the thus selected random code vector. The thus determined random code vector is used to calculate the weighting factor $g_1$ which would minimize the synthesized speech distortion. The weighting factors $g_0$ and $g_1$ determined in this way are coded as a weighting code $G=(g_0, g_1)$ in a coding part 22. The linear prediction coefficients $\alpha$, the cutout length S, the random code vector index C and the weighting code G, thus determined for each frame of the input speech signal, are outputted from the coder of FIG. 2A as codes corresponding to the input speech.

In a decoder, as shown in FIG. 2B, the linear prediction coefficients $\alpha$ fed thereto are set as filter coefficients in an LPC synthesis filter 52. On the basis of the cutout length S and the index C, an adaptive code vector and a random patter vector are read out from an adaptive codebook 54 and a random codebook 56 in the same fashion as in the coder of FIG. 2A; these vectors are provided to multipliers 55 and 57, wherein they are multiplied by the weighting factors $g_0$ and $g_1$ from a weight recovery or decoding part 53. The multiplied outputs are added by an adder 58; the adder output is applied as an excitation vector to the LPC synthesis filter 52, from which synthesized speech is provided to the output terminal 51.

The coder of FIG. 2A has been described above to produce the adaptive code vectors by repeatedly connecting a segment cut out from the excitation vector of the immediately previous frame stored in the adaptive codebook; however, as disclosed, for example, in M. R. Schroeder and B. S. Atal, "CODE-EXCITED LINEAR PREDICTION (CELP): HIGH-FREQUENCY SPEECH AT VERY LOW BIT RATES," IEEE ICASSP '85, pp. 937–940, the CELP scheme may vector quantize the excitation signal in such a manner as to minimize the synthesized speech distortion through use of a codebook having a number of predetermined waveform vectors as excitation vectors. Hence, it is not always necessary to use a codebook which adaptively vary as described above in respect of FIG. 2A. According to another CELP scheme, the prediction coefficients may be obtained by an LPC analysis of previous synthesized speech instead of calculating them by the LPC analysis of the input speech signal $A_T$ as in FIG. 2A, as disclosed in Juin-Hwey Chen, "HIGH-QUALITY 16 KB/S SPEECH CODING WITH A ONE-WAY DELAY LESS THAN 2 MS," IEEE ICASSP '90, p. 543, for instance. This scheme avoids the necessity of coding and providing the prediction coefficients to the decoding side.

For example, in the case of right and left two-channel audio signals, a quantization error for the respective signal level is $\frac{1}{2}^5$ when the signals of the right and left channels are each fixedly coded into 5-bit information. However, even when the signal power is extremely unbalanced between the right and left channels, the quantization error (distortion) could be reduced down to $\frac{1}{2}^8$ without changing the total amount of information for signal coding, by using the same resolution in common to the right and left channel levels and allocating, for example, eight bits to the channel signal of the larger power and two bits to the channel signal of the smaller power.

In the case of coding stereo signals of right and left channels with a predetermined amount of information by using two sets of such coders of FIG. 2A, it is impossible, by merely coding the signal of each channel with just one half the total amount of information, to reduce the distortion through effective utilization of properties of such stereo signals which sometimes have severe power imbalance between the channels.

A known method of implementing optimum coding to suit power imbalance between two channels is to adaptively allocate bits on the basis of the index read 10 out of the codebook. With this technique, the number of kinds of possible bit allocation is large—this leads to the necessity of using a codebook of a size corresponding to the number of indexes representing the bit allocations. In practice, however, since the codebook size and the amount of processing involved increase in proportion to the bit-number power of 2, the allocation of many bits is impractical. Furthermore, a code error in the gain information would produce ambiguities in the boundaries of indexes, causing severe errors in the reconstruction of all vectors.

Also in the case of using two sets of coders of FIG. 1A to code right and left two-channel stereo signals which have sometimes severe power imbalance therebetween, the reduction of the quantization distortion by coding them with the same amount of information for both channels could be achieved by allocating bits to the right and left channels in the quantization parts 25 and the bit allocation calculating parts 28 of both channels in accordance with the power imbalance between the channels. Since this scalar quantization method requires the generation of a bit allocation code (the index $I_B$) which is closely correlated with the spectral envelope, the efficiency of the coder will be impaired by a detailed bit assignment to many narrow subbands divided from the frequency band. On the other hand, when the frequency band is divided into relatively large subbands, it is impossible to sufficiently respond to imbalance of the frequency characteristic of the input signal; hence, the quantization distortion increases and the efficiency of utilization of input signal redundancy decreases accordingly. When a code error occurs in the bit allocation index $I_B$, the partitioning of a bit train into the quantized residual coefficients Xq becomes confused, resulting in the coded residual coefficients X' being highly distorted on the decoding side. As is the case with the CELP schemes, an error in the decoding of the bit allocation code will seriously distort reconstructed speech.

The above description has been given of the acoustic signals of two channels; also in the multiplex transmission of speech and image signals, it is customary to code each of them with a fixed amount of information. Also in such an instance, when imbalance of information occurs between speech and information, it is desirable to effectively utilize its property. For example, speech has silent durations at very short intervals; substantially no information needs to be transmitted in silent durations. Also in the case where an image undergoes an interframe prediction to compress information, the amount of information to be sent is very small when the image does not move. Where a combined amount of speech and image information is fixed, the overall distortion can be reduced by an adaptive bit allocation between both information. As is the case with the above-described stereo signals, however, there are serious problems in the vector quantization processing and the robustness against code errors.

SUMMARY OF THE INVENTION

It is an object of the present invention to provide a coding method which permits reduction of overall coded signal distortion without involving the bit allocation between plural channels when coding signals of the plural channels with a small amount of information by multiplexing, a decoding method for decoding such coded signals and a coder and a decoder using the coding and the decoding method, respectively.

A coding method according to a first embodiment of the invention comprises the steps of:

(a) calculating the power of the signal in each block of a predetermined length in each of plural channels and determining the weight of the signal on the basis of the calculated power;

(b) normalizing the signal of each block in the respective channel with the power to generate a normalized signal and outputting a gain index representing the normalization gain;

(c) combining the normalized signal of the respective channels in a predetermined sequence to generate at least one sequence of signal vectors;

(d) combining the weights of the signals of the respective channels in the same sequence as that of the normalized signals to generate at least one sequence of weight vectors;

(e) vector quantizing each of the signal vectors with one of the weight vectors and outputting a quantization index representing the quantization vector; and (f) outputting the quantization index and the gain index as part of the results of coding of the signals in the respective channels.

According to first aspect of the first embodiment of the invention, the step (a) comprises the steps of:

(a-1) time-frequency transforming the signal of each block to obtain frequency domain coefficients;

(a-2) calculating the envelope of the frequency domain coefficients; and (a-3) normalizing the frequency domain coefficients with the envelope to obtain residual coefficients and determining the weight of each signal on the basis of the power of the residual coefficients; and the step (b) is a step of normalizing the residual coefficients of each block with the power to obtain normalized residual coefficients as the normalized signals.

The time-to-frequency transformation is, for instance, a modified discrete cosine transformation.

The step (a-2) comprises the steps of: subjecting the signal of the block to a linear prediction coding analysis to obtain prediction coefficients; quantizing the prediction coefficients; and obtaining the envelope by Fourier-transforming the quantized prediction coefficients; and the step (f) is a step of outputting an index representing the quantization of said prediction coefficients, as another part of the coded result of the signal.

According to a second aspect of the first embodiment, a plurality of interleave mappings are prestored in a memory means and the step (c) is a step of, for each of the plurality of mappings, performing the vector quantization in the step (e) and selecting that one of the mappings which minimizes quantization distortion resulting from the vector quantization, and the step (f) is a step of outputting, as another part of signal coded result, a quantization index minimizing the quantization distortion and a code representing the selected mapping.

According to a third aspect of the first embodiment, a signal of a predetermined one of the plurality of channels is an image signal and the coding method according to a fourth aspect of the first embodiment further comprises the steps of:

(g) segmenting an input signal of a single channel into frames of a fixed period and making a check to determine if each frame is stationary or transient;

(h) segmenting the input signal of the transitory frame into blocks of said fixed length and distributing it as the signals of the plurality of channels and performing the steps (a) through (f);

(i) calculating the power of the input signal of the stationary frame and determining the weight of the input signal on the basis of the power;

(j) normalizing the input signal of single channel of the frame with the power to obtain a normalized signal and outputting a gain index representing the normalization gain;

(k) rearranging the normalized signals of the input signals of the respective frames to generate at least one sequence of signal vectors;

(l) rearranging the weights of the input signals of the respective frames in the same sequence as that of the normalized signals to generate at least one sequence of weight vectors;

(m) searching a codebook having a plurality of quantized vectors of different lengths, identical with the signal vectors generated in the step (k), in correspondence with their quantization indexes, and selecting, for each normalized signal, the quantized vectors which minimizes the weighted distance by the weight vector and determining the corresponding quantization index; and (n) outputting a gain index representing the normalization gain by the power in the step (i) and the quantization index determined in the step (m) as part of the result of coding of the input signal in the stationary frame.

According to the fourth aspect of the first embodiment, the step (i) comprises, for instance, the steps of:

(i-1) obtaining frequency domain coefficients by time-frequency transforming the input signal in the stationary frame;

(i-2) calculating the spectral envelope of the input signal in the frame;

(i-3) normalizing the frequency domain coefficients with the spectral envelope to obtain residual coefficients;

(i-4) predicting the envelope of the residual coefficients on the basis of residual coefficients of a previous frame; and (i-5) normalizing the residual coefficients with the predicted envelope to generate fine structure coefficients;

the step (j) comprises a step of calculating the average power of the fine structure coefficients and outputting as the normalized signals the normalized fine structure coefficients obtained by normalizing the fine structure coefficients with the average power; and the step (f) is a step of outputting, as another part of the result of coding of the signal, a gain index representing the average power and an envelope index representing the spectral envelope.

A decoding method according to a second embodiment is a method for decoding signals coded by collectively vector quantizing signals of a plurality of channels through use of one combined codebook. The decoding method comprises the steps of:

(a) reading out of the combined codebook at least one combined vector corresponding to at least one vector quantization index inputted for each block of a fixed length;

(b) rearranging elements of the said at least one combined vector obtained in step (a) in a predetermined sequence to generate normalized signals of the plurality of channels; and (c) decoding normalization gains from gain indexes each inputted for each fixed block, de-normalizing the corresponding normalized signals of the plurality of channels with the normalization gains and outputting them as reconstructed signals of the plurality of channels.

According to a first aspect of the second embodiment, the step (c) comprises the steps of:

(d) decoding spectral envelopes from envelope indexes respectively inputted in the plurality of channels for each block and multiplying the de-normalized signals by the spectral envelopes to obtain frequency domain coefficients; and (e) frequency-time transforming the frequency domain coefficients of the respective channels, for each block, into time domain signals and outputting them as the reconstructed signals in the plurality of channels.

According to a second aspect of the second embodiment, the step (b) is a step of selecting one of a plurality of predetermined interleave mappings, for example, on the basis of an index representing an interleave mapping inputted for each block and performing the above-said interleave in accordance with the selected interleave mapping.

According to a second aspect of the third embodiment, an inputted state code is decoded to make a check to see if the input-signal-segmented frame corresponding to the state code is stationary or transient; in the case of the transient frame, the above-mentioned steps (a) through (c) are performed for the frame, then reconstructed signals in the plurality of channels in each block are arranged in a certain time sequence to obtain a signal of a frame whose length is an integral multiple of the block. In the case of the stationary frame, the following steps (d) through (f) are performed for the frame:

(d) read out of the combined codebook at least one combined vector corresponding to at least one vector quantization index inputted for the above-said frame;

(e) rearrange elements of the said at least one combined vector obtained in step (d), as predetermined, to generate a normalized signal of a single channel; and (f) decode a normalized signal from a gain index inputted for the frame, de-normalize the normalized signal of the single channel with the normalization gain and output it as a reconstructed signal.

According to a fourth aspect of the second embodiment, in a predetermined one of the plurality of channels, the step (c) is a step of obtaining, for example, the de-normalized signal as a difference signal and adding a reconstructed signal of the previous block to the difference signal of the current block to obtain a reconstructed signal of the current block.

A coder of a third embodiment of the invention is a coder which codes signals of a plurality of channels collectively, and it comprises:

power normalization means provided for each of the plurality of channels, which calculates, for each block of a predetermined length, the power of a signal of that block, determines the weight of the signal on the basis of the power, normalizes the signal of the block with the power to generate a normalized signal and outputs a gain index representing the normalization gain;

signal interleave means which combines, in a predetermined sequence, the normalized signals from the power normalization means in the plurality of channels to generate at least one signal vector sequence;

weight interleave means which combines the weights from the power normalization means in the plurality of channels, in the same sequence as that of the normalized signals, to thereby generate at least one weight vector sequence; and quantization means which vector quantizes the signal vector with the weight vector and outputs the quantization index representing the vector quantization;

wherein the quantization index and the gain index are outputted as part of the result of coding of the signals in the plurality of channels.

According to a first aspect of the third embodiment, the coder further comprises: residual envelope calculating means which obtains frequency domain coefficients by time-frequency transforming the signal of the above-said block in each channel, calculates the envelope of the frequency domain coefficients and normalizes the frequency domain coefficients with the envelope to obtain residual coefficients; and weight calculation means which determines the weight on the basis of the power of the normalized residual coefficients. The power normalization means is a means which normalizes the residual coefficients of the above-said block with the above-said power to obtain the normalized residual coefficients as the above-mentioned normalized signal.

According to a second aspect of the third embodiment, the coder further comprises: memory means which has stored therein a plurality of different interleave mappings; the plural sets of signal interleave means, the weight interleave means and the vector quantization means provided in a plurality of sets corresponding to the plurality of different interleave mappings; comparison means which compares quantization distortions resulting from the vector quantization, by the plurality of sets of means, of the normalized signals from the power normalization means in the respective channels and outputs a code representing the interleave mapping corresponding to the above-mentioned set of means which provided the minimum quantization distortion; and select means which responds to the code from the comparison means to selects and output the corresponding one of the quantization indexes from the plurality of sets of means. The code representing the selected interleave mapping is provided as part of the signal coded results.

According to a third aspect of the third embodiment, the coder further comprises prediction means which performs prediction processing for the signal of each block in a predetermined one of the channels to generate a difference signal, and the normalization means is a means which calculates the power of the difference signal, determines the above-mentioned weight on the basis of the power and normalizes the difference signal with the power into the above-said normalized signal.

According to a fourth aspect of the third embodiment, the coder further comprises:

state decision means which, for each frame of a fixed period, decides whether the frame of an input signal in a single channel is stationary or transient;

frame segmentation means which segments the input signal of the transitory frame, for each fixed-length block mentioned above, into signals of the plurality of channels;

stationary frame power normalization means which calculates the power of the input signal of the stationary frame, determines the weight of the input signal of the stationary frame, normalizes the input signal of the stationary frame with the power to obtain a stationary frame normalized signal and outputs a stationary frame gain index representing the normalization gain;

stationary frame signal interleave means which rearranges the stationary frame normalized signal of the input signal of the stationary frame to generate at least one stationary frame signal vector sequence;

stationary frame weight interleave means which rearranges the weight of the input signal of the stationary frame in the same sequence as that of the normalized signal to generate at least one stationary frame weight vector sequence; and stationary frame vector quantization means which has a code book having stored therein a plurality of quantization vectors of different lengths, identical with the stationary frame signal vectors, in correspondence with their respective quantization indexes, and which searches the codebook, and selects, for the stationary frame normalized signal, the quantization vector that minimizes a weighted distance based on the stationary frame weight vector and determines the corresponding stationary frame quantization index. The stationary frame gain index and the stationary frame quantization index are outputted as part of the result of coding of the input signal in the stationary frame.

According to a third aspect of the fifth embodiment, the coder comprises:

stationary frame residual envelope calculating means which obtains frequency domain coefficients by time-frequency transforming the input signal in the stationary frame, calculates the spectral envelope of the input signal in the stationary frame and normalizes the frequency domain coefficients with the spectral envelope to obtain residual coefficients;

residual envelope prediction means which predicts the envelope of the residual coefficients from those of a previous frame;

residual envelope normalization means which normalizes the residual coefficients with the predicted envelope to generate fine structure coefficients; and stationary frame power normalization means which calculates the average power of the fine structure coefficients and outputs, as the stationary frame normalized signal, normalized fine structure coefficients obtained by normalizing the fine structure coefficients with the average power;

wherein a stationary frame gain index representing the average power of the fine structure coefficients and an envelope index representing the stationary frame spectral envelope are outputted as another part of the result of coding of the input signal.

A decoder of a fourth embodiment of the invention is a decoder which decodes signals coded by collectively vector quantizing signals of a plurality of channels by using one combined codebook. The decoder comprises:

a combined codebook which has written therein combined vectors corresponding to respective quantization indexes and from which is read out at least one combined vector corresponding to at least one quantization index inputted for each block of a fixed length;

inverse interleave means which rearranges elements of the combined vector from the combined codebook in a predetermined sequence and outputs them as normalized signals of the respective channels; and de-normalization means which decodes normalization gains from gain indexes inputted for each block of a fixed length, de-normalizes the normalized signals of the respective channels with the corresponding normalization gains and outputs the de-normalized signals as reconstructed signals in the respective channels.

According to a first aspect of the fourth embodiment, the decoder further comprises:

frequency domain coefficients reproducing means provided in each channel, which reproduces a spectral envelope from an envelope index inputted into the channel for each block mentioned above and multiplies the de-normalized signal by the spectral envelope to obtain frequency domain coefficients; and frequency-time transformation means provided in each channel, which transforms the frequency domain coefficients in the channel into a time domain signal through frequency-time transformation for said each block and outputs the time domain signals as the reconstructed signal of the channel.

According to a second aspect of the fourth embodiment, the decoder further comprises memory means which has stored therein a plurality of different interleave mappings, and the inverse interleaving means selects one of the interleave mappings stored in the memory means on the basis of an index representing an interleave mapping inputted for said each block and performs the above-mentioned interleaving in accordance with the selected interleave mapping.

According to a third aspect of the fourth embodiment, the decoder further comprises: frame combining means which decodes an inputted state code to determines if the frame concerned is of a steady-state or transient and, for the transient frame, performs the signal reconstruction by the de-normalization means in the respective channels and combines, in each block, the reconstructed signals in a certain time sequence into a signal of a frame whose length is an integral multiple of the block length;

a stationary frame combined codebook which has written therein combined vectors for the stationary frame use in correspondence with stationary frame indexes;

stationary frame inverse interleave means which interleaves elements of at least one combined vector, read out of the combined codebook in correspondence with at least one inputted quantization index, into a predetermined sequence to generate a normalized signal of a single channel; and stationary frame de-normalization means which de-normalizes the normalized signal of the single channel with a normalization gain decoded from a gain index inputted for the stationary frame and outputs the de-normalized signal as a reconstructed signal of the single channel.

The decoder according to a third aspect of the fourth embodiment further comprises:

multiplying means provided in each channel, which multiplies the de-normalized signal by a spectral envelope decoded from an inputted envelope index to generate frequency domain coefficients; and frequency-time transformation means provided in each channel, which frequency-time transforms the frequency domain coefficients into a time domain signal and outputs it as the reconstructed signal of the channel.

The decoder according to the third aspect of the fourth embodiment further comprises:

residual coefficient reproducing means which derives frequency domain coefficients from the de-normalized signal by using a spectral envelope decoded from an envelope index inputted in the stationary frame; and frequency-time transformation means which frequency-time transforms the frequency domain coefficients into a time domain signal and outputs it as the reconstructed signal.

According to a fourth aspect of the fourth embodiment, the normalized signal de-normalized in a predetermined one of the plural channels is a difference signal, and the decoder further comprises prediction means which adds the reconstructed block to the difference signal of the current block to obtain the reconstructed signal of the current block.

According to the present invention, signal components of plural channels are weighted-vector quantized, by a combined codebook, as a signal vector produced by combining them together with weights corresponding to their power components; hence, the invention permits reduction of the quantization distortion through utilization of imbalance of power between signals of the channels without involving the adaptive bit allocation. Besides, by splitting a signal of one channel into a plurality of subchannels, power imbalance in the direction of the time axis is also effectively utilized to reduce the quantization distortion—this permits implementation of high efficiency coding.

DESCRIPTION OF THE PREFERRED EMBODIMENTS

Figure 3A:
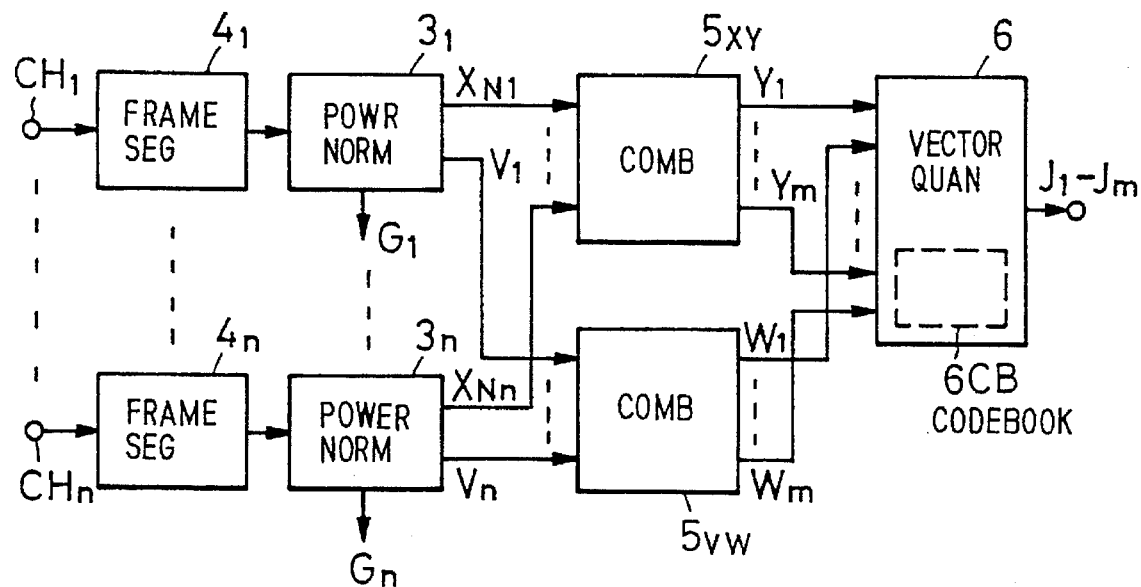
FIG. 3A is a block diagram for explaining the coder on the principles of the present invention.

In FIG. 3A there are depicted functional blocks of a coder for explaining the principles of the present invention. Signals (assumed to be digital signals) of n (an integer equal to greater than 2) channels are input into respective channels $CH_1$ to $CH_n$ and are coded. The signals of the respective channels are segmented in signal segmentation parts $4_1$ to $4_n$ into frames of a fixed length, thereafter being applied to power normalization parts $3_1$ to $3_n$. The power normalization parts $3_1$ to $3_n$ calculate average powers of desired components of the signals in the respective frames and normalize (divide) the signals by the average powers to generate normalized signals $X_{N1}$ to $X_{Nn}$, respectively. At the same time, the power normalization parts $3_1$ to $3_n$ output normalization gains $G_1$ to $G_n$ (corresponding to the average powers, respectively) and weights $V_1$ to $V_n$ corresponding to the average powers.

The processing in the power normalization parts $3_1$ to $3_n$ may be processing in the time domain or in the frequency domain. The average powers $G_1$ to $G_n$ are each determined to have a value in one of the respective frames. For instance, when the input signal is an acoustic signal, it is customary in the art to take the psycho-acoustic weight into account; hence, let it be assumed that the weights $V_1$ to $V_n$ each represent a vector composed of a plurality of elements. Alternatively, as described later, when the power normalization parts $3_1$ to $3_n$ perform processing in the frequency domain, power imbalance in the frequency domain can also be utilized for reduction of the quantization distortion by contributing the spectral envelope of each signal to the weight; also in such an instance, the weights $V_1$ to $V_n$ are handled as vectors each composed of a plurality of elements. In the present invention, however, the weights $V_1$ to $V_n$ may also be values which are dependent solely on the gains $G_1$ to $G_n$; in this instance, the elements in the respective vectors $V_1$ to $V_n$ have equal values.

The normalized signals $X_{N1}$ to $X_{Nn}$ from the power normalization parts $3_1$ to $3_n$ are fed to an interleave part 5, wherein they are combined into predetermined sequences and from which they are outputted as a predetermined number m (an integer equal to or greater than 1) of signal vectors $Y_1$ to $Y_m$. In this case, the normalized signals are combined or merged so that the signal vectors $Y_1$ to $Y_m$ each contain elements corresponding to input signals of two or more different channels. The interleave part 5 also combines the weights $V_1$ to $V_n$ from the power normalization parts $3_1$ to $3_n$ in the same sequences as those of the normalized signals in the interleave part 5 and outputs m weight vectors $W_1$ to $W_m$. Thus, the correspondence between the elements of the weight vectors $W_1$ to $W_m$ and the elements of the signals vectors $Y_1$ to $Y_m$ are maintained.

A vector quantization part 6 has a built-in codebook 6CB, wherein quantization vectors of the same lengths as those of the signals vectors are prestored corresponding to their indexes. In the conventional vector quantization one codebook is used for the vector quantization of a single channel signal, but in the present invention each quantization vector in the single codebook 6CB is used to quantize the signal vectors $Y_1$ to $Y_m$ containing elements corresponding to the signals of the plurality of different channels; hence, the quantization vector will hereinafter be referred to as a combined vector and the codebook 6CB with many combined vectors stored therein will also hereinafter be referred to as a combined codebook.

The vector quantization part 6 searches the combined codebook 6CB for the signal vectors $Y_1$ to $Y_m$ and, based on the weight vectors $W_1$ to $W_m$ corresponding to the quantization vectors, it determines quantization vectors that minimize the weighted distance measure (that is, reduces the quantization distortion) and outputs corresponding quantization indexes $J_1$ to $J_m$. With such a vector quantization scheme used in the vector quantization part 6, the contribution of elements corresponding to the channel of the larger power to the value of quantization distortion is large in the quantization of the signal vectors; hence, by selecting the combined vector that minimizes the quantization distortion, the signal of the channel of the larger power is automatically coded with less quantization distortion.

Figure 3B:
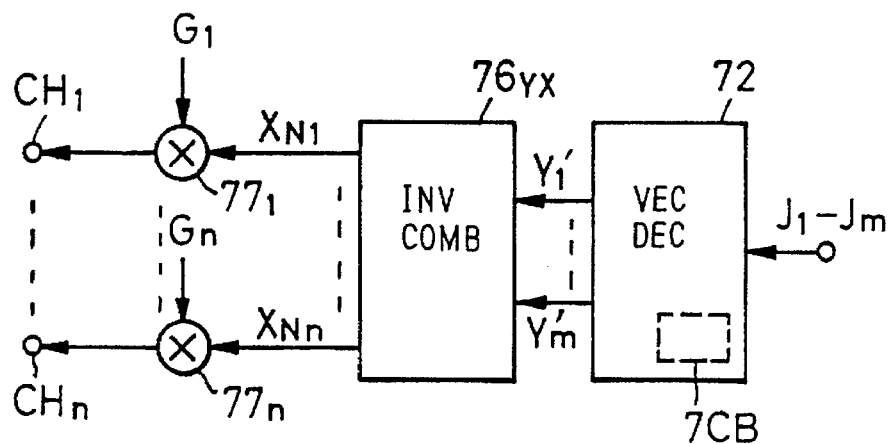
FIG. 3B is a block diagram for explaining the decoder on the principles of the present invention.

The coder of FIG. 3A outputs the codes $G_1$ to $G_n$ representing gains, and the quantization indexes $J_1$ to $J_m$ as the results of frame-wise coding of the signals of the channels $CH_1$ to $CH_n$. The codes $G_1$ to $G_n$ and the indexes $J_1$ to $J_m$ are provided to a decoder of FIG. 3B, which performs decoding as described below. The quantization indexes $J_1$ to $J_m$ are provided to a vector decoding part 72. The vector decoding part 72 has a combined codebook 7CB identical with that 6CB provided in the vector quantization part 6 of the coder of FIG. 3A. Combined vectors $Y_1'$ to $Y_m'$ corresponding to the quantization indexes $J_1$ to $J_m$ are read out of the codebook 7CB and provided to an inverse interleave part 76. The inverse interleave part 76 arranges all elements of the combined vectors $Y_1'$ to $Y_m'$ in sequences reverse from those in the interleave part 5 of the coder of FIG. 3A, by which n sequences of normalized signals $X_1$ to $X_n$ are obtained. These normalized signals $X_1$ to $X_n$ are provided to de-normalization parts (multipliers) $77_1$ to $77_n$, wherein they are multiplied by the gains $G_1$ to $G_n$ to restore the signals of the channels $CH_1$ to $CH_n$.

Figure 4A:
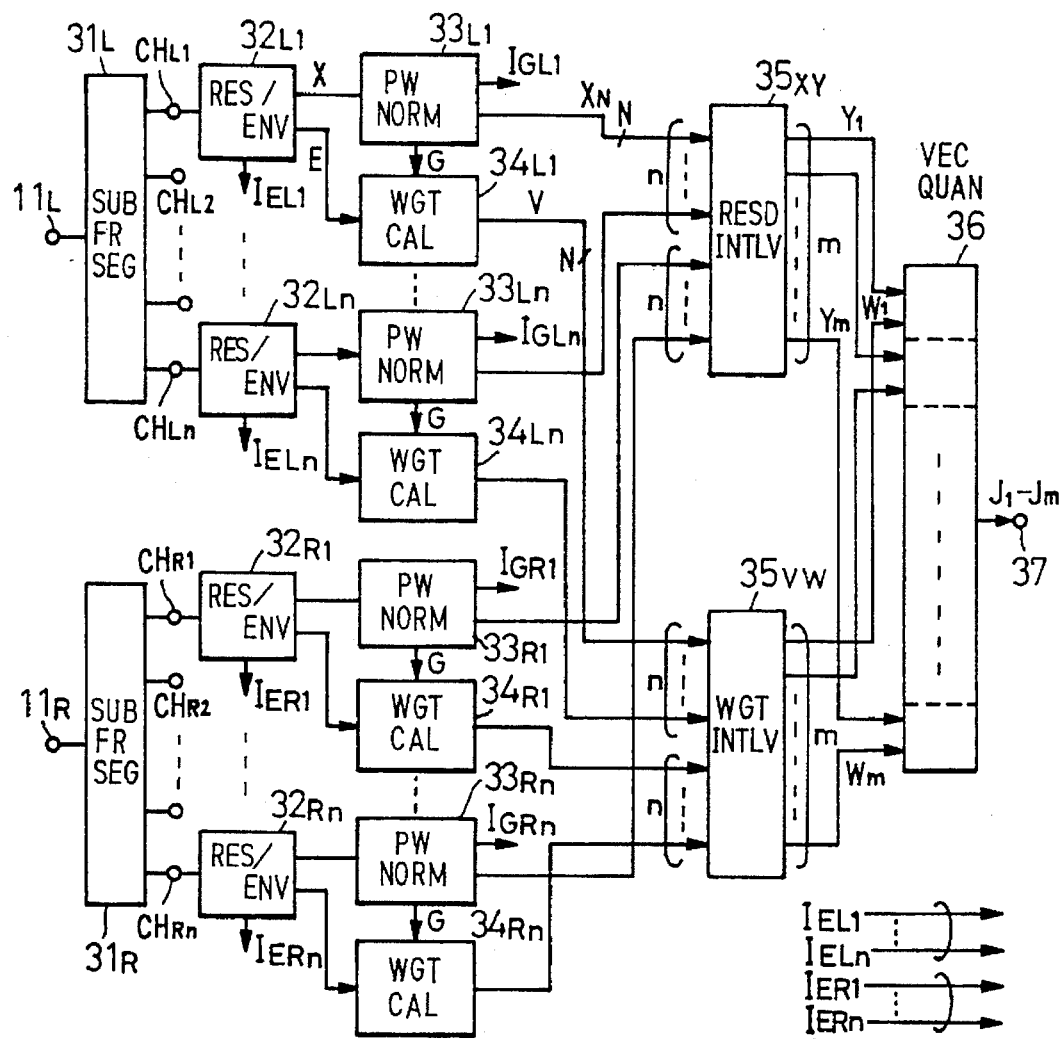
FIG. 4A is a block diagram illustrating an example of the coder of the present invention applied to the transform coding scheme.

FIG. 4A illustrates in block form a coder which codes acoustic signals of right and left channels in the frequency domain as is the case with FIG. 3A; this coder reduces distortion by coding through utilization of power imbalance in the time-axis direction and power imbalance in the frequency-axis direction as well as power imbalance between the right and left channels. In the case of the power imbalance in the time-axis direction, frames of input acoustic signals of the right and left channels are each segmented into n (an integer equal to or greater than 2) subframes, which are distributed to n subchannels to obtain n signal sequences (subsequences); the power imbalance in the time-axis direction is used as power imbalance among them. As the power imbalance in the frequency-axis direction, power imbalance among frequency-domain residual coefficients of acoustic signals of the n subchannels. The coder of FIG. 4A will hereinafter be described in detail.

The coder of FIG. 4A comprises: frame segmentation parts $31_L$ and $31_R$ which segment respective frames of digital input acoustic signals fed to left and right channel terminals $11_L$ and $11_R$ and distribute the n subframes to n subchannels; residual/envelope calculation parts $31_{L1}$ to $31_{Ln}$ and $31_{R1}$ to $31_{Rn}$ which calculate frequency-domain residual coefficients and spectral envelopes in the respective subframes of the acoustic signals in the respective subchannels; power normalization parts $33_{L1}$ to $33_{Ln}$ and $33_{R1}$ to $33_{Rn}$ which normalize the powers of the residual coefficients in the respective subchannels; weight calculation parts $34_{L1}$ to $34_{Ln}$ and $34_{R1}$ to $34_{Rn}$ which multiply the spectral envelopes in the respective subchannels by corresponding power normalization gains and output, as weighting factors V (vectors), the multiplication results after further multiplying them by psycho-acoustic weighting factors as required; a residual interleave part $35_{XY}$ which rearranges the residual coefficients of the left and right channels in predetermined different sequences; a weight interleave part $35_{VW}$ which rearranges the weighting factors of the left and right channels in the same sequences as those of the residual coefficients; and a vector quantization part 36 which performs weighted-vector quantization with the rearranged residual coefficients and the rearranged weighting factors corresponding to them.

In general, one possible method that can be used to decrease the amount of information (the number of bits) necessary for coding the input acoustic signal in the frequency domain is to obtain residual coefficients by flattening the envelope of the frequency characteristics (the spectrum) of the input acoustic signal and code the spectral envelope and the residual coefficients. For example, the two methods mentioned below are considered to be usable for obtaining the residual coefficients.

(a) Transform input acoustic signal into frequency domain coefficients and, at the same time, calculate the spectral envelope of the input signal, then normalize the frequency domain coefficients by the spectral envelope to obtain the residual coefficients.

(b) Obtain a residual signal by processing the input signal in the time domain by an inverse filter which is controlled by linear prediction coefficients and transform the residual signal to frequency domain coefficients to obtain the residual coefficients.

The following three methods can be used to obtain the spectral envelope of the input signal in the method (a).

(c) Transform the linear prediction coefficients of the input signal by a time-to-frequency transformation (Fourier transform, for instance) through utilization of the above fact.

(d) Split into a plurality of subbands the frequency domain coefficients obtained by the time-to-frequency transformation of the input signal and obtain scaling factors of the respective subbands (average powers of the subbands, for example) as the spectral envelope.

(e) Calculate the linear prediction coefficients of a time domain signal produced by inverse transformation of the absolute values of frequency domain coefficients obtained by time-frequency transforming the input signal and transform the linear prediction coefficients by the Fourier transform scheme.

The methods (c) and (e) are based on the facts described next. The linear prediction coefficients represent the frequency characteristics of the input signal; hence, the spectral envelope of the linear prediction coefficients corresponds to the spectral envelope of the input signal. To be precise, the spectral amplitude, which is obtained by the Fourier transformation of the linear prediction coefficients, is the reciprocal of the spectral envelope of the input signal.

Figure 4B:
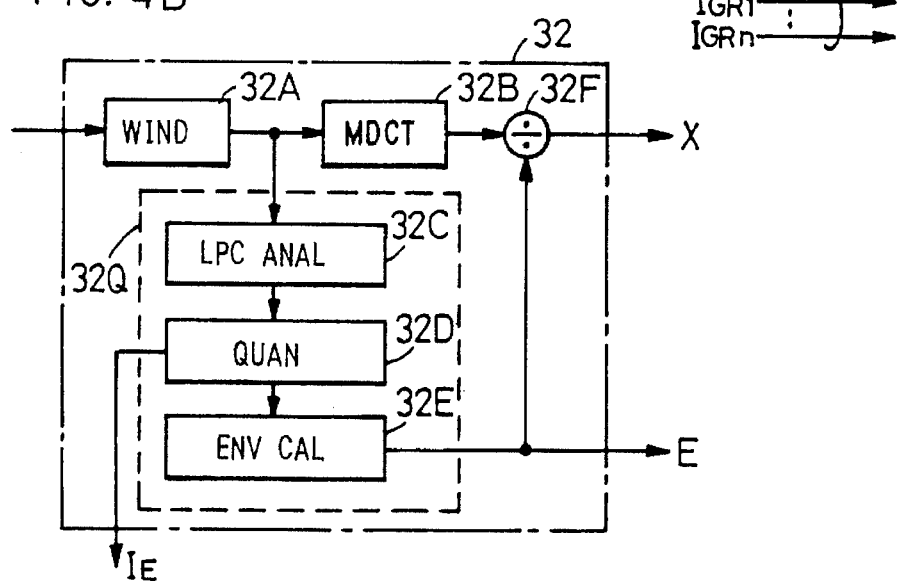
FIG. 4B is a block diagram illustrating an example of the configuration of a residual/envelope calculation part in FIG. 4A.

In the FIG. 4A embodiment of the present invention, any combination of the methods (a) and (c) or (d), or (e) can be used for the acoustic signal subsequences of the respective subframes each composed of 2N samples. In FIG. 4B there is shown an example of the residual/envelope calculation part 32 (any one of the parts $32_{L1}$ to $32_{Ln}$ and $32_{R1}$ to $32_{Rn}$) which is used when the methods (a) and (c) are employed in combination. As depicted in FIG. 4B, the residual/envelope calculation part 32 comprises: a windowing part 32A which multiplies the subframe acoustic signal by a desired window function; an MDCT part 32B which transforms the output from the windowing part 32A to frequency domain coefficients by the MDCT transformation; an LPC analysis part 32C which obtains linear prediction coefficients by making an LPC analysis of the output from the windowing part 32A; a quantization part 32D which quantizes the linear prediction coefficients and outputs the quantized linear prediction coefficients and the corresponding quantization index (which corresponds to the spectral envelope, and hence will hereinafter be referred to as an envelope index) $I_E$; an envelope calculation part 32E which calculates the spectral envelope F from the quantized prediction coefficients; and a normalization part 32F which normalizes (divides) the frequency domain coefficients from the MDCT part 32B by the spectral envelope and outputs residual coefficients X.

Figure 5:
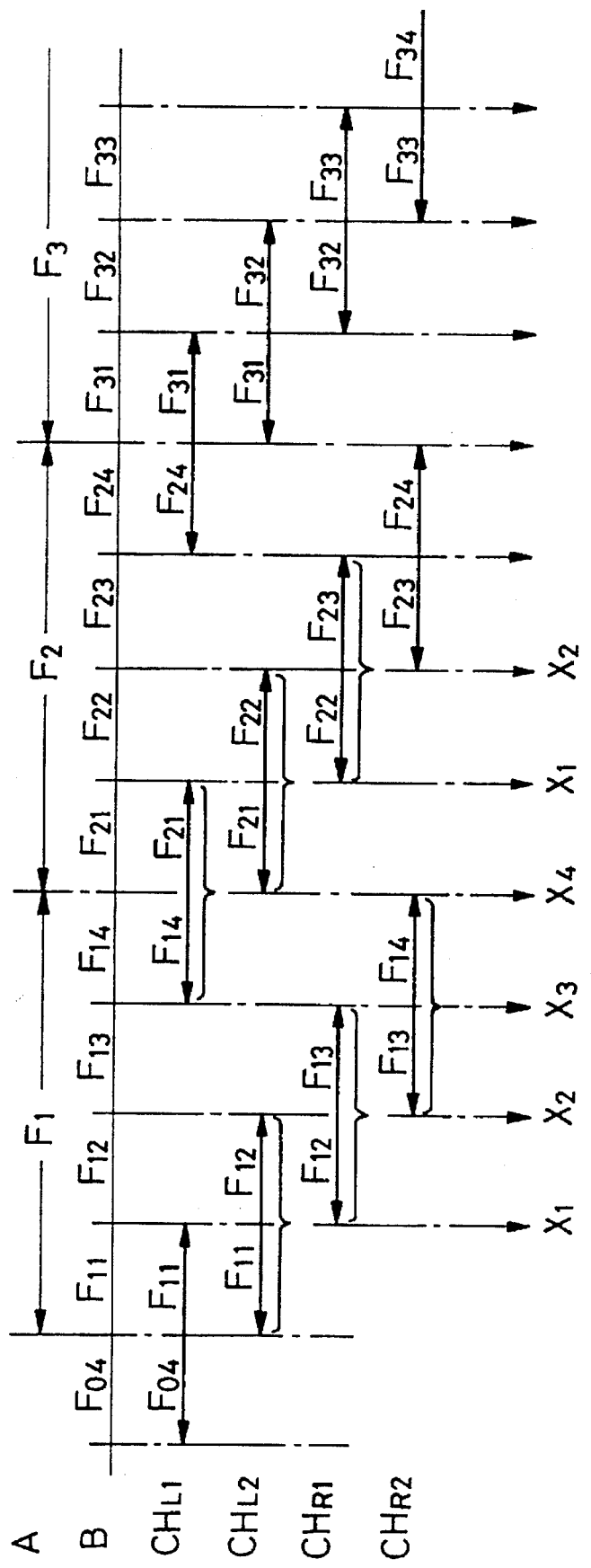
FIG. 5 is a timing chart showing frame-wise segmentation of an input signal into subframes and a frame for LOT (Lapped Orthogonal Transform) processing in each subchannel.

The frame segmentation part $31_{L1}$ in FIG. 4A generates, every N samples of each frame (for example, 16 to 64 ms in the case of a musical signal and 10 to 20 ms in the case of a speech signal) of the left-channel acoustic signal fed to the left-channel input terminal $31_{L1}$, 2N-sample subsequences each composed of the N samples and the immediately preceding N samples as frames for LOT (Lapped Orthogonal Transform) processing use; the subchannels are provided to the residual/envelope calculation parts $32_{L1}$ to $32_{Ln}$ in a cyclic order. That is, as shown in FIG. 5 where n=4, when frames $F_1, F_2, \ldots$ (Row A) of the left-channel acoustic signal are sequentially input, each frame $F_1$, for instance, is segmented into four subframes $F_{11}, F_{12}, F_{13}$ and $F_{14}$ (Row B) each composed of N samples; then, 2N-sample subsequences $\{F_{04}, F_{11}\}, \{F_{11}, F_{12}\}, \{F_{12}, F_{13}\}$ and $\{F_{12}, F_{14}\}$, each composed of one subframe and the immediately preceding subframe, are provided as LOT processing frames to the residual/envelope calculation parts $32_1$ to $32_4$ of the corresponding subchannels $CH_1$ to $CH_4$, respectively. The same goes for the frames $F_2, F_3, \ldots$ The LOT scheme is disclosed, for example, in H. S. Malvar, "Signal Processing with Lapped Transform," Artech House.

In the residual/envelope calculation part 32 of each subchannel in FIG. 4B, the 2N-sample subsequences fed thereto are each multiplied by a window function in the windowing part 32A. The window is usually shaped as a hanning window. The 2N-sample subsequences thus multipled by the window function are each subjected to an N-order modified discrete cosine transformation which is a kind of orthogonal transformation, by which N-sample frequency domain coefficients. At the same time, the output from the windowing part 32A is subjected to the LPC analysis in the LPC analysis part 32C to obtain p-order prediction coefficients $\alpha_0, \ldots, \alpha_p$. In the quantization part 32D the prediction coefficients $\alpha_0$ to $\alpha_p$ are transformed into LSP parameters or k parameters, for instance, then they are quantized to obtain the envelope index $I_E$ corresponding to the prediction coefficients.

Figure 6A:
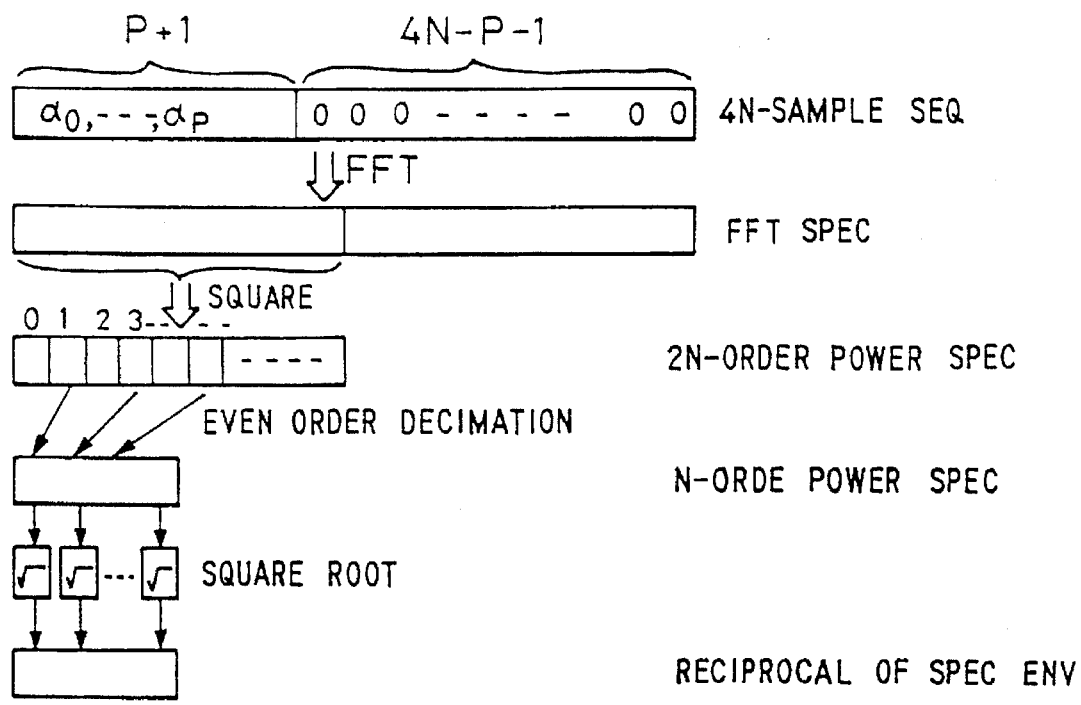
FIG. 6A is a diagram showing the procedure for deriving a spectral envelope from prediction coefficients in an envelope calculating part 32E in FIG. 4A.

The spectral envelope of the prediction coefficients $\alpha_0$ to $\alpha_p$ is calculated in the envelope calculation part 32E. The spectral envelope of the prediction coefficients is obtained by such a method as shown in FIG. 6A. That is, a 4N-sample sequence, which is composed of P+1 quantized prediction coefficients followed by (4N–P–1) zeros, is subjected to discrete Fourier transformation (fast Fourier transformation FFT, for example), then its 2N-order power spectrum is calculated, from which odd-number order components are extracted by decimating even-number order components, and their square roots are calculated. The spectral amplitudes at N points thus obtained represent the reciprocal of the spectral envelope E.

Figure 6B:
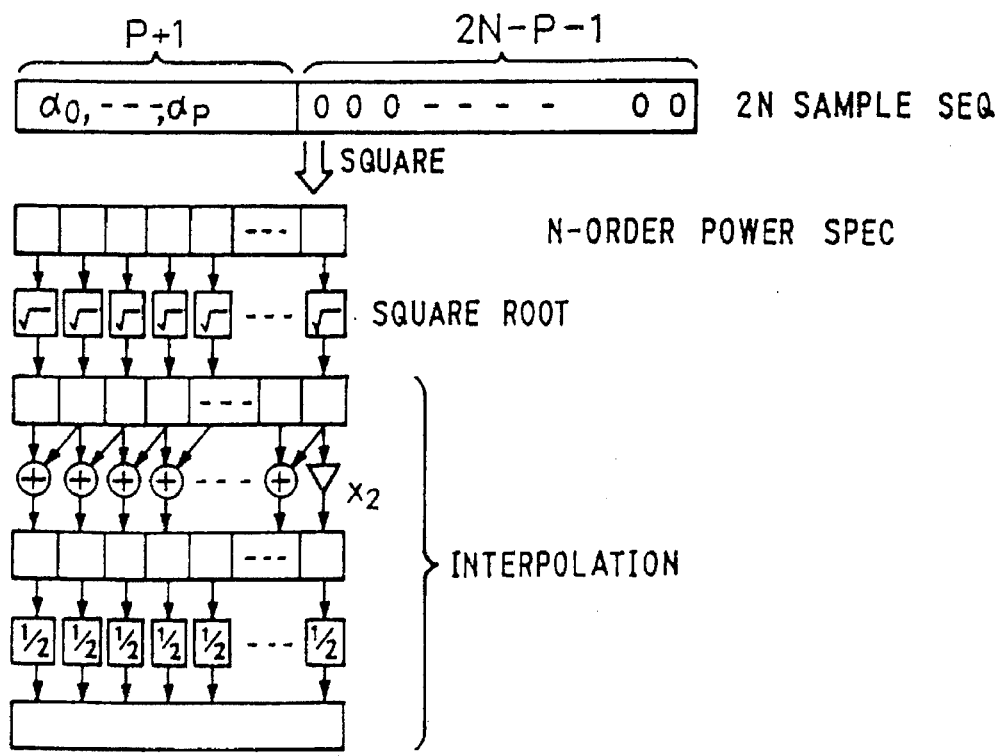
FIG. 6B is a diagram showing a modified form of the procedure of FIG. 6A.

Alternatively, as shown in FIG. 6B, a 2N-sample sequence, which is composed of P+1 quantized prediction coefficients followed by (4N–1) zeros, is FFT analyzed and the N-order power spectrum is calculated for the result of the analysis. The reciprocal of the spectral envelope i-th from zeroth is obtained by averaging the square roots of (i+1)th and i-th power spectrums, that is, by interpolation with them, except for i=N–1. The reciprocal of the (N–1)th spectral envelope is obtained by calculating the square root of the (N–1)th power spectrum.

The normalization part 32F normalizes the spectral amplitude from the MDCT part 32B by dividing it by the thus obtained spectral envelope for each corresponding sample to obtain the residual coefficients X. However, it is the reciprocal of the spectral envelope E that is directly obtained by Fourier transforming the quantized prediction coefficients as described above; hence, in practice, the normalization part 32F needs only to multiply the output from the MDCT part 32B and the output from the spectral envelope calculation part 32E (the reciprocal of the spectral envelope E). Also in In the following description, however, it is assumed, for convenience's sake, that the spectral envelope calculation part 32E outputs the spectral envelope E.

Turning back to FIG. 4A, the residual coefficients X and the spectral envelopes E from the residual/envelope calculation part $32_{L1}$ to $32_{Ln}$ in the subchannels $CH_1$ to $CH_n$ of the left channel are provided to the power normalization parts $33_{L1}$ to $33_{Ln}$ and the weight calculation parts $34_{L1}$ to $34_{Ln}$, respectively.

The power normalization parts $33_{L1}$ to $33_{Ln}$ each calculate the average value of the powers of the residual coefficients X for each processing frame, then divide the residual coefficients by the averaged power value to obtain normalized coefficients $X_N$ (a vector composed of N samples) and provide them to the residual interleave part $35_{XY}$. At the same time, the power normalization parts $33_{L1}$ to $33_{Ln}$ provide the averaged power values as gains G to the weight calculating parts $34_{L1}$ to $34_{Ln}$ and output indexes $I_{G1}$ to $I_{Gn}$ representing the gains G. The weight calculation parts $34_{L1}$ to $34_{Ln}$ each multiply the spectral envelope E by the gain G and provide the result of multiplication as a weighting factor V (a vector composed of N elements) to the weight interleave part $35_{VW}$. If necessary, the result of multiplication is multiplied by a psycho-acoustic weight (a vector composed of N elements) and the result of this multiplication is provided as the weighting factor V. Hence, the thus obtained weight factor V corresponds to the product of the spectral envelope and the power normalization gain G (the product further including the psycho-acoustic weight, as required).

The psycho-acoustic weighting scheme is used, for example, to raise the spectral envelope to a constant of about −0.6 to effect psycho-acoustic control to increase a smaller value and decrease a larger value. It is also possible to employ another psycho-acoustic control scheme in which the signal to noise ratio (SNR) necessary for each sample, obtained with a psycho-acoustic model which is used in the MPEG-Audio method, is made non-logarithmic and is multiplied by the aforementioned reciprocal of the spectral envelope. In this scheme, the minimum SNR which permits psycho-acoustic detection of noise for each frequency sample is calculated, by estimating the amount of masking with a psycho-acoustic model, from the frequency characteristic of the input signal obtained by the analysis of the signal. This SNR is one that is required for each sample. The psycho-acoustic model techniques in the MPEG-Audio method are disclosed in ISO/IEC Standard IS-11172-3. It is also possible to use the reciprocal of the spectral envelope as the weighting signal, omitting the psycho-acoustic control.

The frame segmentation part $31_R$, the residual/envelope calculation parts $32_{R1}$ to $32_{Rn}$, the power normalization parts $33_{R1}$ to $33_{Rn}$ and the weight calculation parts $34_{R1}$ to $34_{Rn}$ in the right channel operate in the same manner as those in the right channel, and the residual/envelope calculation parts $32_{R1}$ to $32_{Rn}$ in the respective subchannels output quantization indexes $I_{PR1}$ to $I_{PRn}$. The power normalization parts $33_{R1}$ to $33_{Rn}$ output gain indexes $I_{GR1}$ to $I_{GRn}$ and normalized residual coefficients X, the latter being provided to the residual interleave part $35_{XY}$. The weight calculation parts $34_{R1}$ to $34_{Rn}$ output the weighting factors, which are provided to the weight interleave part $35_{VW}$.

In this way, a total of 2 n residual coefficients (hence, the total number of samples is 2 nN) in the right and left channels, obtained for each frame of the input acoustic signal, are rearranged for each frame in the residual interleave part 35, from which they are outputted as m sequences. In this instance, the residual coefficients are rearranged or interleaved so that they are mixed together as much as possible. In other words, imbalance of temporal power, power imbalance between the residual coefficients corresponding to the left and right signals from the terminals $11_L$ and $11_R$ and power imbalance in the frequency domain are removed by the mixing of the residual coefficients and the powers are made substantially uniform across each frame.

Figure 7:
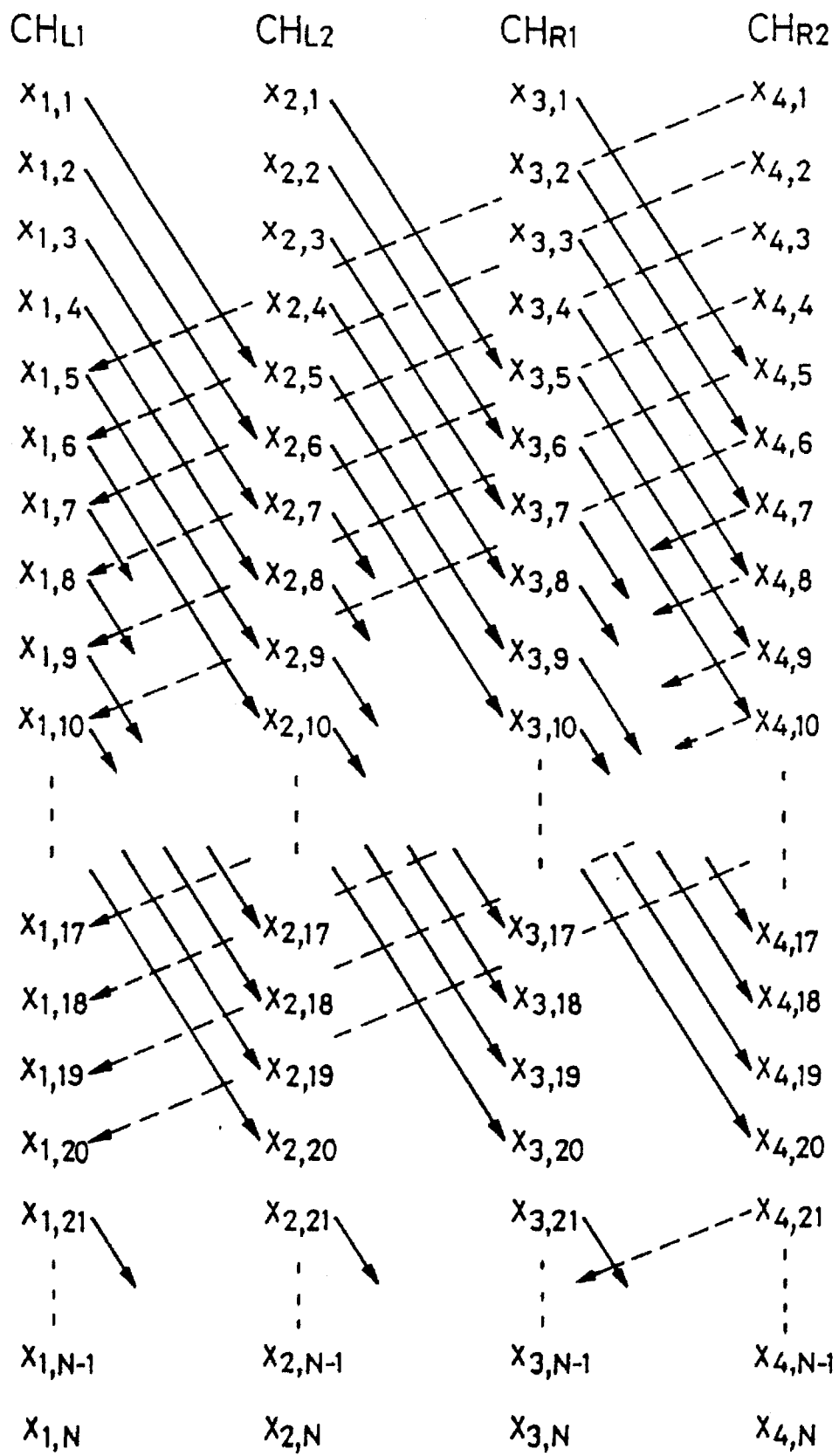
FIG. 7 is a vector element array diagram showing elements of residual sequence vectors in the case of segmenting respective frames of right and left channels into two and an interleave scheme therefor.

An example of such an interleave scheme will be described in connection with the case where the acoustic signals of left and right channels are split into signal subsequences of two pairs (that is, n=2) of subchannels $CH_{L1}$, $CH_{L2}$ and $CH_{R1}$, $CH_{R2}$. Here, normalized residual coefficient vectors $X_{L1}$ and $X_{L2}$ that are obtained in the subchannels $CH_{L1}$ and $CH_{L2}$ of the left channel side are denoted by their frequency components X as follows:

$\{x_{1,1}, x_{1,2}, \ldots, s_{1,N}\}$, $\{x_{2,1}, x_{2,2}, \ldots, x_{2,N}\}$ and normalized residual coefficient vectors that are obtained in the subchannels $CH_{R1}$ and $CH_{R2}$ of the right channel side are denoted by their frequency components X as follows:

$\{x_{3,1}, x_{3,2}, \ldots, x_{3,N}\}$, $\{x_{4,1}, x_{4,2}, \ldots, x_{4,N}\}$ As shown in FIG. 7, these residual coefficient vectors are arranged in order of channel number in the row direction with their elements (frequency components) in the column direction. In this case, m quintets of components are extracted which originate from those $x_{1,1}, x_{2,1}, \ldots, x_{4,1}$ in the first through fourth rows of the matrix of four-subchannel components and sequentially shift four times in the frequency-axis direction while circulating in the direction in which the subchannel numbers are arranged. Then, the following m sequences $Y_1$ to $Y_m$ are generated which use the quintets of components as their elements, respectively.

$Y_1 = \{x_{1,1}, x_{2,5}, x_{3,9}, x_{4,13}, x_{1,17}\}$
$Y_2 = \{x_{2,1}, x_{3,5}, x_{4,9}, x_{1,13}, x_{2,17}\}$
$Y_3 = \{x_{3,1}, x_{4,5}, x_{1,9}, x_{2,13}, x_{3,17}\} \ldots$
$Y_m = \{x_{1,N-16}, x_{N-12}, x_{3,N-8}, x_{4,N-4}, x_{1,N}\}$ Now, let the m sequences $Y_1$ to $Y_m$ be represented as follows:

$Y_1 = \{y_1^1, y_2^1, y_3^1, y_4^1, y_5^1\}$,
$Y_2 = \{y_1^2, y_2^2, y_3^2, y_4^2, y_5^2\}$,
$Y_3 = \{y_1^3, y_2^3, y_3^3, y_4^3, y_5^3\}, \ldots$
$Y_m = \{y_1^m, y_2^m, y_3^m, y_4^m, y_5^m\}$.

Hence, for example, $y_1^1 = x_{1,1}$, $y_2^1 = x_{2,5}, \ldots, y_1^2 = x_{2,1}$, $y_2^2 = x_{3,5}, \ldots$ In the example of FIG. 7, since the element extraction routes originate from respective elements of a first four-by-four array and repeat the circular shift four times to obtain the five-element vectors $Y_1, Y_2, Y_3, \ldots$, it is at 17th to 20th rows that fifth elements of the first 16 vectors are obtained. Similarly, the element extraction route start again from respective elements in the 17th to 20th rows and repeat the circular shift four times, thereby obtaining the next 16 vectors. In this way, 16 vectors are obtained every 20 rows by repeating the circular shift. For example, when N=12, 128÷20=6 with a remainder of 8; as regards the last eight rows, five-element vectors are generated by using another extraction scheme and the last two elements are combined into one vector. Accordingly, in this case, the total number m of vectors is 103.

The 2 n (n=2 in this example) weighting factor vectors $V_{L1} = \{V_{1,1}, V_{1,2}, \ldots, V_{1,N}\}$
$V_{L2} = \{V_{2,1}, V_{2,2}, \ldots, V_{2,N}\}$
$V_{R1} = \{V_{3,1}, V_{3,2}, \ldots, V_{3,N}\}$
$V_{R2} = \{V_{4,1}, V_{4,2}, \ldots, V_{4,N}\}$ provided from the weight calculation parts $34_{L1}$, $34_{L2}$, $34_{R1}$, $34_{R2}$ to the weight interleave part 35 are also interleaved in exactly the same manner as the residual interleave, by which the following m weighting factor sequences $W_1$ to $W_m$ are obtained.

$W_1 = \{v_{1,1}, v_{2,5}, v_{3,9}, v_{4,13}, v_{1,17}\}$
$W_2 = \{v_{2,1}, v_{3,5}, v_{4,9}, v_{1,13}, v_{2,17}\}$
$W_3 = \{v_{3,1}, v_{4,5}, v_{1,9}, v_{2,13}, v_{3,17}\} \ldots$
$W = \{v_{1,N-16}, v_{2,N-12}, v_{3,N-8}, v_{4,N-4}, v_{1,N}\}$ These sequences will also hereinafter be represented as follows:

$W_1 = \{w_1^1, w_2^1, w_3^1, w_4^1, w_5^1\}$,
$W_2 = \{w_1^2, w_2^2, w_3^2, w_4^2, w_5^2\}$,
$W_3 = \{w_1^3, w_2^3, w_3^3, w_4^3, w_5^3\}, \ldots$
$W_m = \{w_1^m, w_2^m, w_3^m, w_4^m, w_5^m\}$.

These sequences are also provided to the vector quantization part 36.

Figure 8:
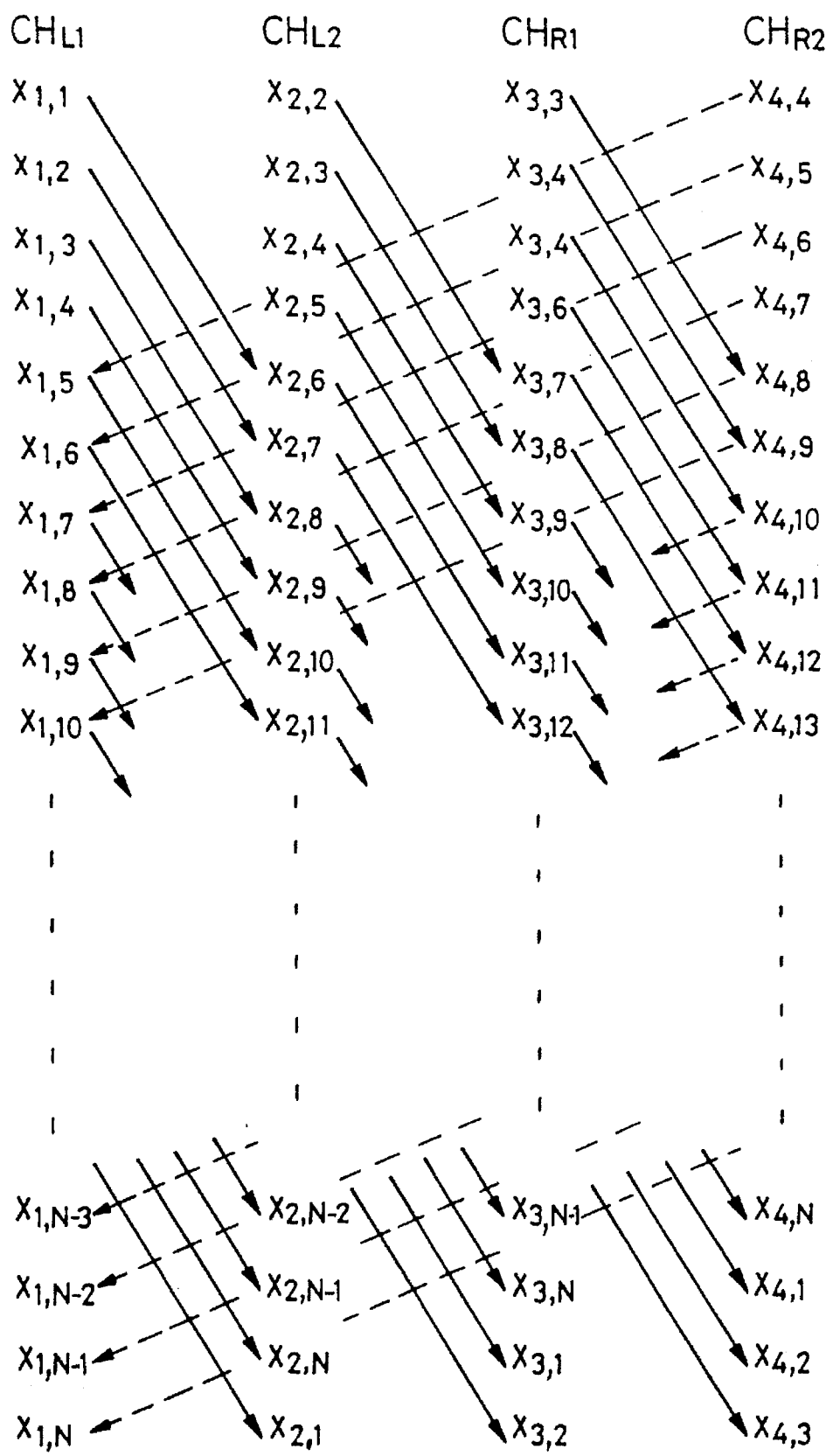
FIG. 8 is a vector element array diagram showing a modification of the interleave scheme of FIG. 7.

In FIG. 8 there is shown another interleave scheme. This example is based on the arrangement of the elements of the normalized residual coefficient vector $X_{L1}=\{x_{1,1}, x_{1,2}, \ldots, x_{1,N}\}$ of the left subchannel $CH_{L1}$ in the case of FIG. 7. As shogun in FIG. 8, N elements of the normalized residual coefficient vectors $X_{L2}$, $X_{R1}$ and $X_{R2}$ are cyclically shifted in the frequency-axis direction by element numbers 1, 2 and 3 and then arranged in a matrix form. As is the case with the FIG. 7 example, m quintets of components are repeatedly extracted which originate from respective components at the first to fourth rows of the matrix and shift four rows in the vertical direction while circulating through four subchannels. Then, the following m rearranged sequences $Y_1$ to $Y_m$ are generated which use the five components as their elements, respectively. This applies to the weighting factors.

In the interleaving of the residual coefficients and the weighting factors are depicted in FIG. 7A or 8B, the coefficients may preferably get mixed as much as possible between the subchannels and in the frequency domain; hence, it is desirable to interleave them randomly and they need not be interleaved regularly. For example, it is possible to determine the positions of the elements to be interleaved by using a table which indicates the correspondence between the elements of the sequences $Y_1$ to $Y_m$ and the elements of the respective channels. Alternatively, the positions of interleaving the elements may be determined by a relatively simple calculation.

The thus obtained sequences $Y_1$ to $Y_m$ from the residual interleave part $35_{XY}$ are provided to the vector quantization part 36, wherein they are weighted-vector quantized with the weighting factor sequences $W_1$ to $W_m$ corresponding to them, respectively.

Figure 9:
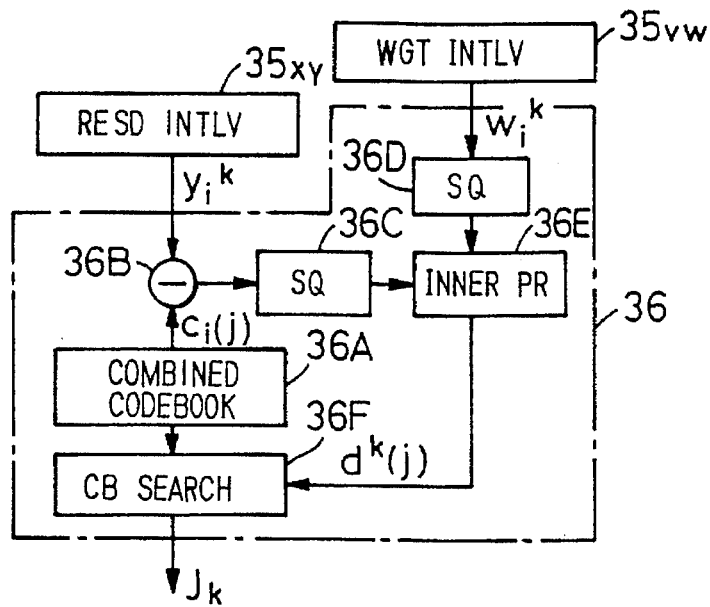
FIG. 9 is a block diagram illustrating the configuration of a vector quantization part.

FIG. 9 illustrates an example of the configuration of the vector quantization part 36, which is shown to perform the weighted vector quantization of a k-th interleaved residual sequence (assumed to be a five-element sequence as in FIG. 7A or 8A)

$$Y_k=\{y_1^k, y_2^k y_3^k, y_4^k, y_5^k\}=\{y_i^k | i=1 \text{ to } 5\}$$

with the corresponding k-th interleaved weight factor sequence $$W_k=\{w_1^k, w_2^k, \ldots, w_5^k\}=\{w_i^k | i=1 \text{ to } 5\}$$

In a combined codebook 36A there are prestored a variety of expected combined vectors of a fixed length in correspondence with their respective indexes. Letting an i-th element of a combined vector C(j) read out of an index j of the combined codebook 36A be represented by $c_i(j)$ the difference $y_i^k - c_i(j)$ between corresponding elements of the vectors $Y_k$ and C(j) is calculated by a subtractor 36B for i=1 to 5; the differences are respectively squared by a squarer 36C and the squared outputs are applied to an inner product calculation part 36E. On the other hand, each component $w_i^k$ of the weight vector $W_k$ is squared by a squarer 36D and the squared output is applied to the inner product calculation part 36E, wherein the inner product of the squared outputs from the squarers 36C and 36D is calculated as a weighted distance measure $d^k(j)$ for the vector quantization and is provided to an optimum codebook search part 36F. That is, the weighted distance measure is expressed by the following equation.

$$d^k(j)=\Sigma[w_i^k\{y_i^k-c_i(j)\}]^2$$

where $\Sigma$ is an addition operator for i=1 to 5. The codebook search part 36F searches code vectors C(j) read out of the combined codebook 36A in respect of all indexes j, for the index j of the code vector which minimizes the distance measure $d^k(j)$ calculated as described above; the codebook search part 36F outputs that index j as a determined vector quantization index $J_k$. Thereafter, the weighted vector quantization is similarly performed for all the k=1–m residual sequences $Y_1$ to $Y_m$ and m vector quantization indexes $J_1$ to $J_m$ thus determined are provided to a terminal 37 in FIG. 4A.

Figure 10A:
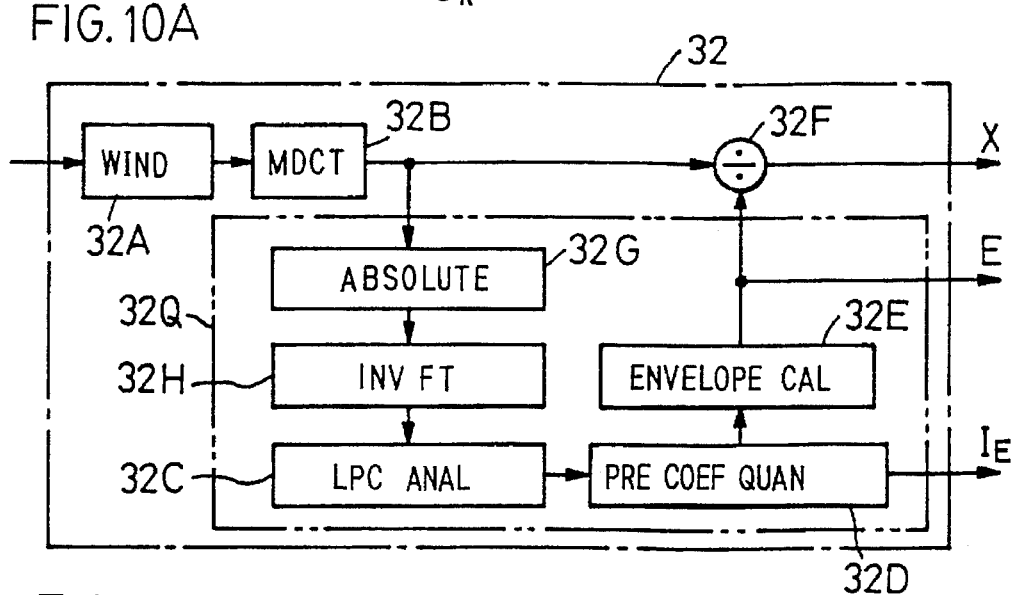
FIG. 10A is a block diagram illustrating another example of each residual/envelope calculating part in FIG. 4A.
Figure 10B:
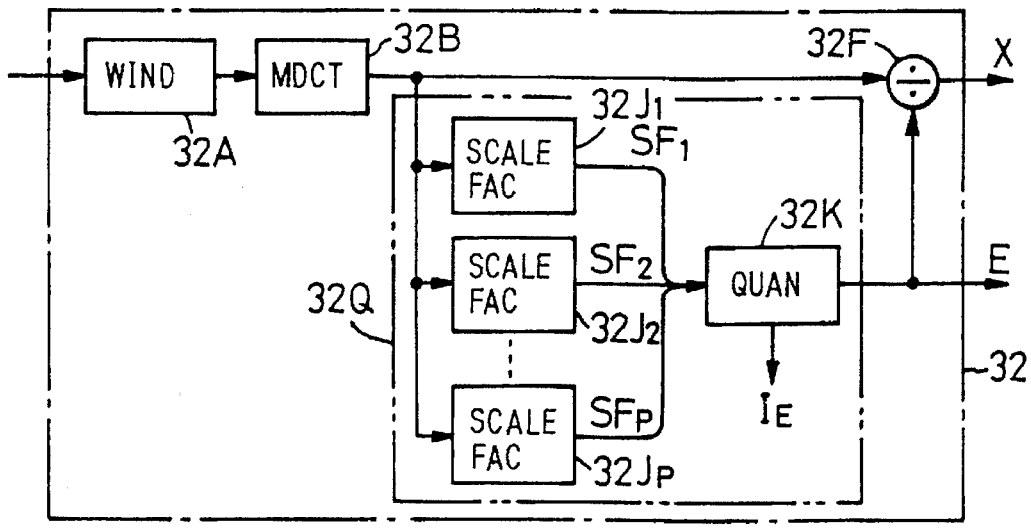
FIG. 10B is a block diagram illustrating still another example of each residual/envelope calculating part in FIG. 4A.

In FIG. 4A, each of the residual/envelope calculation parts $32_{L1}$ to $32_{Ln}$ and $32_{R1}$ to $32_{Rn}$ is not limited specifically to the FIG. 4B configuration; they may also be configured as depicted in FIG. 10A. In the illustrated configuration, the frequency domain coefficients, obtained by transforming in the MDCT part 32B the LOT processing frame multiplied by the window function in the windowing part 32A, are branched; the absolute value of its each sample (spectrum) is calculated in an absolute value calculation part 32G; the absolute value output is subjected to inverse Fourier transformation in an inverse Fourier transform part 32H to obtain auto-correlation coefficients; and a time domain signal which is the auto-correlation coefficients is LPC-analyzed in an LPC analysis part 32C. This is followed by the operations described previously in respect of FIG. 4B. That is, the prediction coefficients are quantized in the quantization part 32D, from which the index representing the quantized prediction coefficients is outputted as the envelope index $I_E$, and at the same time, the quantized prediction coefficients are provided to the envelope calculation part 32E to calculate the spectral envelope V, which is provided to the normalization part 32E to obtain the residual coefficients. Alternatively, it is possible to employ such a configuration as shown in FIG. 10B, wherein the frequency domain coefficients from the MDCT part 32B are divided into subbands, scaling factors $SF_1$ to $SF_p$ of the coefficients in the subbands are calculated in scaling factor calculation parts $32J_1$ to $32J_p$, then the scaling factors $SF_1$ to $SF_p$ are quantized in a quantization part 32K to provide an index representing the quantized scaling factor, as the envelope index $I_E$, and at the same time, the quantized scaling factors are provided as the envelope V to the normalization part 32F. The scaling factors may each be, for example, a squared mean value of the coefficients in respective subband.

Figure 11:
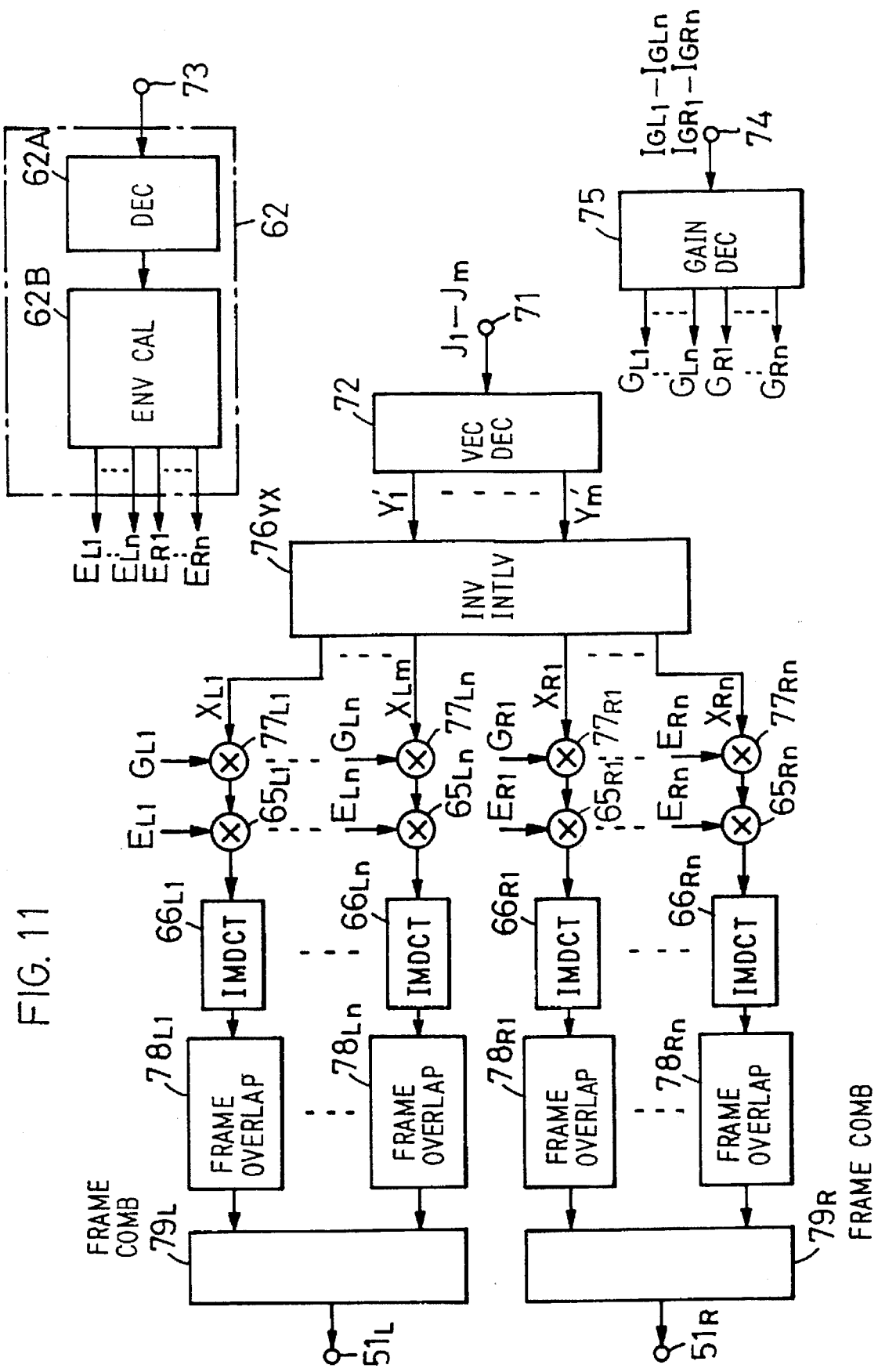
FIG. 11 is a block diagram illustrating an example of a decoder for use with the coder of FIG. 4A.

FIG. 11 illustrates in block form an embodiment of the decoder for use with the coder of FIG. 3A. The vector quantization indexes $J_1$ to $J_m$ are provided from an input terminal 71 to a vector decoding part 72, wherein m vectors $Y_1'$ to $Y_m'$ corresponding to the respective indexes are decoded, while at the same time the envelope indexes $I_{EL1}$ to $I_{ELn}$ and $I_{ER1}$ to $I_{ERn}$ are fed from an input terminal 73 to an envelope decoding part 62A, wherein the envelopes $E_{L1}$ to $E_{Ln}$ and $E_{R1}$ to $E_{Rn}$ are decoded. That is, in the decoding part 62A provided corresponding to each subchannel, the prediction coefficients $\alpha$ in the respective subchannels are decoded for each frame, and the envelope of the frequency characteristics is calculated from the decoded prediction coefficients $\alpha$ for each frame in the respective subchannels in an envelope calculation part 62b which conducts the same calculation as does the spectral envelope calculation part 32E in the residual/envelope calculation part 32 of the coder of FIG. 4B; by this, the envelopes $E_{L1}$ to $E_{Ln}$ and $E_{R1}$ to $E_{Rn}$ are obtained. From an input terminal 74 the gain indexes $I_{GL1}$ to $I_{GLn}$ and $I_{GR1}$ to $I_{GRn}$ are fed to a gain decoding part 75, wherein the normalized gains (average powers) $G_{L1}$ to $G_{Ln}$ and $G_{R1}$ to $G_{Rn}$ for each frame in the respective channels are decoded.

The m vectors $Y_1'$ to $Y_m'$ decoded in the vector decoding part 72 are provided to an inverse interleave part $76_{XY}$, wherein they are subjected to interleaving inverse to that in the interleave part 35 of the coder of FIG. 4A, by which are obtained n left-channel residual coefficient vectors $X_{L1}$ to $X_{Ln}$ and n right-channel residual coefficient vectors $X_{R1}$ to $X_{Rn}$. These residual coefficient vectors $X_{L1}$ to $X_{Ln}$ and $X_{R1}$ to $X_{Rn}$ are provided to de-normalization parts $77_{L1}$ to $77_{Ln}$ and $77_{R1}$ to $77_{Rn}$, wherein they are multiplied by the corresponding decoded gains $G_{L1}$ to $G_{Ln}$ and $G_{R1}$ to $G_{Rn}$, that is, de-normalized by them. The multiplied outputs are applied to multipliers $65_{L1}$ to $65_{Ln}$ and $65_{R1}$ to $65_{Rn}$, wherein they are multiplied by the decoded envelopes $E_{L1}$ to $E_{Ln}$ and $E_{R1}$ to $E_{Rn}$; by this, they are added with envelopes and the frequency domain characteristics are respectively reproduced. These frequency domain characteristics are fed to inverse MDCT parts $66_{L1}$ to $66_{Ln}$ and $66_{R1}$ to $66_{Rn}$, wherein they are transformed into 2N-sample (twice longer than the subframe: processing frame) time domain signals by inverse MDCT processing. Then, these time domain signals are each multiplied by a window function, if necessary. In frame overlapping parts $78_{L1}$ to $78_{Ln}$ and $78_{R1}$ to $78_{Rn}$ the time domain signals of the processing frames are subjected to required processing; that is, in the respective subchannel the second N samples of each processing frame and the first N samples of the immediately preceding processing frame are overlapped into an N-sample subframe signal. The thus produced N-sample subframe signals in the respective subchannels are applied to the corresponding signal synthesis parts $79_L$ and $79_R$ of the left and right channels. In the left-channel signal synthesis part $79_L$, for each frame, the N-sample subchannel signals of the left-side subchannels are combined or synthesized while being shifted one subframe period (N samples) in a sequential order; by this, the left channel signal of one frame is reconstructed and it is provided to an output terminal $51_L$. Also in the right-channel signal synthesis part $79_R$, N-sample subframe signals of the right side subchannels are similarly combined or synthesized while being shifted one subframe period in a sequential order. By this, the right channel signal of one frame is reconstructed and it is provided to an output terminal $51_R$.

Figure 12A:
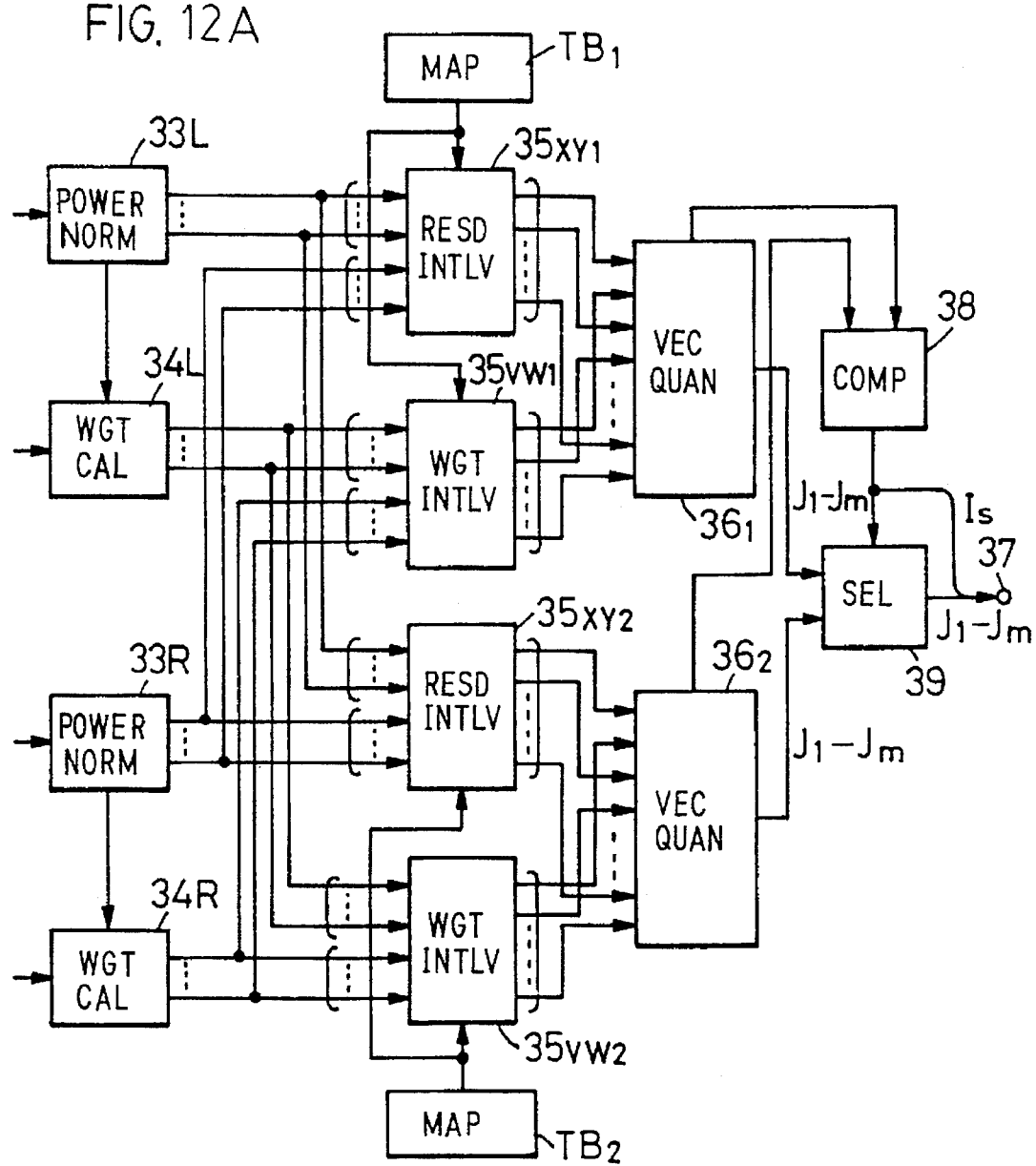
FIG. 12A is a block diagram illustrating an example of the configuration for selecting a plurality of interleave schemes in the coder of FIG. 4A.

While in the FIG. 4A embodiment the residual interleave part $35_{XY}$ and the weight interleave part $35_{VW}$ each always perform interleaving on the basis of a predetermined interleave mapping, it is also possible to employ a configuration in which a plurality of interleave mappings are prepared and a mapping is selected therefrom which minimizes the distortion of vector quantization. An example of such a configuration is illustrated in FIG. 12A. This example comprises: two sets of residual interleave parts, weight interleave parts and vector quantization parts, $35_{XY1}$, $35_{VW1}$, $36_1$ and $35_{XY2}$, $35_{VW2}$, $36_2$; mapping tables $TB_1$ and $TB_2$ which have stored therein predetermined different interleave mappings which are provided to the interleave parts $35_{XY1}$, $35_{VW1}$ and $35_{XY2}$, $35_{VW2}$; a comparator 38 which compares the severity of quantization distortion in the two vector quantization parts $36_1$ and $36_2$; and a selector which selectively outputs a less-distorted one of the outputs from the two vector quantization parts $36_1$ and $36_2$ on the basis of the result of comparison by the comparator 38. Incidentally, for brevity's sake, the frame segmentation parts $31_L$ and $31_R$ and the residual/envelope calculation parts $32_{L1}$ to $32_{Ln}$ and $32_{R1}$ to $32_{Rn}$ in FIG. 4A are not shown, and the power normalization parts $33_{L1}$ to $33_{Ln}$ and $33_{R1}$ to $33_{Rn}$ and the weight calculation parts $34_{L1}$ to $34_{Ln}$ and $34_{R1}$ to $34_{Rn}$ are identified simply by $33_L$, $33_R$, $34_L$, $34_R$, respectively.

In the residual interleave parts $35_{XY1}$ and $35_{XY2}$ the normalized residual coefficients X from the normalization parts $33_L$ and $33_R$ are rearranged in different sequences in accordance with interleave mappings presented in the mapping tables $TB_1$ and $TB_2$, respectively. Similarly, in the weight interleave parts $35_{VW1}$ and $35_{VW2}$ the weighting factors V from the weight calculation parts $34_L$ and $34_R$ are rearranged in sequences in accordance with interleave mappings presented in the mapping tables $TB_1$ and $TB_2$, respectively. The residual coefficient sequence rearranged in accordance with the interleave mapping in the table $TB_1$ and the corresponding weighting factor sequence are provided to the quantization part $36_1$, wherein the residual coefficient sequence is weighted-vector quantized. Likewise, the residual coefficient sequence rearranged in accordance with the interleave mapping in the table $TB_2$ and the corresponding weighting factor sequence are fed to the vector quantization part $36_2$, wherein the residual coefficient sequence is subjected to the weighted vector quantization described previously with reference to FIG. 9. The comparator 38 compares minimum distortions (minimum distances) $d_i^k$ obtained in the vector quantization in the quantization part $36_1$ and $36_2$, respectively; on the basis of the result of comparison by the comparator 38, the selector 39 selects output indexes $J_1$ to $J_m$ of that one of the vector quantization parts $36_1$ and $36_2$ in which the calculated distortion is smaller than that in the other. The selector 39 provides the thus selected indexes to the terminal 37 together with information (the result of comparison) indicating which table was used.

Figure 12B:
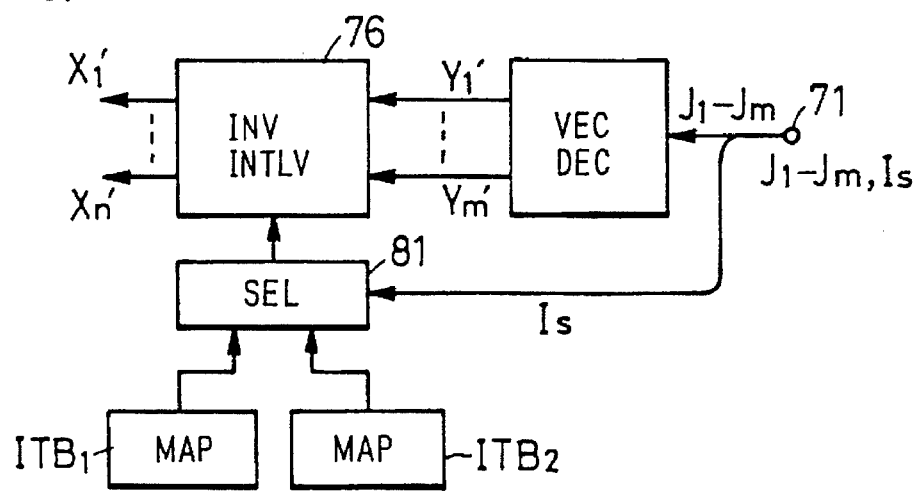
FIG. 12B is a block diagram showing an example of the configuration for switching an inverse interleave scheme at the decoding side relative to the coder of FIG. 12A.

In FIG. 12B there is shown the decoder of FIG. 11, modified for use with the coder which selects the interleave mapping in such a manner as to reduce the quantization distortion as described just above with respect to FIG. 12A. The decoder of this example has mapping tables $ITB_1$ and $ITB_2$ corresponding to the mapping tables $ITB_1$ and $ITB_2$ in FIG. 12A, for restoring the residual coefficient sequences and the weighting sequences to the original sequences. The index Is representing the selected mapping table is fed to the terminal 71 together with the vector quantization indexes $J_1$ to $J_m$; a selector 81 is controlled by the index Is to select that one of the mapping tables $ITB_1$ and $ITB_2$ which corresponds to the mapping table specified by the index Is. The thus selected mapping table is used for interleaving in the inverse interleave part 76. The configuration of the subsequent stage is identical with that in FIG. 11, and hence is not shown. In FIG. 11, when supplied with the envelope index $I_E$ representing the scaling factors $SF_1$ to $SF_p$ of the subbands shown in FIG. 10B, the envelope decoding part 62 needs only to decode and output the scaling factors of the subbands in accordance with the envelope index $I_E$.

While in the above the input signal has been a right and left two-channel stereo signal and each channel signal is segmented for each frame into a plurality of subframes to form a plurality of subchannels, it is also possible to use a four- or five-channel stereo signal and segment each channel signal into a plurality of subframes to form a multichannel signal. Alternatively, it is possible to separate one input signal into lower-frequency and higher-frequency signals and apply them to the input terminals $11_L$ and $11_R$ in FIG. 4A. In the above, the signals from the input terminals $11_L$ and $11_R$ are segmented, for each frame, into pluralities of subframes; but it is possible to employ a scheme according to which the signals from the input terminals $11_L$ and $11_R$ are not segmented into subframes, but instead the residual coefficients of the two input signals for each frame are interleaved by the interleave part $35_{XY}$ into m sequences and the weighting factors, generated on the basis of the spectral envelope and the power for each frame, are similarly interleaved by the interleave part $35_{VW}$ and then the weighted vector quantization is performed for each of the m sequences. Furthermore, it is possible to use a scheme according to which one input signal, that is, a monaural signal is segmented for each frame into a plurality of subframes and residual signals in the respective subframes are weighted-vector quantized.

Although in the above the MDCT scheme has been described to be used for the transformation into the frequency domain signal, other orthogonal transformation schemes may be used, except when the signal frame is segmented into subframes.

As described above, when power imbalance is present between channels or on the time axis in each frame, the embodiments of FIGS. 4A and 11 permit reduction of the quantization distortion without adaptively changing the bit allocation, and hence do not require the calculation for the bit allocation. Moreover, these embodiments do not transmit the bit allocation information, and hence are robust against code errors. Thus, the decoding method of the present invention permits correct decoding of codes encoded by the above-described coding method.

While in the embodiment of the coder shown in FIG. 4A the input acoustic signal is always segmented for each frame into subframes for distribution into a plurality of subchannels, the present invention is of no use when the power of the input signal is stationary, because the invention reduces the amount information for coding (in other words, reduces the quantization distortion) through utilization of the imbalance of signal power in the time-axis direction. The constant outputting of the vector quantization indexes $J_1$ to $J_m$, the envelope indexes $I_{EL1}$ to $I_{ELn}$ and $I_{ER1}$ to $I_{ERn}$ and the normalization indexes $I_{GL1}$ to $I_{GLn}$ and $I_{GR1}$ to $I_{GRn}$ of all subchannels, despite the above fact, may sometimes require a larger amount of information for coding than in the case of coding without segmentation into subchannels. And the amount of processing for coding may sometimes become larger than in the case of coding without segmentation into subchannels.

Figure 13:
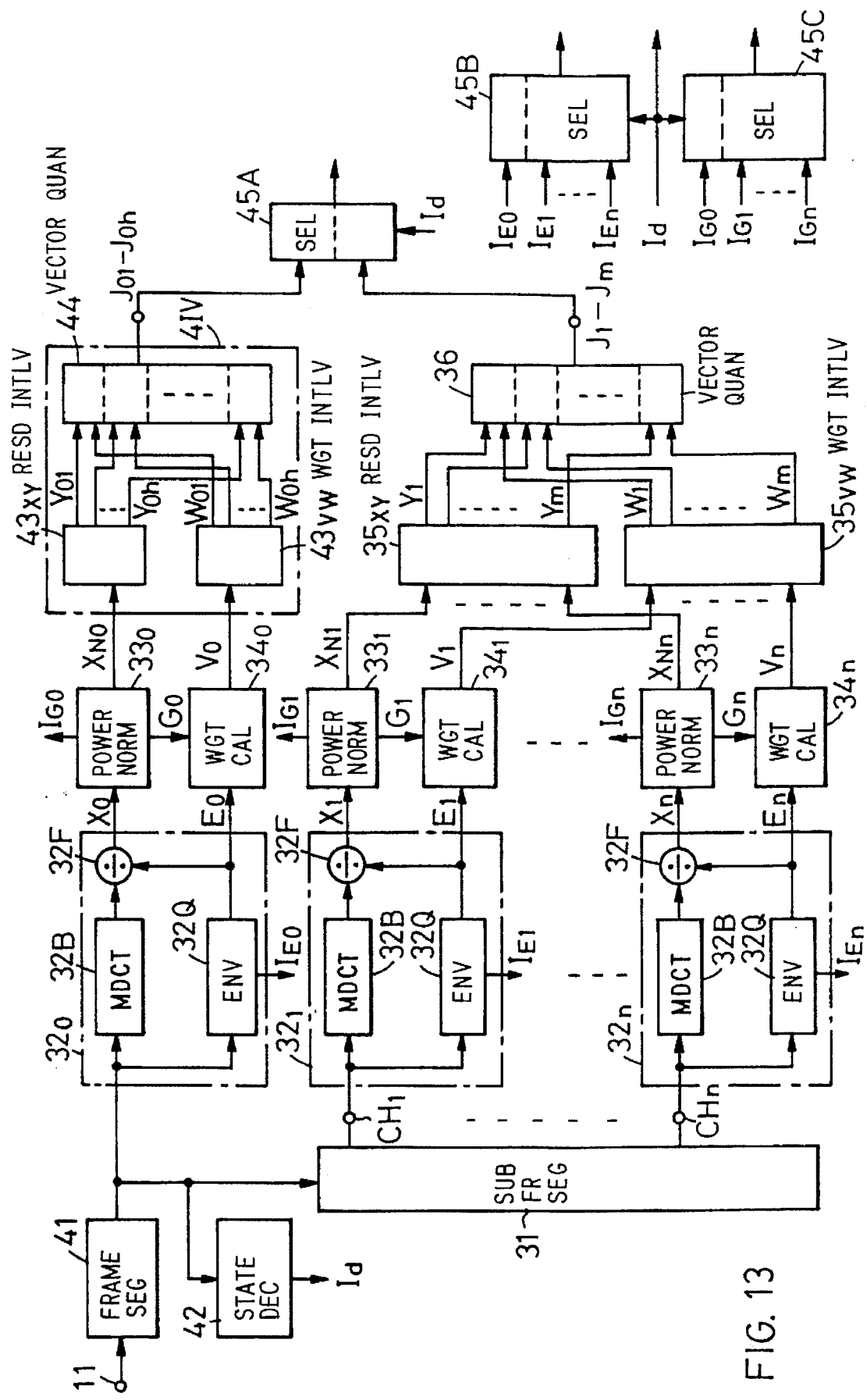
FIG. 13 is a block diagram illustrating the functional configuration of a coder designed to segment only a transitory frame of a signal into subframes.

In FIG. 13 an embodiment of a coder improved in this respect is shown in connection with the case of a one-channel input acoustic signal.

In FIG. 13, a frame segmentation part 31, residual/envelope calculation parts $32_1$ to $32_n$, power normalization parts $33_1$ to $33_n$, weight calculation parts $34_1$ to $34_n$, a residual interleave part $35_{XY}$, a weight interleave part $35_{VW}$ and a vector quantization part 36 are identical in construction and in operation with those at the right channel side in FIG. 4A. This embodiment further comprises: a signal segmentation part 41 which segments the input acoustic signal into frames; a state decision part 42 which decides the state of the signal of each frame; a residual/envelope calculation part $32_0$ which calculates the residual coefficients and spectral envelope of a stationary frame; a power normalization part $33_0$ which normalizes the power of the residual coefficients of the stationary frame; a weight calculation part $34_0$ which calculates weighting factors from the spectral envelope and normalization gain of the stationary frame; a residual interleave part $43_{XY}$ which interleaves the normalizes residual coefficients into a plurality of sequences; a weight interleave part $43_{VW}$ which interleaves the weighting factors into the same plurality of sequences as those of the residual coefficients; a vector quantization part 44 which weighted-vector quantizes a residual subsequence with the corresponding weight subsequence; a selector 45A which selectively outputs the outputs from the vector quantization parts 36 and 44 in accordance with the state of the frame concerned; a selector 45B which selectively outputs envelope indexes $I_{E0}$ and $I_{E1}$ to $I_{En}$ of stationary and transient frames in accordance with the state of the frame concerned; and a selector 45C which selectively outputs normalization gain indexes $I_{G0}$ and $I_{G1}$ to $I_{Gn}$ of stationary and transient frames in accordance with the state of the frame concerned. The residual/envelope calculation parts $32_0$ and $32_1$ to $32_n$ are identical in construction and any configurations shown in FIGS. 4B, 10A and 10B can be used. The blocks 32Q in the residual/envelope calculation parts $32_0$, $32_1$ to $32_n$ are each an envelope calculation/quantization part, which corresponds to the block 32Q in each of FIGS. 4B, 10A and 10B. And the windowing part 32A is not shown for brevity's sake.

An input digital acoustic signal sequence from the input terminal 11 is fed to the signal segmentation part 41 and segmented into M-sample frames, and these signals are applied to the residual/envelope calculation part $32_0$, the state decision part 42 and the frame segmentation part 31. In the state decision part 42 it is determined if the signal of each M-sample frame is stationary or transient. That is, when the signal undergoes a great temporal variation in the frame, that is, when the power or spectral envelope of the signal changes rapidly, the frame is determined to be transient. To perform this, for instance, each frame is split into four blocks in terms of time, then the average power or average spectral envelope of each block is calculated, and the power of spectral envelope changing ratios of the four blocks are calculated; the frame is determined to be transient or stationary, depending on whether the power or spectral envelope changing ratios are higher or lower than a predetermined value.

Figure 14:
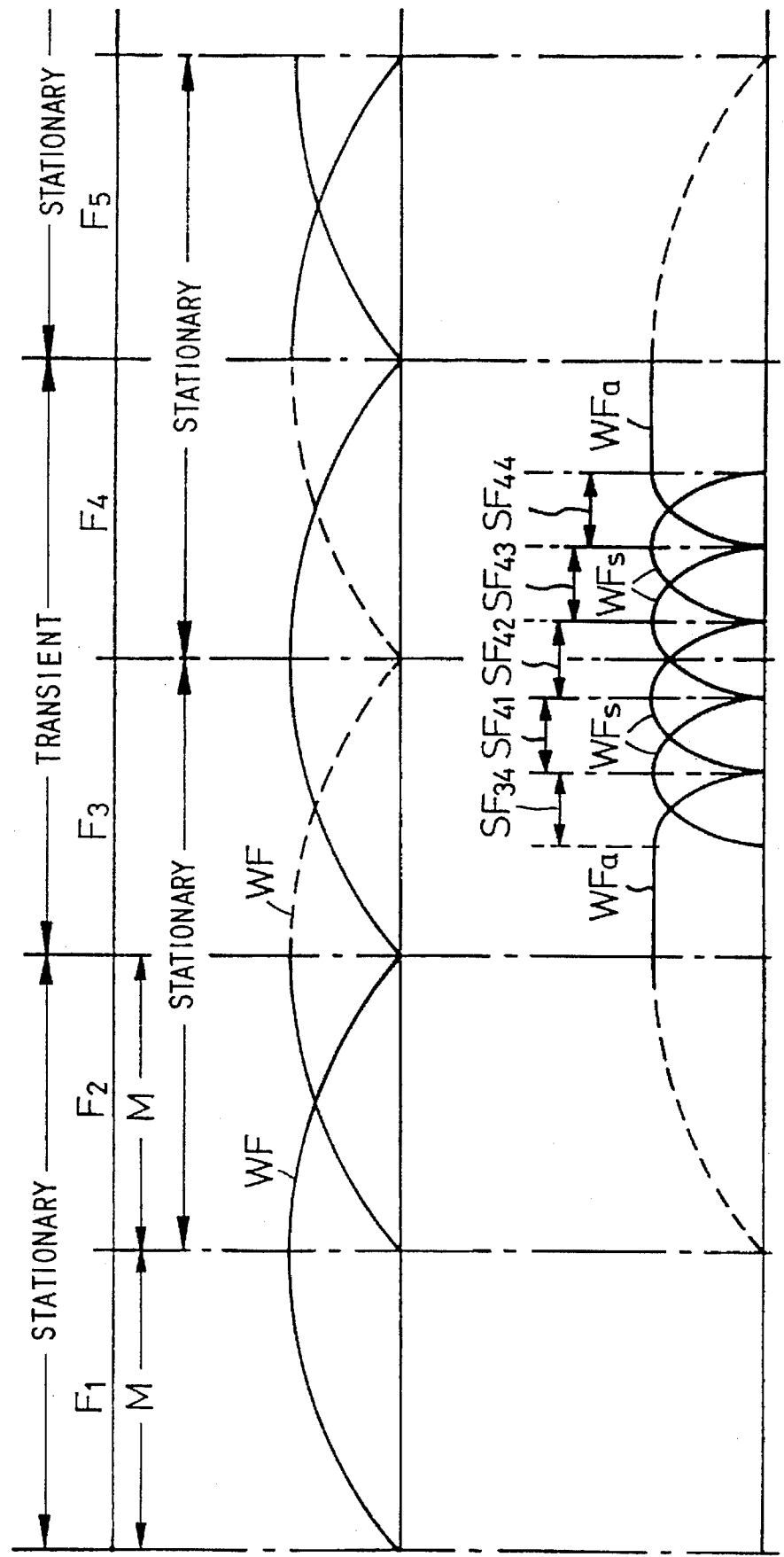
FIG. 14 is a diagram showing examples of the frame segmentation, the segmentation of the transitory frame into subframes and window functions in respective MDCT in the coder of FIG. 13.

The decision in the state decision part 42 takes place for each of the frames $F_1$, $F_2$, . . . . For example, as shown in FIG. 14, a check is made to determine if each 2M-sample signal sequence (a unit MDCT processing frame) composed of each frame and the immediately preceding one is stationary or transient while shifting it M samples (one frame). For instance, when it is decided, in the frame $F_2$, that the 2M-sample processing frame composed of the frame $F_2$ and the immediately preceding one $F_1$ is stationary, the 2M-sample is multiplied by a window function WF, after which it is subjected to MDCT processing. Furthermore, when it is decided, in the frame $F_4$, that the 2M-sample processing frame composed of the frame $F_4$ and the immediately preceding one $F_3$ is transient, the central M-sample portion of the 2N-sample frame is segmented into n (n=4 in this example) subframes $SF_{41}$ to $SF_{44}$, and in the residual/envelope calculation parts $32_1$ to $32_4$ the subframes are subjected to MDCT processing as two-subframe units composed of 2M/n samples of the subframes and the immediately preceding ones $SF_{34}$, $SF_{41}$, $SF_{42}$ and $SF_{43}$; the window function WFs spans the two subframes as depicted in FIG. 14. In order that the stationary and transient frames may be continuously linked to each other at the boundary therebetween before and after the segmentation into subframes, a window function WFa on the transient side is made to form one half portion of the window function WFs and the stationary side constitutes the maximum value of the window function WFs as shown in FIG. 14. These window functions WFs and WFa are shown by way of example and other schemes can also be used.

When the frame is decided to be stationary, the residual/envelope calculation part $32_0$ calculates and outputs the spectral envelope $E_0$ and frequency domain residual coefficients $X_0$ of the frame and at the same time outputs the envelope index $I_{E0}$ obtained at the time of calculating the spectral envelope. That is, for example, when the residual/envelope calculation part shown in FIG. 4B is used as that $32_0$ in FIG. 13, the 2M-sample processing frame composed of the input M samples and the immediately preceding M samples is multiplied by the window function in the windowing part 32A and transformed into the frequency domain coefficients in the MDCT part 32B as is the case with the above. Furthermore, the spectral envelope E is calculated by the LPC analysis part 32C, the prediction coefficient quantization part 32D and the spectral envelope calculation part 32E and at the same time the envelope index $I_{E0}$ is provided.

The residual coefficients from the residual/envelope calculation part $32_0$ is normalized with the intra-processing-frame average power in the power normalization part $33_0$, and the normalized residual coefficients $X_{N0}$ are provided to the residual interleave part $43_{XY}$. The normalization gain $G_0$ is provided to the weight calculation part $34_0$, wherein it is multiplied by the spectral envelope $E_0$ to obtain the weighting factors $V_0$, which are fed to the weight interleave part $43_{VW}$. in the residual interleave part $43_{XY}$ the residual coefficients $X_{N0}$ are interleaved into a plurality (h=4, for example) of subsequences and then provided to the vector quantization part 44. It is desirable that the residual coefficients $X_{N0}$ be interleaved into the subsequences of substantially the same envelope. In the weight interleave part $34_{VW}$ the weighting factors $V_0$ are also interleaved into h subsequences as in the residual interleave part $43_{XY}$ and then they are provided to the vector quantization part 44. The vector quantization part 44 weighted-vector quantizes the h residual subsequences with the corresponding weight subsequences, respectively, and outputs h quantization indexes $J_{01}$ to $J_{0h}$, which are provided to the one input of the selector 45A.

On the other hand, when it is decided in the state decision part 42 that the frame is transient, each M-sample frame is segmented into n equal subframes in the frame segmentation part 31, from which 2M/h-sample processing frames, each composed of one of the n subframes and the immediately preceding subframe, are distributed into n subchannels $CH_1$ to $CH_n$, as is the case with FIG. 4A. In the residual/envelope calculation parts $32_1$ to $32_n$ residual coefficients $X_1$ to $X_n$ and spectral envelopes $E_1$ to $E_n$ are generated from the thus distributed n processing frames as in the case of FIG. 4A. The power normalization parts $33_1$ to $33_n$ normalize the residual coefficients $X_1$ to $X_n$ with the average powers of the corresponding subframes and provide the normalized residual coefficients $X_{N1}$ to $X_{Nn}$ to the residual interleave part $35_{XY}$ and the corresponding normalization gains $G_1$ to $G_n$ to the weight calculation part $34_1$ to $34_n$ while at the same time outputting indexes $I_{G1}$ to $I_{Gn}$ representing the gains. The weight calculation parts $34_1$ to $34_n$ multiply the spectral envelopes $E_1$ to $E_n$ by the normalization gains $G_1$ to $G_n$, respectively, to generate weighting factors $V_1$ to $V_n$, which are provided to the weight interleaves part $35_{VW}$.

The thus generated n normalized residual subsequences $X_{N1}$ to $X_{Nn}$ of the subchannels $CH_1$ to $CH_n$ are fed to the residual interleaves $35_{XY}$, wherein the components of all the subsequences are interleaved into m sequences $Y_1$ to $Y_m$ as in the case of FIG. 4A.

In the weight interleave part $35_{VW}$ the n weighting factor subsequences $V_1$ to $V_n$ of the subchannels $CH_1$ to $CH_n$ are also similarly interleaved into m sequences $W_1$ to $W_m$. In the quantization part 36 the interleaved residual sequences (vectors) $Y_1$ to $Y_m$ are weighted-vector quantized by using the corresponding interleaved weight sequences (vectors) $W_1$ to $W_m$, and the quantization indexes $J_1$ to $J_m$ are provided from the quantization part 36.

The one-bit code Id indicating whether the frame is stationary or transient is outputted and, in the case of the stationary frame, the vector quantization indexes $J_{01}$ to $J_{0h}$, the envelope index $I_{E0}$ and the normalization gain index $I_{G0}$ are provided, whereas in the case of the transient frame the vector quantization indexes $J_1$ to $J_m$, the envelope indexes $I_{E1}$ to $I_{En}$ and the normalization indexes $I_{G1}$ to $I_{Gn}$ are provided. These vector quantization indexes, envelope indexes and normalization indexes are selectively outputted by the selectors 45A, 45B and 45C, respectively, in accordance with the state decision code Id.

Figure 15:
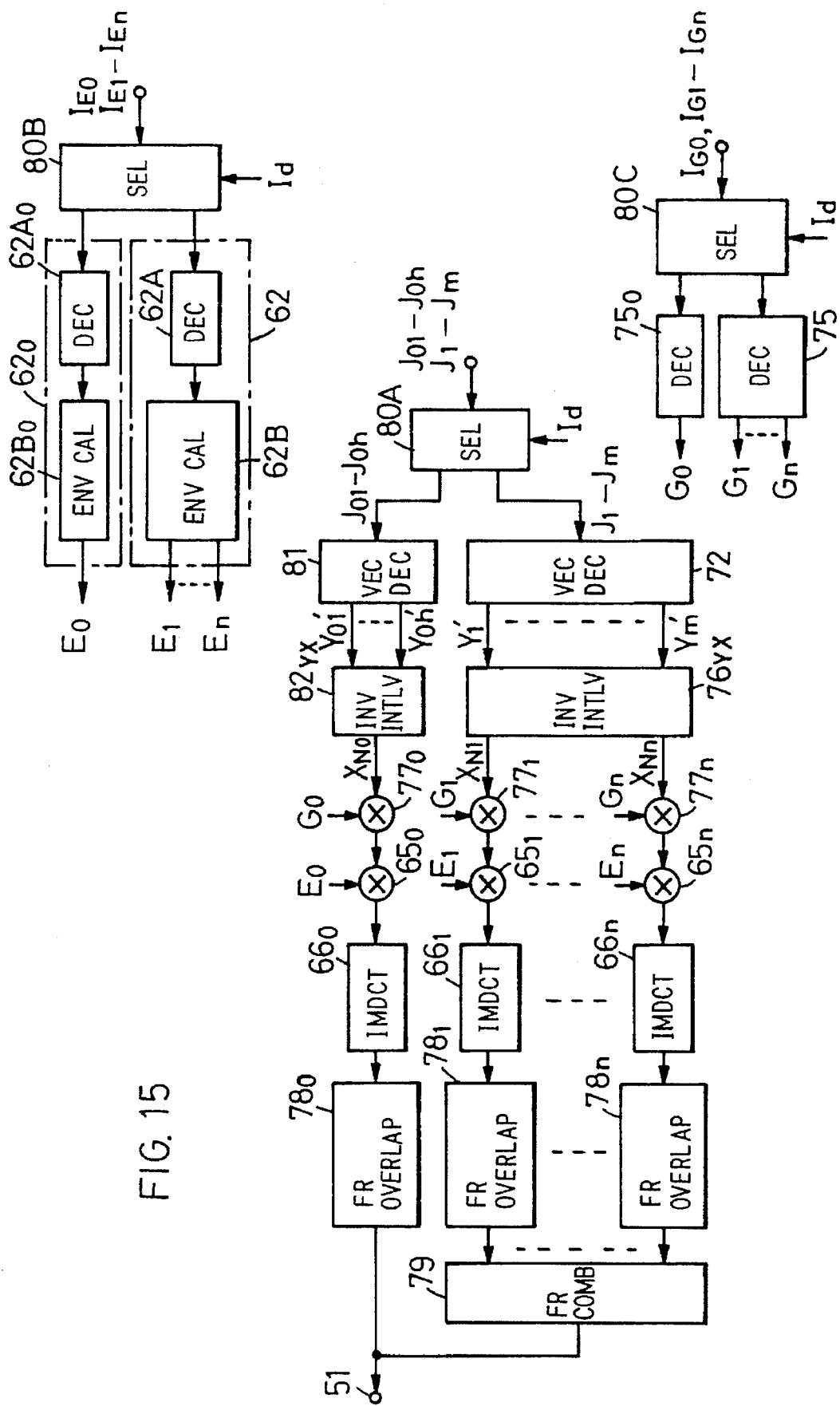
FIG. 15 is a block diagram illustrating an example of the functional configuration of a decoder corresponding to the coder of FIG. 13.

In FIG. 15 there is illustrated an example of a decoder which is used with the coder of FIG. 13, in which the parts corresponding to those in FIG. 12 are identified by the same reference numerals. The envelope index $I_{E0}$ or $I_{E1}$ to $I_{En}$, input into the decoder, is fed via a selector 80B to an envelope decoding part $62_0$ or 62 in accordance with the contents of the state decision code Id. The vector quantization indexes $J_{01}$ to $J_{0h}$ or $J_1$ to $J_m$ are provided to a selector 80A, from which they are fed to a vector decoding part $72_0$ or 72 in accordance with the code Id. The normalization gain index $I_{G0}$ or $I_{G1}$ to $I_{Gn}$ are provided to a selector 80C, from which it is fed to a gain decoding part $75_0$ or 75 in accordance with the code Id. In the envelope decoding parts $62_0$ and 62 the prediction coefficients corresponding to the inputted index are decoded in decoding part $62A_0$ and 62A, and in envelope calculation parts 62B the prediction coefficients are used to calculate the envelope of the frequency characteristics.

When the code Id indicates the stationary frame, the vector quantization indexes $J_{01}$ to $J_{0h}$ are fed to a vector decoding part 81, wherein they are decoded to reproduce n subsequences $Y_{01}'$ to $Y_{0h}'$. These subsequences are provided to an inverse interleave part $82_{YX}$, wherein they are subjected to interleaving inverse to that in the residual interleave part 45 of the coder of FIG. 13, by which the subsequences are combined into the original sequence of normalized residual coefficients $X_{N0}$. In a multiplier $77_0$ the residual coefficients $X_{N0}$ are multiplied by the decoded gain $G_0$ from the decoding part 75. The multiplied residual coefficients are applied to a power de-normalization part $65_0$; wherein they are multiplied by the decoded envelope $E_0$ from the envelope decoding part $62_0$, that is, de-normalized, by which the frequency domain coefficients are reconstructed. As in the decoder of FIG. 12, the frequency domain coefficients are transformed into a time domain signal by the inverse modified discrete cosine transformation in an IMDCT part $66_0$. In a frame overlapping part $78_0$, after the time domain signal is multiplied by a window function as required, the first half of the 2M-sample frame and the second half of the immediately preceding 2M-sample frame are overlapped into a reconstructed acoustic signal of an M-sample frame, which is provided to the terminal 51.

When the code Id indicates the transient frame, spectral envelopes of respective subframes are decoded from the envelope indexes $I_{E0}$ to $I_{En}$ in the envelope decoding part 62, from which envelope coefficients $E_1$ to $E_n$ are outputted. In the gain decoding part 75 the normalization gain indexes $I_{G1}$ to $I_{Gn}$ are decoded into the gains $G_1$ to $G_n$. In the vector decoding part 72 the vector quantization indexes $J_1$ to $J_m$ are decoded into vectors $Y_1'$ to $Y_m'$. In an inverse interleave part $76_{YX}$ the m vectors $Y_1'$ to $Y_m'$ thus reproduced are subjected to interleaving inverse to that in the interleave part $35_{XY}$ of the coder of FIG. 13, to produce the n subsequences of normalized residual coefficients $X_{N1}$ to $X_{Nn}$. In multipliers $77_1$ to $77_n$ these residual coefficients subsequences $X_{N1}$ to $X_{Nn}$ are multiplied by the reproduced gains $G_1$ to $G_n$ corresponding thereto. The multiplied outputs are multiplied by the reproduced envelopes $E_1$ to $E_n$, respectively, in de-normalization parts $65_1$ to $65_n$, by which the frequency domain coefficients are reproduced. In IMDCT parts $66_1$ to $66_n$ the frequency domain coefficients are respectively transformed into time domain signals by IMDCT processing. These time domain signals are multiplied by window functions as required in frame overlapping parts $78_1$ to $78_n$, after which first and second halves of adjacent subframes (adjacent subchannels) are overlapped; in a frame combining part 79 these overlapped portions are combined in time sequence into a reproduced acoustic signal in the transient frame, which is fed to the output terminal 51.

Figure 16:
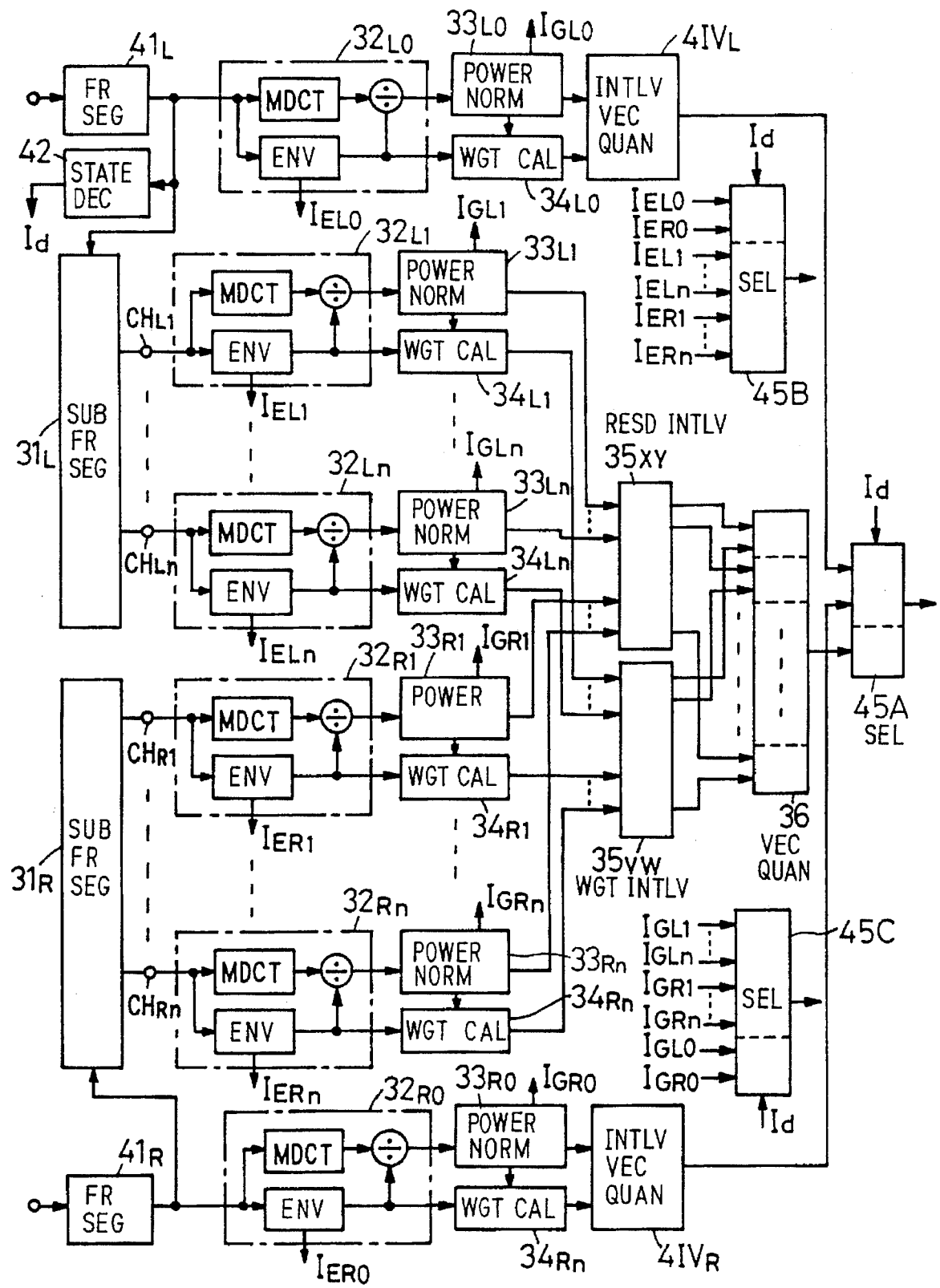
FIG. 16 is a block diagram illustrating an example of the functional configuration of a coder which applies the coding method of FIG. 13 to the coding of stereo signals.

A coder for stereo signals is illustrated in FIG. 16, in which the parts corresponding to those in FIG. 13 are identified by the same reference numerals but added with a suffix "L" for the left-channel components and with a suffix "R" for the right-channel components. That is, in the case of the stationary frame, left- and right-channel signals input from the input terminals $11_L$ and $11_R$ are subjected to the same processing as that of the stationary frame shown in FIG. 13, but in the case of the transient frame, the residual coefficients of respective subframes of left- and right-channel signal frames are mixed and then subjected to weighted vector quantization. This coder is identical with that of FIG. 13 in other respects.

Figure 17:
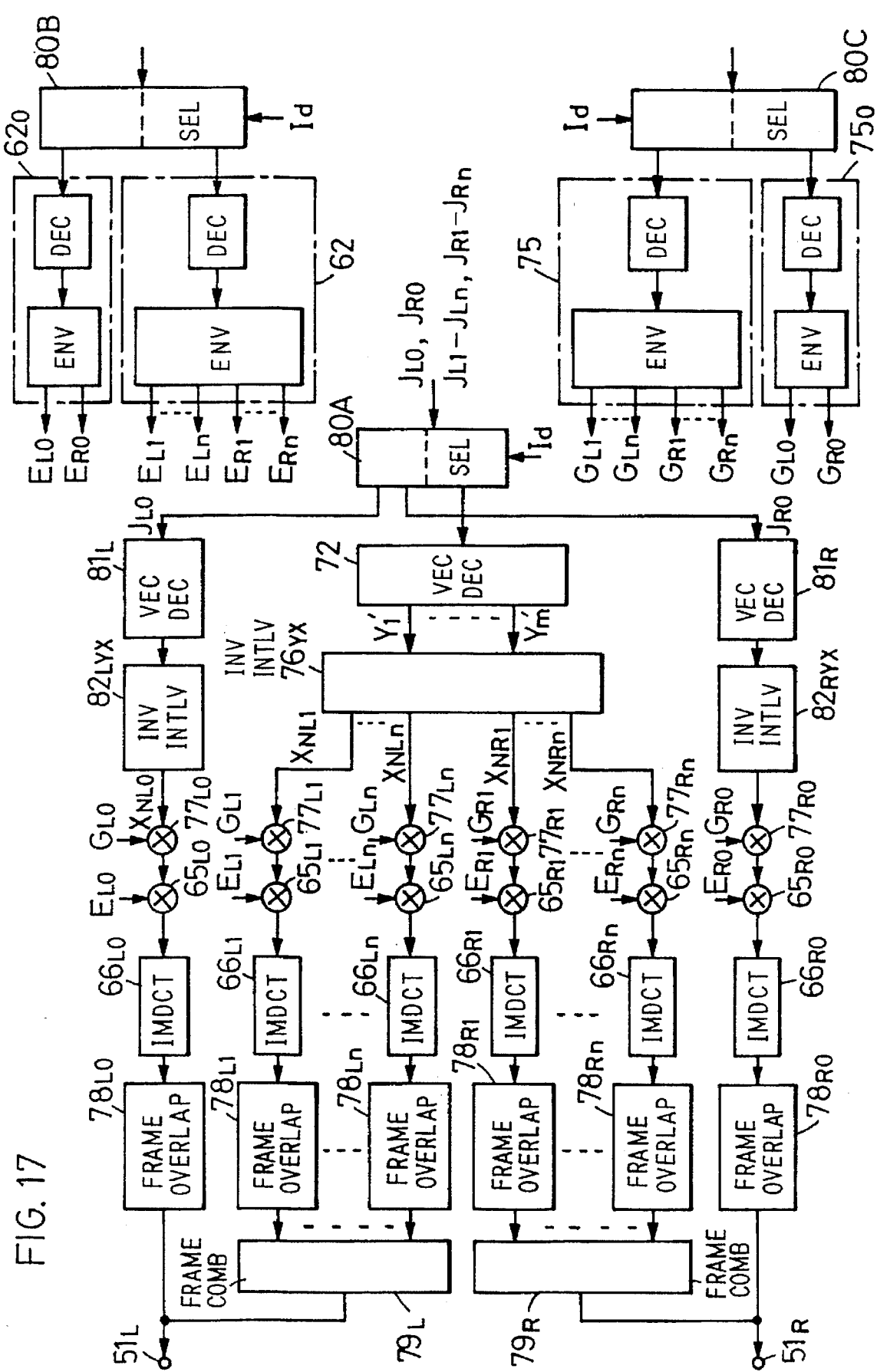
FIG. 17 is a block diagram showing an example of the functional configuration of a decoder corresponding to the coder of FIG. 16.

A decoder for decoding the coded output from the coder of FIG. 16 is illustrated in FIG. 17, in which the parts corresponding to those in FIG. 15 are identified by the same reference numerals but added with a suffix "L" for the left-channel side and with a suffix "R" for the right-channel side. In the case of the stationary frame, the left- and right-channel signals are both decoded in the same manner as in the case of FIG. 15. In the case of the transient frame, however, all the components of the m vectors reproduced in the vector reproducing part 72 are restored, in the inverse interleave part $76_{XY}$, to the original sequences from those by the residual interleave part $35_{XY}$ in FIG. 16. Thus, decoded signals of the left-channel subframes are combined into a composite signal in a frame combining part $79_L$, which is provided to a terminal $51_L$, and decoded signals of the right-channel subframes are similarly combined into a composite signal in a frame combining part $79_R$, which is provided to a terminal $51_R$.

In the embodiments of FIGS. 13, 15, 16 and 17, interleave mappings and inverse interleave mappings are predetermined; but, it is also possible to employ a method in which a plurality of interleave mapping schemes are prepared and are respectively used to perform vector quantization, then a mapping with the minimum distortion is selected and the information about the selected mapping is transmitted.

The auxiliary information (i.e. the envelope index and the gain index) of the spectral envelope and the normalization gain (power) is transmitted every frame in the case of an ordinary (stationary) frame. In the above-described embodiments, when the frame is transient, the spectral envelope information and the gain information are independently transmitted every subframe, but these pieces of information may collectively be vector quantized every frame for the reasons given below. That is, in a system which transmits a fixed amount of information for each frame, if the same number of bits as those of the ordinary frame is allocated to the auxiliary information for each subframe, the rate of the amount of auxiliary information to the overall amount of information becomes large, introducing the possibility of the overall distortion becoming large. Moreover, a plurality of subframes can be vector quantized as a single unit. Alternatively, the spectral envelope and gain of each subframe may be used in common to all the subframes.

In the embodiments of FIGS. 13 and 16, since in the stationary state the power imbalance cannot be utilized to reduce the amount of information for coding, the stationary and transient frame are discriminated; when the frame is stationary, the signal is coded without segmentation into subframes, and in the case of the transient frame, the signal is segmented into subframes to form a plurality of signal sequences. In an acoustic signal which contains a pitch component, such as a speech or musical signal, the correlation between frames becomes particularly high when stationary frames continue. This phenomenon can be used to reduce the amount of information for coding, by partly modifying the embodiments of FIGS. 13 and 16 as described below.

Figure 18:
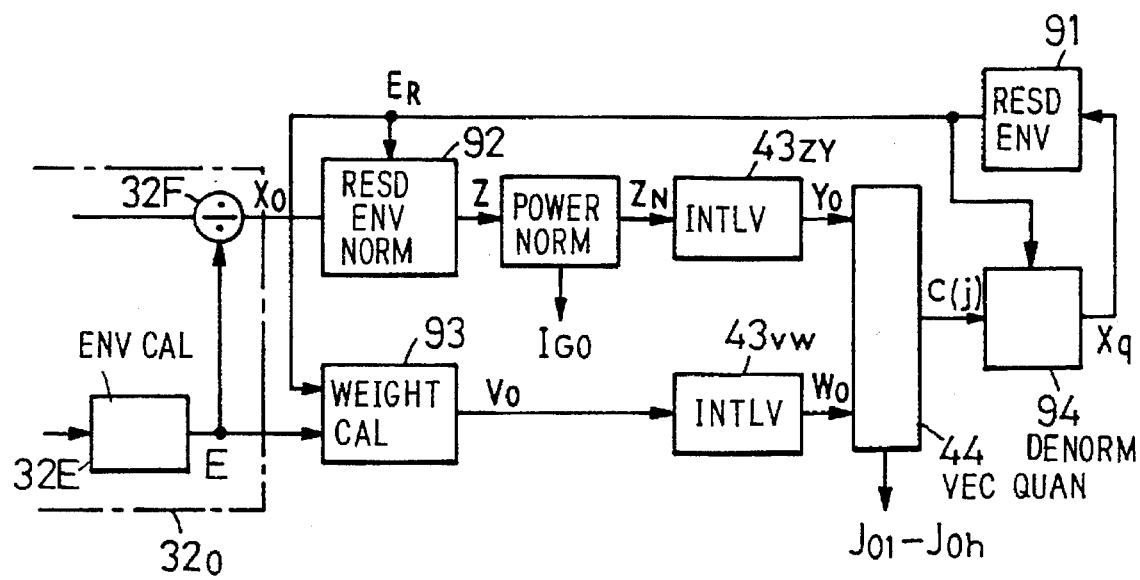
FIG. 18 is a block diagram showing a modified configuration for coding fine structure coefficients instead of coding residual coefficients in the coders of FIGS. 13 and 16.

That is, as shown in FIG. 18, the envelope $E_R$ of the residual coefficients of the current frame is predicted from the residual coefficients of the previous stationary frame in a residual envelope calculation part 91, and in a residual envelope normalization part 92 the residual coefficients $X_0$, provided from the normalization part 32F in the residual/envelope calculation part $32_0$ in FIG. 13, are normalized by being divided by the predicted residual envelope $E_R$. In a speech or musical sound, a pitch component is usually contained in the residual coefficients in the frequency domain in every frame, and this pitch component often lasts over a plurality of frames. In this embodiment, however, such a pitch component can be suppressed by normalizing the residual coefficients $X_0$ in the stationary frame by the residual envelope $E_R$; consequently, flattened fine structure coefficients Z are provided. That is, the modified embodiment of FIG. 18 implements predictive coding that utilizes the interframe correlation, by vector quantizing the fine structure coefficients Z instead of vector quantizing the residual coefficients.

The spectral envelope $E_0$ from the spectral envelope calculation part 32E and the residual coefficient envelope $E_R$ from the residual envelope calculation part 91 are mutually multiplied for each corresponding sample to obtain the weighting factors $V_0$ in a weight calculation part 93. The power normalization part $33_0$ normalizes the fine structure coefficients Z by its power and outputs the normalization gain index $I_{G0}$. The power-normalized fine structure coefficients $Z_N$ are provided to the vector quantization part 44, wherein they are vector quantized by the weighting factors $V_0$ from the weight calculation part 93. In this instance, as is the case with the FIG. 13 embodiment, the fine structure coefficients $Z_N$ and the weighting factors $V_0$ are interleaved, in interleave parts $43_{ZY}$ and $43_{VW}$, into h subsequences $Y_{01}$ to $Y_{0h}$ and $W_{01}$ to $W_{0h}$, respectively. The vector quantization part 44 vector quantizes the fine structure coefficient subsequences $Y_{01}$ to $Y_{0h}$ by the corresponding weight subsequences $W_{01}$ to $W_{0h}$. The quantization indexes $J_{01}$ to $J_{0H}$ are fed to the selector 35A in FIG. 13. Furthermore, vectors $C(J_{01})$ to $C(J_{0h})$ corresponding to the quantization indexes $J_{01}$ to $J_{0h}$, respectively, are provided to the de-normalization part 94, wherein they are de-normalized by the residual envelope $E_R$ fed from the residual envelope calculation part 91, by which residual coefficients Xq are produced. The residual envelope calculation part 91 predicts the residual envelope of the next frame on the basis of the residual coefficients Xq. It is evident that the FIG. 16 arrangement can also similarly be modified.

Figure 19:
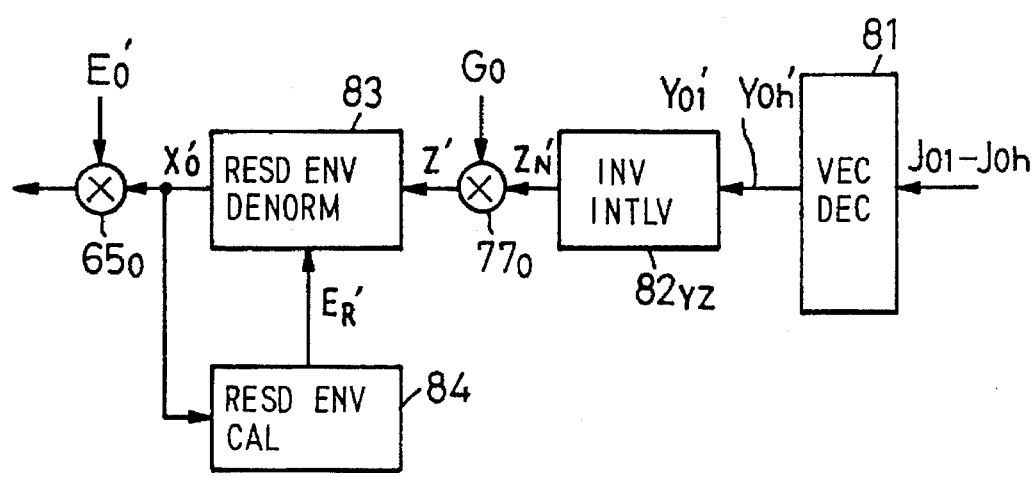
FIG. 19 is a block diagram showing a modified configuration corresponding to that of FIG. 18 in the coders of FIGS. 15 and 17.

The decoding of the fine structure coefficients Z vector quantized in FIG. 18 can be implemented by modifying, as shown in FIG. 19, the configuration between the vector decoding part 81 and the de-normalization part $65_0$ in the decoder of FIG. 15. That is, in a vector decoding part 81 the vector quantization indexes $J_{01}$ to $J_{0h}$ are decoded into the vector subsequence $Y_{01}'$ to $Y_{0h}'$, that is, the vectors $C(J_{01})$ to C($J_{0h}$), which are provided to an inverse interleave part $82_{YZ}$, wherein they are interleaved into a sequence inverse to that in the interleave part 43 in FIG. 18, by which they are interleaved into a sequence of normalized fine structure coefficients $Z_N'$. In the multiplier $77_0$ the normalized fine structure coefficients $N_Z'$ are multiplied by the gain $G_0$ decoded from the normalization index $I_{G0}$ fed from the power normalization part $33_0$ in FIG. 18 (the gain decoding part 75), by which the fine structure coefficients Z' are reproduced. In a residual envelope de-normalization part 83 the fine structure coefficients Z' are de-normalized by a residual spectral envelope $E_R'$ from a residual envelope calculation part 84, by which residual coefficients $X_0'$ are reproduced. In the de-normalization part $65_0$ the residual coefficients $X_0'$ are de-normalized into frequency domain coefficients, by the spectral envelope $E_0$ fed from the envelope calculation part 62B in FIG. 15; the thus obtained frequency domain coefficients are provided to the IMDCT part $66_0$ in FIG. 15. The subsequent processing is the same as in FIG. 15. The residual envelope calculation part 84 is identical in construction with the residual envelope calculation part 91 of the coder (FIG. 18) and predicts the envelope $E_R'$ of the residual coefficients of the current frame from the reproduced residual coefficients $X_0'$ of the previous frame inputted thereto. The decoder of FIG. 17 can similarly be modified as well.

In the coding and decoding of a signal in such a fine structure, coding which does not use the interframe correlation (predictive coding) is performed, for example in the transient frame, and when it is switched to the stationary frame, the previous state of the interframe correlation is reset. That is, the insides of the residual envelope calculation parts 91 and 84 in FIGS. 18 and 19 need only to be reset. Alternatively, although the subframe in the transient frame and the stationary frame differ in time length, the prediction based on the interframe correlation can be performed, regarding the power normalization gain and the spectral envelope parameter as common to the transitory and stationary frames. In other words, the spectral envelope parameter and the gain in two subframes, for example, are used as the spectral envelope parameter and the gain two frames before to operate the residual envelope calculation parts 91 and 84.

It is also possible to employ a configuration which uses four- or five-channel stereo signals and, in the transient frame, segments each channel into a plurality of subchannels to form a multichannel signal. Also it is possible to separate one input signal into lower-frequency and higher-frequency signals and apply them to the input terminals $11_L$ and $11_R$ in FIG. 16.

In accordance with such a modification, the interleave part $76_{XY}$ of the decoder is designed to generate a plurality of groups of residual coefficients, a plurality of residual coefficients corresponding to each output terminal, or a single group of residual coefficients for reproduction into one time domain signal.

As described above, in the embodiments of the coders of FIGS. 13 and 16, the input signal is segmented into subframes only for a frame in which the signal undergoes a great power variation on the time axis, then the subframes are each subjected to MDCT processing to obtain the frequency domain coefficients; by this, power imbalance in the frequency domain and power imbalance between subframes, that is, both imbalance in the time domain, can be reflected in the variation of the weighting factor in the vector. And imbalance of the average weighting factor (power) between the subsequences can be reduced. When the subsequences are generated in regular order without performing the interleave, the variation of the weighting factor in the subsequences is small, causing an increase in the variation of the average weighting factor between the subsequences. In this case, the distortion cannot be reduced without the adaptive bit allocation between the subsequences. According to the present invention, since the variation of the weighting factor between the subsequences is small, the effect of reducing the distortion is hardly impaired even if the bit allocation is fixed. The reason for this is that the present invention effects weighted control of quantization distortion for reduction of the distortion and controls the vector quantization distortion by the weighted vector quantization.

While the embodiments of FIGS. 4A, 11 and 16 code signals of the same kinds such as acoustic signals, the present invention is also applicable to a plurality of different signal sequences as long as power imbalance develop between them. A description will be given, with reference to FIG. 20, of a coder which embodies the coding method of the present invention to transmit two sequences of image and acoustic signals in a multiplexed form with a fixed amount of information. This coder will be described to utilize the transform coding scheme for the acoustic signal and both of the interframe prediction and the transform coding scheme for the image signal; but it is not related to the essence of the present invention what coding schemes are used for individual signals.

Figure 20:
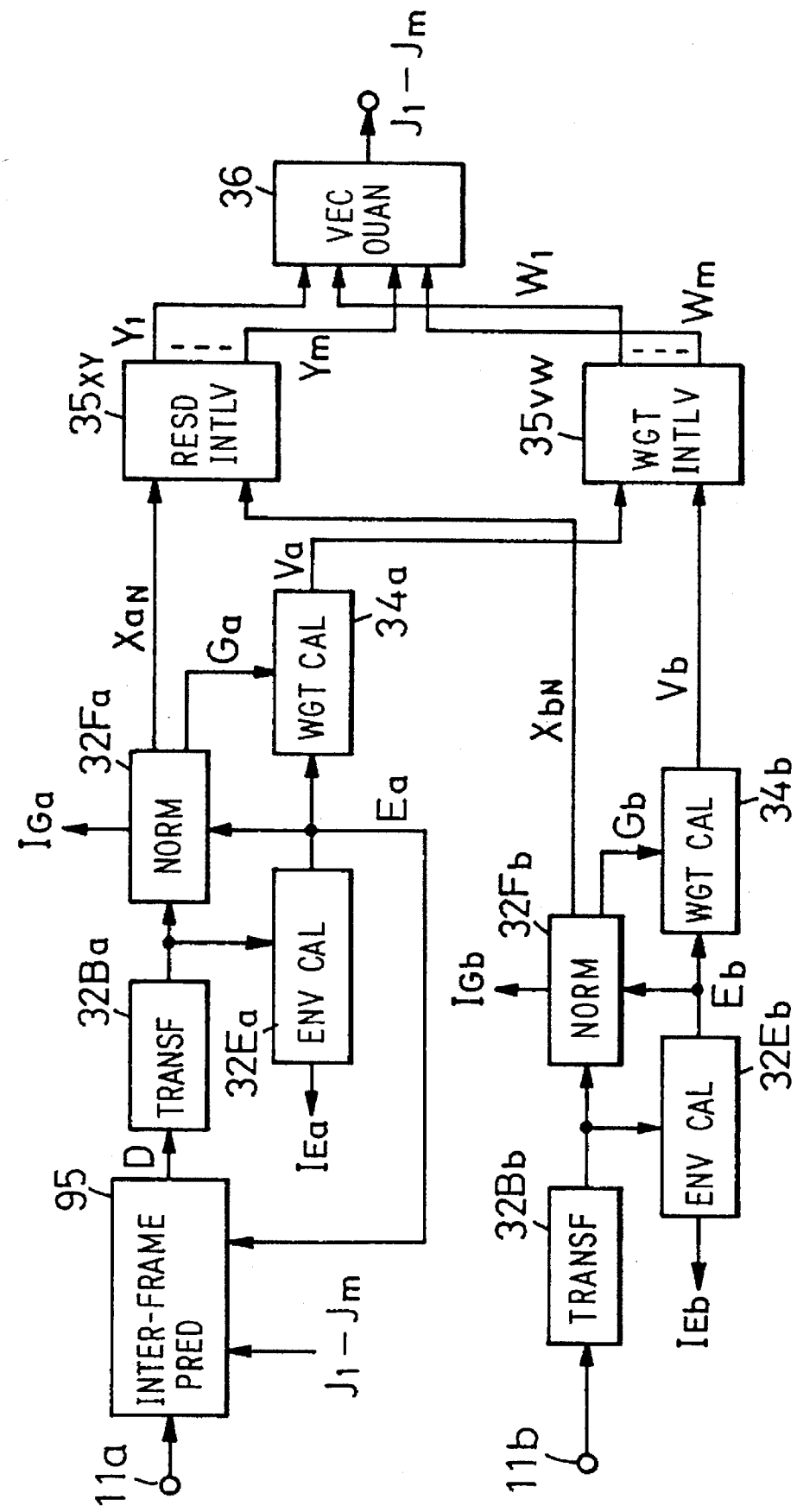
FIG. 20 is a functional block diagram illustrating the configuration of the coder of the present invention applied to multiplex coding of image and acoustic signals.

In FIG. 20, a digital image signal and a digital acoustic signal are applied to terminals 11a and 11b, respectively. The processing of the acoustic signal is carried out for each frame in common to the image signal and the processing is the same as that of one subchannel in FIG. 4A, for example; the configuration therefor is shown in a simplified form. In a transformation part 32Bb the acoustic signal is time-frequency transformed every frame. The resulting frequency domain coefficients are provided to an envelope calculation part 32Eb and a normalization part 32Fb. The envelope calculation part 32Eb uses the frequency domain coefficients to calculate the spectral envelope Eb thereof and provides it to the normalization part 32Fb and a weight calculation part 34b and outputs an index $I_{Eb}$ representing the envelope Eb. The normalization part 32Fb obtains residual coefficients by dividing respective frequency domain coefficients by the corresponding portions of the spectral envelope Eb and normalizes (divides) the residual coefficients by the average power of the frame to obtain normalized residual coefficients $X_{Nb}$, while at the same time it outputs an index $I_{Gb}$ representing the power normalization gain Gb. The weight calculation part 34b multiplies the spectral envelope Eb and the gain Gb and, if necessary, multiplies the multiplied output by a psycho-acoustic weight to obtain weighting factors Vb. The residual coefficients $X_{Nb}$ and the weighting factors Vb are provided to a residual interleave part $35_{XY}$ and a weight interleave part $35_{VW}$.

On the other hand, the image signal is applied to an interframe prediction part 95, wherein a signal predicted from the previous frame is subtracted from the image signal, and the difference signal D is applied to a transformation part 32Ba. The transformation part 32Ba time-frequency transforms the difference signal D to generate frequency domain coefficients, which are provided to an envelope calculation part 32Ea and a normalization part 32Fa. The envelope calculation part 32Ea, the normalization part 32Fa and the weight calculation part 34a are common in operation to the corresponding parts 32Eb, 32Fb and 34b for the acoustic signal. The envelope calculation part 32Ea outputs a spectral envelope Ea and an index $I_{Ea}$ representing it. The normalization part 32Fa outputs normalized residual coefficients $X_{Na}$, a power normalization gain Ga and a gain index $I_{Ga}$. The weight calculation part 34a outputs weighting factors Va. The residual coefficients $X_{Na}$ and the weighting factor Va are fed to the residual interleave part $35_{XY}$ and the weight interleave part $35_{VW}$, respectively. The residual interleave part $35_{XY}$ interleaves the components of the residual coefficients $X_{Na}$ and $X_{Nb}$ into m residual subsequences (vectors) $Y_1$ to $Y_m$, which are provided to a vector quantization part 36. The weight interleave part $35_{VW}$ interleaves the components of the weighting factors V and Vb into the same subsequences as the residual subsequences, that is, into m weight subsequences $W_1$ to $W_m$, which are provided to the quantization part 36. The vector quantization part 36 vector quantizes the residual subsequences $Y_1$ to $Y_m$ by the corresponding weight subsequences $W_1$ to $W_m$ and outputs the quantization indexes $J_1$ to $J_m$. The coder of FIG. 20 ultimately outputs, for each frame, the quantization indexes $J_1$ to $J_m$, the envelope indexes $I_{Ea}$ and $I_{Eb}$ and the gain indexes $I_{Ga}$ and $I_{Gb}$ as the results of coding of the input image signal and the input acoustic signal.

Figure 21:
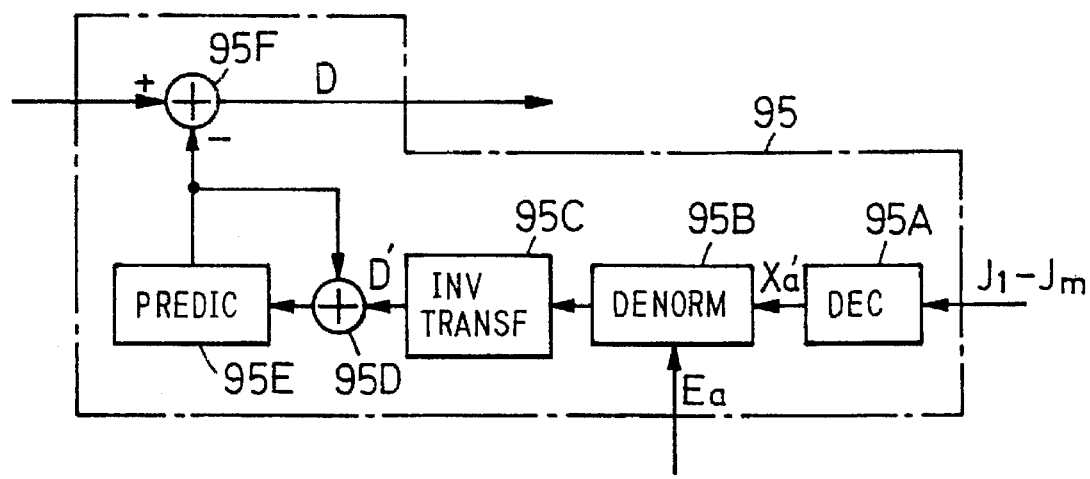
FIG. 21 is a block diagram showing an example of the configuration of an interframe prediction part 95 in FIG. 20.

FIG. 21 illustrates an example of the configuration of the interframe prediction part 95 in FIG. 20. A subtractor 95F generates the difference signal by subtracting from the input image signal of the current frame a prediction signal obtained in the previous frame in a predictor 95E. When the quantization indexes $J_1$ to $J_m$ of the current frame are provided from the vector quantization part 36, the decoding part 95A reads out of its internal codebook m vectors corresponding to the indexes $J_1$ to $J_m$ (inverse quantization) and subjects them to interleaving inverse to the residual interleaving to reproduce two residual sequences corresponding to the residual coefficients $X_{Na}$ and $X_{Nb}$. The residual sequence Xa' for the image signal are provided to a de-normalization part 95B. The de-normalization part 95B multiplies the residual sequence Xa' by the spectral envelope Ea (de-normalization) to obtain frequency domain coefficients, which are provided to an inverse transformation part 95C. The inverse transformation part 95C frequency-time transforms the frequency domain coefficients into a time domain signal (corresponding to the reproduced difference signal D'), which is applied to an adder 95D. The adder 95D adds the reproduced difference signal D' to the prediction signal used in the current frame and fed from the predictor 95E to generate an updated prediction signal, which is applied to the predictor 95E. The predictor 95E holds the updated prediction signal and provides it to the subtractor 95F as a prediction signal for the input image signal of the next frame.

Figure 22:
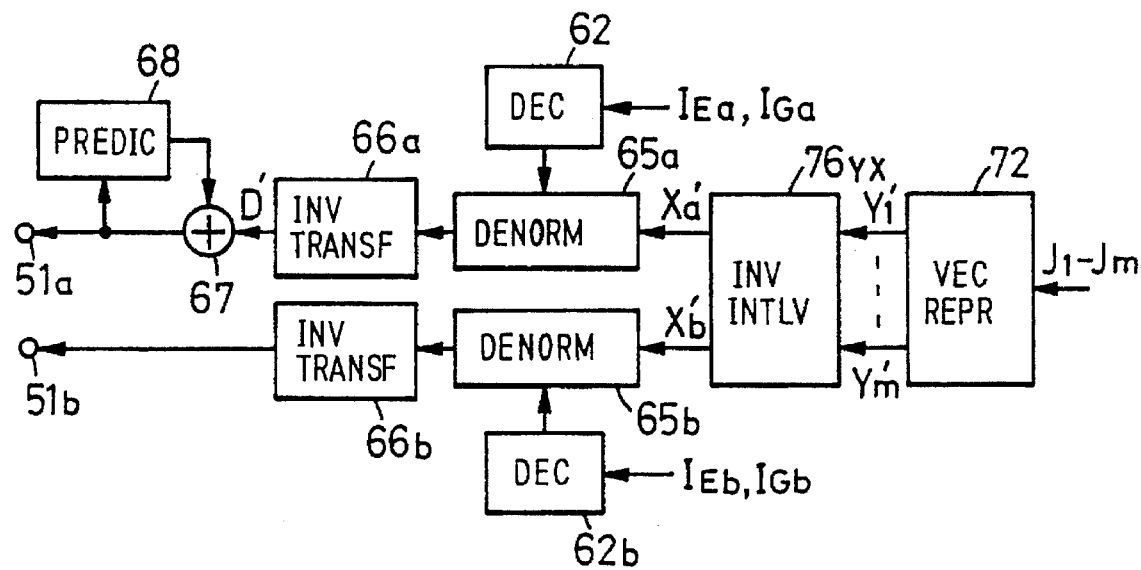
FIG. 22 is a block diagram showing the configuration of a decoder corresponding to the coder of FIG. 20.

FIG. 22 is a simplified representation of an example of a decoder for use with the coder depicted in FIG. 20. Supplied with the quantization indexes $J_1$ to $J_m$, a vector reproducing part 72 reads out m corresponding vectors $Y_1'$ to $Y_m'$ from its internal codebook and provides them to an inverse interleave part $76_{XY}$. The inverse interleave part $76_{XY}$ interleaves the components of the vectors $Y_1'$ to $Y_m'$ into sequences inverse to the residual sequences and generates the residual sequences Xa' and Xb' corresponding to the difference image signal and the acoustic signal, which are provided to de-normalization parts 65a and 65b, respectively. On the other hand, a decoding part 62a decodes the spectral envelope of the difference image signal from the spectral envelope index $I_{Ea}$ provided thereto and multiplies it by the gain Ga specified by the gain index $I_{Ga}$ to generate spectral envelope coefficients, which are provided to the de-normalization parts 65a. The de-normalization part 65a multiplies respective components of the residual coefficients Xa' by the corresponding spectral envelope coefficients of the difference image signal (de-normalization) to obtain frequency domain coefficients of the difference image signal, which are provided to an inverse transformation part 66a. The inverse transformation part 66a frequency-transforms the frequency domain coefficients to generate the difference image signal D', which is applied to an adder 67. The adder 67 adds the difference image signal D' to a decoded image signal of the previous frame held in a predictor 68 and provides the added output as a decoded image signal of the current frame to an output terminal 51a; at the same time, the added output is stored in the predictor 68 for the next frame.

Similarly, a decoding part 62b decodes the indexes $I_{Eb}$ and $I_{Gb}$ to obtain the spectral envelope coefficients of the acoustic signal and provides them to the de-normalization part 65b. The de-normalization part 65b multiples respective components of the residual coefficients Xb' by the corresponding coefficients of the spectral envelope of the acoustic signal to obtain frequency domain coefficients of the acoustic signal; which are provided to an inverse-transformation part 66b. The inverse transformation part 66b frequency-time transforms the frequency domain coefficients to decode the acoustic signal, which is fed to a terminal 51b.

As described above, according to the FIG. 20 embodiment, when power imbalance occurs between the image signal and the acoustic signal in the current frame, the weighted vector quantization is carried out—this results in the coding which attaches more importance to the signal of larger power. Hence, the quantization distortion can be reduced accordingly. Since the FIG. 20 embodiment performs interframe prediction processing for the image signal, the level of the difference image signal D is low when the image does not undergo substantial changes over a plurality of frames. Thus, the power imbalance for the acoustic signal can be increased and the quantization distortion by the coding of the image signal and the acoustic signal can be reduced accordingly.

Figure 1A:
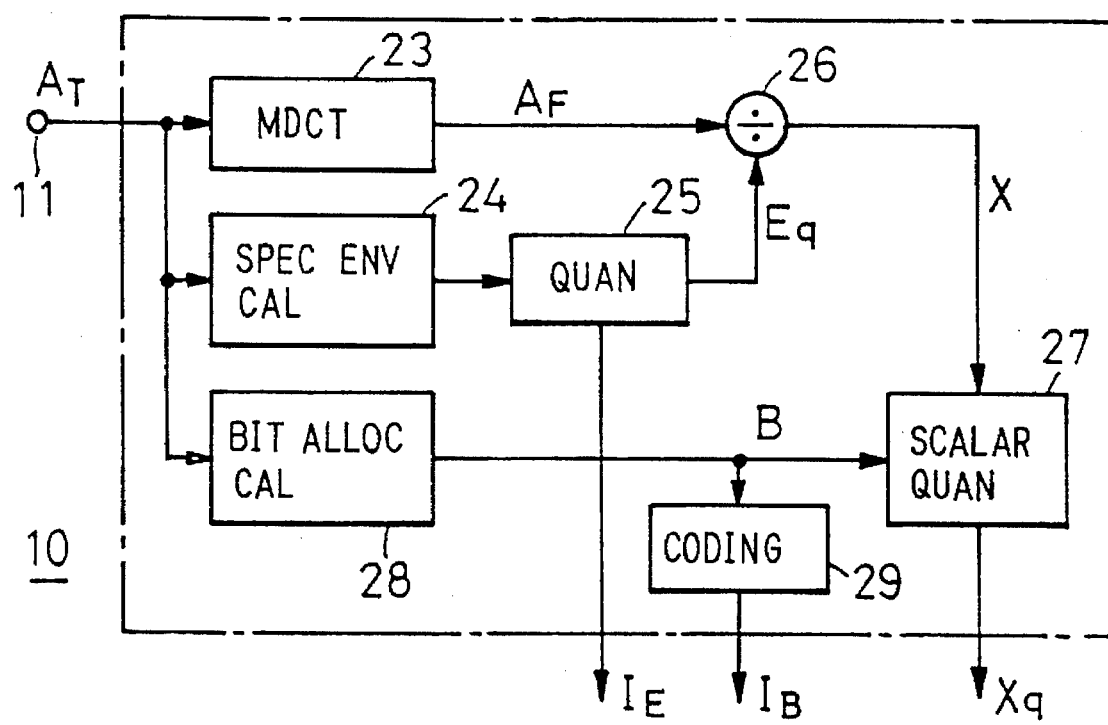
FIG. 1A is a block diagram of a coder which performs coding by a conventional adaptive bit allocation/scalar quantization scheme.
Figure 1B:
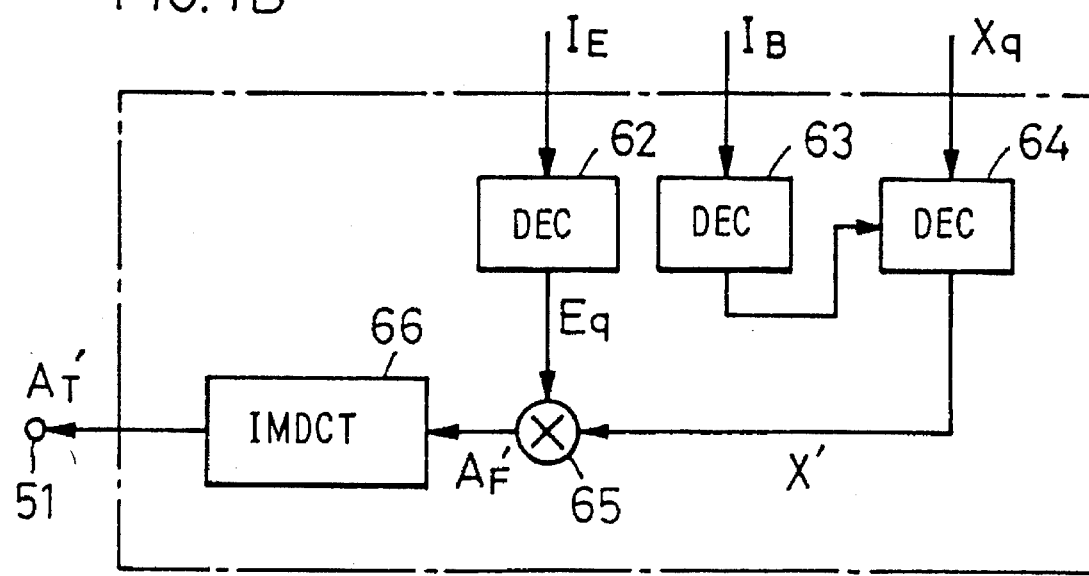
FIG. 1B is a block diagram of a decoder for use with the coder of FIG. 1A.
Figure 2A:
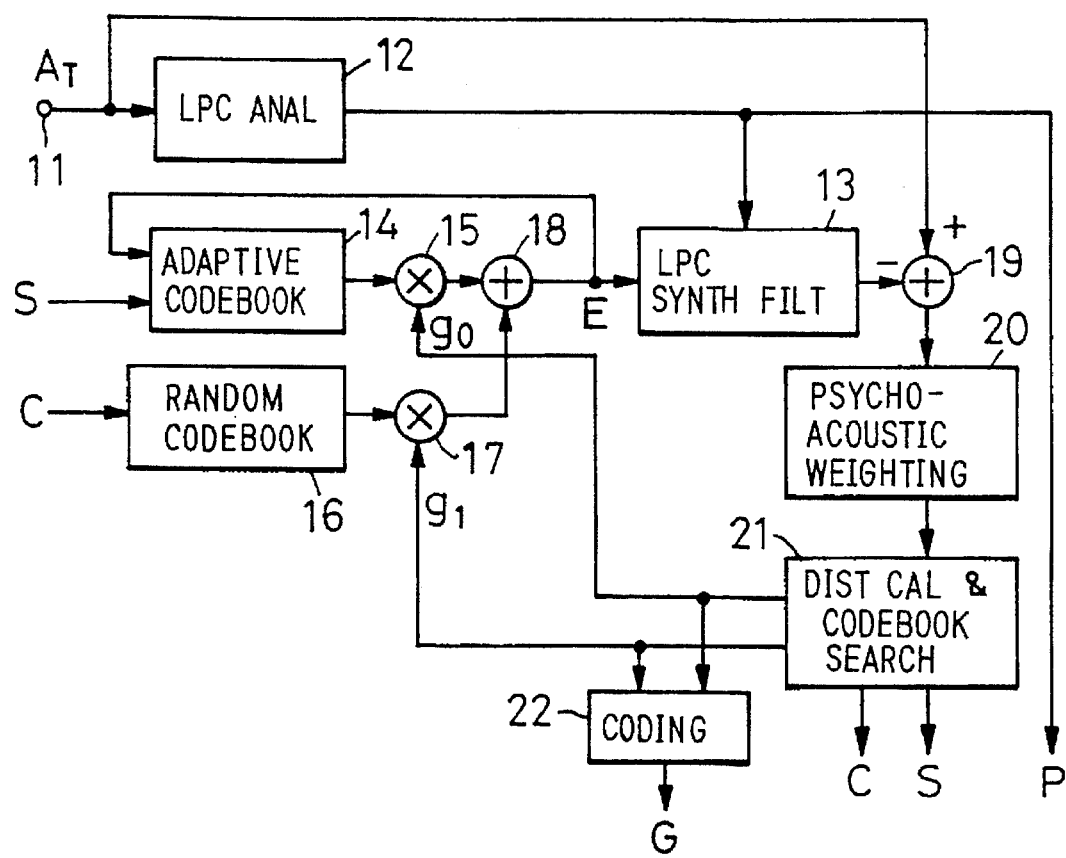
FIG. 2A is a block diagram of a coder employing the conventional CELP scheme.
Figure 23A:
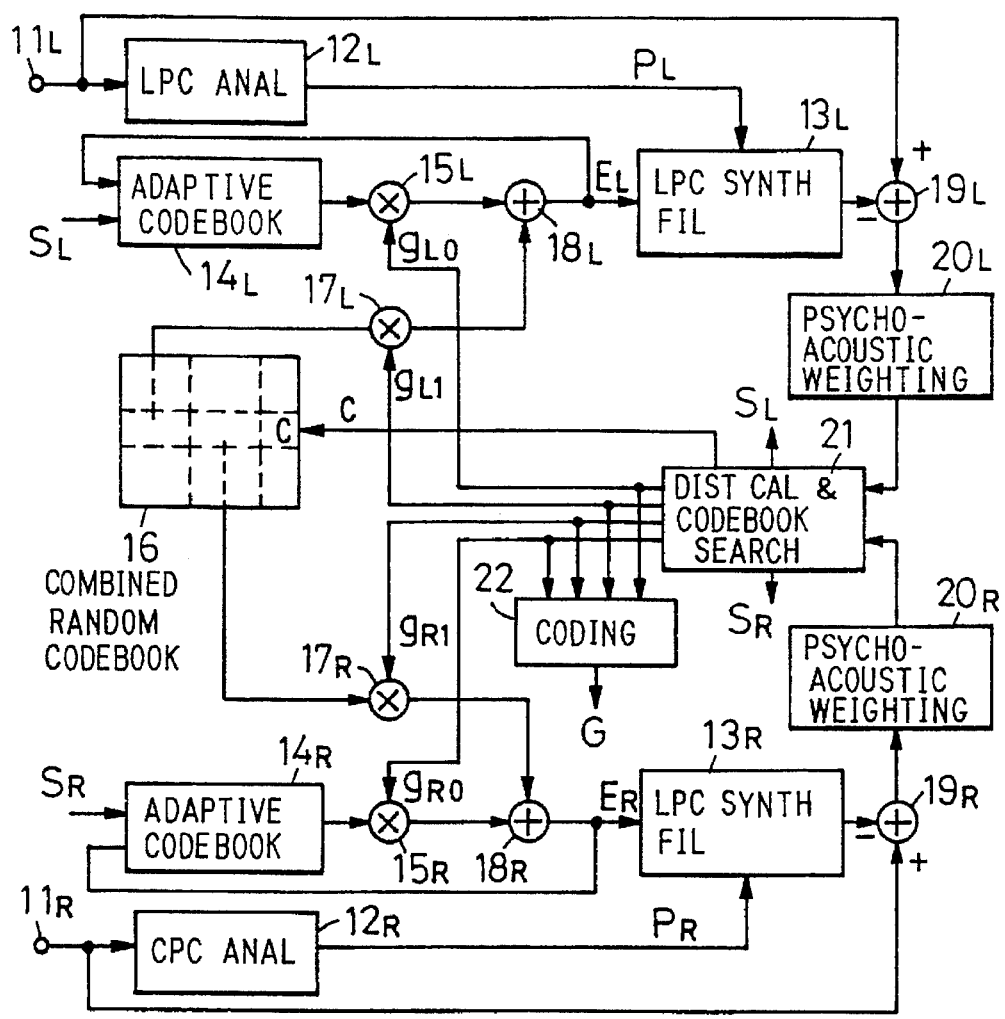
FIG. 23A is a block diagram illustrating the coder of the present invention applied to the CELP coding scheme.

FIG. 23A illustrates an embodiment of the present invention applied to a coder which codes stereo signals of right and left channels through use of the CELP scheme. In FIG. 23A the parts corresponding to those in FIG. 2A are identified by the same reference numerals added with suffixes "L" and "R" indicating the left and right channels, respectively. There are provided, in correspondence with the left- and right-channel input terminals $11_L$ and $11_R$, LPC analysis parts $12_L$ and $12_R$, LPC synthesis filters $13_L$ and $13_R$, adaptive codebooks $14_L$ and $14_R$, multipliers $15_L$ and $15_R$, adders $18_L$ and $18_R$, subtractors $19_L$ and $19_R$ and psycho-acoustic weighting parts $20_L$ and $20_R$, all of which are identical in construction with those depicted in FIG. 2A. The random codebook 16, the distortion calculation/codebook search part 21 and the weight coding part 22 are provided in common to both of the left and right channels and they operate in the same manner as described previously with reference to FIG. 2A. The input speech signals to the left- and right-channels are subjected to LPC analysis for each frame to obtain prediction coefficients $P_L$, $P_R$. This embodiment also features the configuration of the combined random codebook 16. In the combined random codebook 16, combined random code vectors each having a length equal to the frame length multiplied by the number of channels are prestored in correspondence with respective indexes C. Each combined random code vector is separated into the number of channels, and predetermined separated portions (subvectors) are used as random code vectors of the respective channels. In this embodiment there are loaded, in correspondence to respective indexes of the codebook, random code vectors each having two-frame length; the first half and the second half of the respective combined random code vectors are used as a left-channel random code vector and a right-channel random code vector, respectively. By designating one vector index C to the combined random codebook 16, a particular pair of left- and right-channel random code vectors corresponding to the specified index C are read out of the combined codebook 16 and provided to the multipliers 17$_L$ and 17$_R$.

As described previously in respect of FIG. 2A, by setting the weighting factors to $g_{L1}=g_{R1}$, cutout lengths $S_L$ and $S_R$ which minimize the distortions of synthesized sounds for the left and right input acoustic signals are determined in the distortion calculation/codebook search part 21 for each frame and period component gains $g_{LO}$ and $g_{RO}$, which minimize the respective distortions, are calculated from the adaptive code vectors (pitch component vectors) that are generated by the cutout lengths $S_L$ and $S_R$. After the cutout lengths $S_L$ and $S_R$ and the period component gains $g_{LO}$ and $g_{RO}$ are thus determined, the pitch component synthesized sounds that are outputted from the synthesis filters 13$_L$ and 13$_R$ are subtracted from the input acoustic signals in the subtractors 19$_L$ and 19$_R$, respectively. The resulting differences, which are noise component vectors, are used as the targets for noise component synthesized sounds that the synthesis filter 13$_L$ and 13$_R$ generate when using random code vectors as excitation vectors next. Letting the target noise component synthesized sounds be represented by $R_L=[R_{L1}, \ldots, R_{Ln}]^t$ and $R_R=[R_{R1}, \ldots, R_{Rn}]^t$, the impulse respond matrix of the synthesis filters 13$_L$ and 13$_R$ by $H_L$ and $H_R$ and the subvectors of the read-out combined vector corresponding to the left and right channels by $C_{Lj}=[C_{Lj}, \ldots, C_{Ljn}]^t$ and $C_{Rj}=[C_{Rj}, \ldots, C_{Rjn}]^t$, the overall or combined distortion d can be expressed by the following equation.

$$d=\|R_L-g_{L1}H_LC_{Lj}\|^2+\|R_R-g_{R1}H_RC_{Rj}\|^2$$

As described previously with respect to FIG. 2A, by temporarily setting $g_{L1}=g_{R1}=1$ for the convenience of determining the noise vector that minimizes the overall distortion, the minimum value $d_{min}$ becomes as follows:

$$d_{min}=\|R_L\|^2+\|R_R\|^2-(R_L'H_LC_{Lj})^2/\|H_LC_{Lj}\|^2-(R_R'H_RC_{Rj})^2/\|H_RC_{Rj}\|^2$$

Since the target values $R_L$ and $R_R$ are constants, the overall distortion d can be minimized by selecting from the random codebook 16 a combined vector $C_j=\{C_{Lj},C_{Rj}\}$ which maximizes the following equation:

$$D=(R_L'H_LC_{Lj})^2/\|H_LC_{Lj}\|^2+(R_R'H_RC_{Rj})^2/\|H_RC_{Rj}\|^2$$

This is followed by determining the gains $g_{L1}$ and $g_{R1}$ which minimize the distortions in the left and channels.

Since ideal gains are given by the following equations:

$$g_{L1}=R_L'H_LC_L/\|H_LC_{Lj}\|^2$$

$$g_{R1}=R_R'H_RC_R/\|H_RC_{Rj}\|^2$$

the above-mentioned value D is expressed by the following equation:

$$D=g_{Li}^2\|H_LC_{Lj}\|^2+g_{Ri}^2\|H_RC_{Rj}\|^2$$

This means that in this embodiment using the CELP scheme the optimum gains $g_{L1}$ and $g_{R1}$, which minimize the distortion, are automatically determined in the vector quantization of the excitation signal through use of the random codebook 16.

The code D, which is generated, for example, by vector coding the thus determined gains $g_{LO}, g_{RO}, g_{L1}, g_{R1}$ in the coding part 22, and the aforementioned codes $S_L, S_R, C, P_L$ and $P_R$ are outputted as the results of frame-by-frame coding of the left and right channel input acoustic signals by the coder of FIG. 23A. By the way, in the above, FIG. 23A has been explained as performing LPC analysis and coding for every frame of the input speech signal merely for simplicity of understanding, but each frame may be segmented into a plurality of subframes and those codes $S_L, S_R, C, G$ may be obtained for each subframe as practiced conventionally.

For example, when the input acoustic signals of the left and right channels are substantially equal in power, the gains $g_{LO}$ and $g_{RO}$ are nearly equal to each other and the gains $g_{L1}$ and $g_{R1}$ are also nearly equal to each other. Hence, a pair of left- and right-channel noise vectors, which are formed by the first and second halves of the combined random code vector read out of the random codebook 16, are given about the same gains and then added with the period component vectors (i.e. adaptive code vectors) to form the excitation vectors $E_L$ and $E_R$, respectively. Thus, the pair of left- and right-channel random code vectors, that correspond to the index C selected to minimize the overall distortion, contribute to its generation to substantially the same extent. This means that about the same amount information is allocated to the coding of the left- and right-channel acoustic signals.

When the power of the left-channel acoustic signal is far larger than the power of the right-channel signal, the gains $g_{LO}$ and $g_{RO}$ for the period component vectors and the gains $g_{L1}$ and $g_{R1}$ for the random code vectors, which are determined to minimize the distortions of the synthesized sounds in the respective channels, also bear such relationships as $g_{LO}>g_{RO}$ and $g_{L1}>g_{RO}$. The latter relationship indicates that the left-channel random code vector contributes to the combined distortion far greater than the right-channel random code vector in the process of selecting the combined vector from the random codebook 16 which minimizes the combined distortion. This is equivalent to the allocation of a larger amount of information to the coding of the left-channel acoustic signal of larger power. In this embodiment, however, since no consideration is given to power imbalance in the time-axis direction, the total amount of information that is used for the coding of each frame is constant. When the power of the right-channel input acoustic signal is larger than the power of the left-channel input acoustic signal, the random code vector of the right channel is regarded as more important than that of the left channel; this is equivalent to the allocation of larger amount of information to the coding of the right-channel acoustic information.

As described above, according to the embodiment of FIG. 23A, the amount of information for coding is automatically and flexibly distributed without the need of allocating bits in accordance with power imbalance between left and right channel acoustic signals. The random codebook needs not be provided in each of the left and right channels; one combined codebook needs only to be provided in common to the both channels. Even if errors are contained in the determined gains $g_{L1}$ and $g_{R1}$, the whole information will not get confused.

Figure 2B:
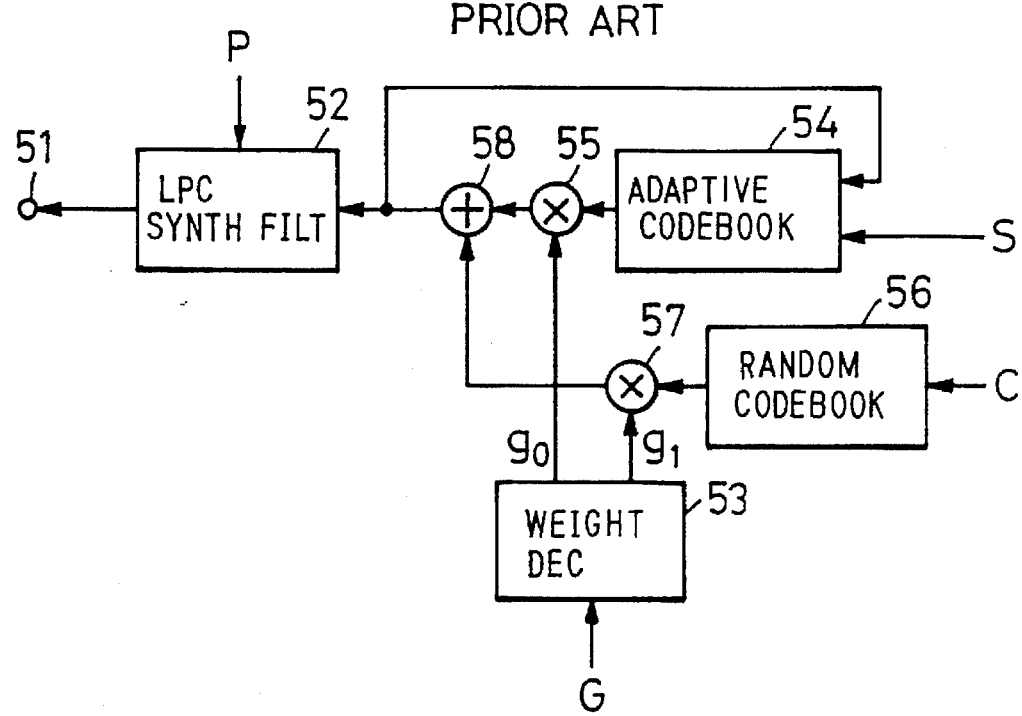
FIG. 2B is a block diagram of a decoder for use with the coder of FIG. 2A.
Figure 23B:
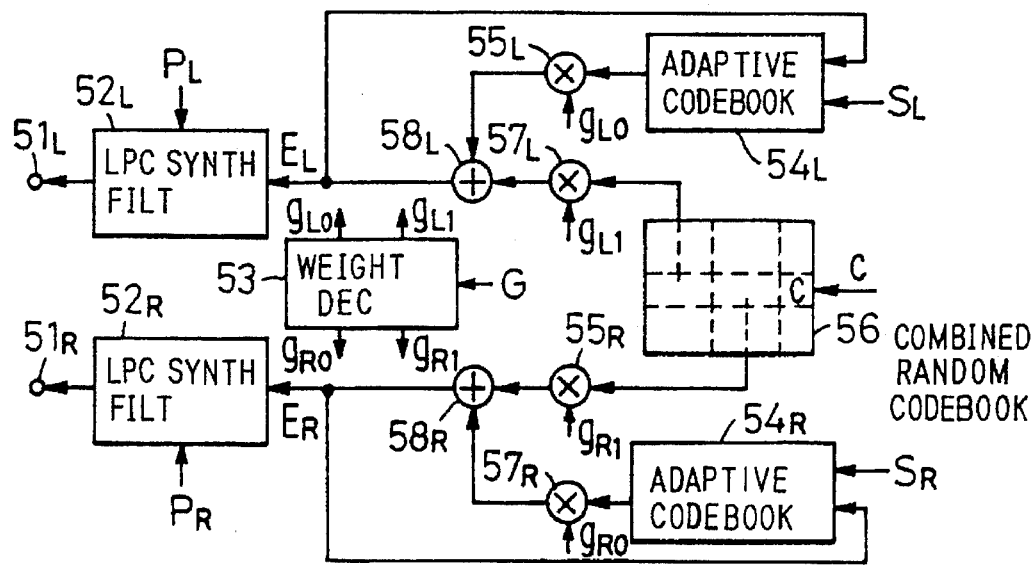
FIG. 23B is a block diagram of a decoder corresponding to the coder of FIG. 23A.

FIG. 23B illustrates an example of a decoder which decodes the left and right channel acoustic signals from the codes $S_L, P_L, P_R, G$ and C provided from the coder of FIG. 23A. The parts corresponding to those in FIG. 2B are identified by the same reference numerals added with suffixes "L" and "R" for indicating the left and right channels, respectively. In this decoder, the synthesis filter 52, the multipliers 55 and 57 and the adder 58 are provided in each of the left and right channels; the weight decoding part 53 and the combined random codebook 56 are provided in common to the both channels. The combined random codebook 56 is the same as that designated 16 in FIG. 23A. The codes $S_L$ and $S_R$ are provided to adaptive codebooks $54_L$ and $54_R$ to specify the cutout lengths of the excitation vectors of the immediately preceding frames held therein. The weight decoding part 53 decodes the gains $g_{LO}$, $g_{L1}$, $g_{RO}$, $g_{R1}$ from the code G and provides them to the multipliers $55_L$, $57_L$, $55_R$, $57_R$, respectively.

The adaptive codebooks $54_L$ and $54_R$ cut out from the excitation vectors of the preceding frame the subvectors of lengths specified by the codes $S_L$ and $S_R$ and repeatedly connect their copies to form period component vectors one frame long, which are provided to the multipliers $55_L$ and $55_R$. The multipliers $55_L$ and $55_R$ multiply these adaptive code vectors by the gains $g_{LO}$ and $g_{RO}$, respectively, and provide the multiplied outputs to the adders $58_L$ and $58_R$. The codes $P_L$ and $P_R$ representing the linear prediction coefficients are provided as filter coefficients to the LPC synthesis filters $52_L$ and $52_R$. The combined vector specified by the index code C is read out of the combined random codebook 56; the first and second halves of the vector are provided to the multipliers $57_L$ and $57_R$, respectively, wherein they are multiplied by the gains $g_{LO}$ and $g_{RO}$. The multiplied outputs are added to the adaptive code vectors by the adders $58_L$ and $58_R$ to generate the excitation vectors $E_L$ and $E_R$. These excitation vectors are provided to the LPC synthesis filters $52_L$ and $52_R$, which synthesize speech in the left and right channels and provide them to the terminals $51_L$ and $51_R$. When the degree of similarity between left and right channel signals L and R is high, signals L+R and L−R are used as input signals and the above-mentioned coding is performed with the signal power focused on the L+R version—this permits further reduction of distortion.

As referred to previously with respect to FIG. 2A, it is possible in FIG. 23A to omit the adaptive codebooks $14_L$ and $14_R$ and employ a combined codebook having excitation vectors as combined vectors, instead of using the random codebook 16. Furthermore, in FIG. 23A, the LPC analysis parts $12_L$ and $12_R$ may be designed so that they determine the prediction coefficients $P_L$ and $P_R$ by LPC analyzing the output synthesized sounds from the synthesis filters $13_L$ and $13_R$ in the previous frame. To comply with these modifications of the coder, it is also possible, in the decoder of FIG. 23B, to omit the adaptive codebooks $54_L$ and $54_R$ and use a combined codebook having many excitation vectors prestored therein in correspondence with respective indexes, instead of using the random codebook 56. Moreover, the linear prediction coefficients $P_L$ and $P_R$, which are provided to the synthesis filters $52_L$ and $52_R$, may also be produced by LPC analyzing the output synthesized sounds from the synthesis filters $52_L$ and $52_R$, instead of using the coefficients from the outside.

It will be apparent that many modifications and variations may be effected without departing from the scope of the novel concepts of the present invention.

What is claimed is:

1. A coding method for collectively coding signals of a plurality of channels, comprising the steps of:

(a) calculating the power of the signal of every predetermined block in each of said plurality of channels and determining the weight of said signal on the basis of said power;

(b) normalizing salad signal of said each block in said each channel by said power to generate a normalized signal and a normalization gain, and outputting a gain index indicating the normalization gain;

(c) combining said normalized signals of said plurality of channels into a predetermined sequence to generate at least one sequence of signal vectors;

(d) combining said weights of said plurality of channels into a sequence which is identical to that of said normalized signals to generate at least one sequence of weight vectors;

(e) vector quantizing said signal vectors by said weight vectors and outputting quantization indexes indicating the quantization vectors; and (f) outputting said quantization indexes and said gain indexes as at least part of the results of coding of said signals of said plurality of channels.

2. The coding method of claim 1, wherein said step (a) comprises the steps of:

(a-1) time-frequency transforming said signal of said block into frequency domain coefficients;

(a-2) calculating an envelope of said frequency domain coefficients;

(a-3) normalizing said frequency domain coefficients by said envelope to obtain residual coefficients and determining said weight on the basis of the power of said residual coefficients; and wherein said step (b) is a step of normalizing said residual coefficients of said block by said power to generate the normalized residual coefficients as said normalized signal.

3. The coding method of claim 2, wherein said time-frequency transformation in said step (a-1) is a modified discrete cosine transformation.

4. The coding method of claim 2, wherein said step (a-3) is a step of determining said weight on the basis of at least said power and said envelope.

5. The coding method of claim 2 or 4, wherein said step (a-3) is a step of determining said weight on the basis of a psycho-acoustic weight which is based on the human psycho-acoustic characteristic of hearing.

6. The coding method of claim 1, further comprising a step of generating signals of said plurality of channels by extracting, every fixed period, a signal having a length equal to said block from an input signal of a single channel and cyclically distributing said signal to said plurality of channels one after another.

7. The method of claim 6, wherein the length of said block in said plurality of channels is twice as long as said period, wherein said step (a) comprises (a-1) transforming said signal of said block into frequency domain coefficients by a modified discrete cosine transformation;

(a-2) calculating an envelope of said frequency domain coefficients;

(a-3) normalizing said frequency domain coefficients by said envelope to obtain residual coefficients and determining said weight on the basis of the power of said residual coefficients; and wherein said step (b) is a step of normalizing said residual coefficients of said block by said power to obtain said normalized residual coefficients as said normalized signal.

8. The coding method of claim 2 or 7, wherein said step (a-2) comprises a step of making a linear predictive coding analysis of said signal of said block to obtain prediction coefficients, quantizing said prediction coefficients and Fourier transforming said quantized prediction coefficients to obtain said envelope, and said step (f) is a step of outputting, as information corresponding to said envelope, an index indicating the quantization of said prediction coefficients as another part of the results of coding of said signal.

9. The coding method of claim 2 or 7, wherein said step (a-2) comprises a step of inverse Fourier transforming the absolute value of said frequency domain coefficients of said block into a time domain signal, making a linear predictive coding analysis of said time domain signal to obtain prediction coefficients, quantizing said prediction coefficients and Fourier transforming said quantized prediction coefficients into said envelope, and said step (f) is a step of outputting, as information corresponding to said envelope, an index indicating the quantization of said prediction coefficients as another part of the results of coding of said signal.

10. The coding method of claim 2 or 7, wherein said step (a-2) comprises the step of splitting said frequency domain coefficients into a plurality of subbands, determining the scaling factors representing the frequency domain coefficients of said plurality of subbands, and quantizing said scaling factors of said plurality of subbands to obtain the quantized scaling factors as said envelope, and said step (f) is a step of outputting, as information corresponding to said envelope, indexes indicating the quantized scaling factors as another part of the results of coding of said signal.

11. The coding method of claim 7, wherein said steps (c) and (d) are respectively a step of rearranging, for said each block, all elements of said residual coefficients from said plurality of channels in accordance with an arrangement mapping prestored in memory means to generate a predetermined number of sequences of signal vectors, and a step of rearranging all components of said weights from said plurality of channels in accordance with the same arrangement mapping prestored in said memory means to generate a predetermined number of sequences of weight vectors.

12. The coding arrangement of claim 1, wherein: plural kinds of arrangement mappings are prestored in memory means; said step (c) is a step for performing said vector quantization in said step (e) for the results of rearrangements based on said plurality of mappings and selecting that one of said mappings which minimizes quantization distortion resulting from said vector quantization; and said step (f) is a step of outputting a quantization index indicating said vector quantization which minimizes said quantization distortion and a code indicating said selected mapping as another part of the results of coding said signal.

13. The coding method of claim 1, wherein said signal of a predetermined one of said plurality of channels is an image signal.

14. The coding method of claim 13, wherein: said step (a) in said predetermined channel is a step of performing prediction processing of said signal for said each block to generate a difference signal, calculating the power of said difference signal, and determining said weight on the basis of said power; and said step (b) in said predetermined one channel is a step of normalizing said difference signal by said power into said normalization signal.

15. The coding method of claim 13 or 14, wherein said signal of another one of said plurality of channels is an acoustic signal.

16. The coding method of claim 1, further comprising the steps of:

(g) segmenting an input signal of a single channel into frames of a fixed period and making a check to determine if each of said frames is stationary or transient;

(h) if said frame is transient, segmenting said input signal of said frame into said fixed-length blocks for distribution as said signals of said plurality of channels and performing said steps (a) through (f);

(i) if said frame is stationary, calculating the power of said input signal of said frame and determining the weight of said input signal on the basis of said power;

(j) normalizing said input signal of said frame by said power to obtain a normalized signal and outputting an index indicating the normalization gain;

(k) rearranging said normalized signals of said input signals into at least one sequence of signal vectors;

(l) rearranging said weights of said input signals into at least one sequence of weight vectors corresponding to said at least one sequence of signal vectors;

(m) searching a codebook having a plurality of different quantized vectors of the same lengths as those of said signal vectors generated in said step (k) in correspondence with respective quantization indexes, selecting, for said normalized signal in said step (j), that one of said quantized vectors which corresponds to the minimum one of weighted distances by said weight vectors in said step (l), and determining the quantization index corresponding to said selected quantized vector; and (n) outputting a gain index indicating the gain of normalization by said power in said step (i) and said quantization index determined in said step (m), as part of the results of coding of said input signal in said stationary frame.

17. The coding method of claim 16, wherein said step (a) in each of said plurality of channels comprises:

(a-1) time-frequency transforming said signal of said block into frequency domain coefficients;

(a-2) calculating the spectral envelope of said signal of said block; and (a-3) normalizing said frequency domain coefficients by said spectral envelope to obtain residual coefficients and determining said weight on the basis of said power; and wherein said step (f) is a step of outputting an envelope index indicating said spectral envelope as another part of said results of coding.

18. The coding method of claim 17, wherein said step (f) for each block in said transient frame is a step of collectively quantizing at least either respective envelope indexes or said gain indexes in said plurality of channels and the corresponding quantization code as part of said results of coding.

19. The coding method of claim 16, wherein said step (i) is a step of predict-coding said input signal of said stationary frame and outputting the resulting code as part of the result of coding of said input signal of said stationary frame.

20. The method of claim 16, wherein said step (i) comprises the steps of:

(i-1) time-frequency transforming said input signal of said stationary frame into frequency domain coefficients;

(i-2) calculating the spectral envelope and average power of said input signal of said stationary frame; and (i-3) normalizing said frequency domain coefficients by said spectral envelope and said average power and outputting the resulting normalized residual coefficients as said normalized signal; and wherein said step (f) outputs a gain index indicating said average power and an envelope index indicating said spectral envelope as part of said results of coding of said input signal of said stationary frame.

21. The coding method of claim 16, wherein said step (i) comprises the steps of:

(i-1) time-frequency transforming said input signal of said stationary frame into frequency domain coefficients;

(i-2) calculating a spectral envelope of said input signal of said stationary frame;

(i-3) normalizing said frequency domain coefficients by said spectral envelope to obtain residual coefficients;

(i-4) predicting an envelope of said residual coefficients from residual coefficients of a previous stationary frame; and (i-5) normalizing said residual coefficients by said predicted envelope to generate fine structure coefficients;

wherein said step (j) is a step of calculating the average power of said fine structure coefficients, normalizing said fine structure coefficients by said average power and outputting the resulting normalized fine structure coefficients as said normalized signal; and wherein said step (f) is a step of outputting a gain index indicating said average power and an envelope index indicating said spectral envelope.

22. A decoding method for decoding signals coded by collectively vector quantizing signals of a plurality of channels through use of one combined codebook, said method comprising the steps of:

(a) reading out of a combined codebook at least one combined vector corresponding to at least one vector quantization index inputted for each fixed length block;

(b) rearranging elements of said combined vector in predetermined sequences to generate normalized signals of said plurality of channels; and (c) decoding normalization gains from gain indexes inputted every fixed-length block, and de-normalizing said normalized signals of said plurality of channels by said normalization gains respectively corresponding thereto and outputting them as reconstructed signals of said plurality of channels.

23. The decoding method of claim 22, wherein said step (c) comprises the steps of:

(d) decoding spectral envelopes from envelope indexes respectively inputted in said plurality of channels for said each block and multiplying said de-normalized signals by said spectral envelopes to obtain frequency domain coefficients; and (e) frequency-time transforming said frequency domain coefficients in each channel for said each block into a time domain signal and outputting said time domain signal as said reconstructed signal of said each channel.

24. The decoding method of claim 23, wherein said frequency-time transformation is an inverse discrete cosine transformation.

25. The method of claim 23 or 24, wherein said step (e) is a step of sequentially combining said time domain signals of said plurality of channels in a predetermined time sequence into one combined reconstructed signal.

26. The decoding method of claim 23, wherein said step (e) is a step of combining said time domain signals of said plurality of channels into a plurality of reconstructed signals smaller in number than said time domain signals.

27. The decoding method of claim 22, wherein said step (b) is a step of selecting one of a plurality of predetermined rearrangement mappings on the basis of an index inputted for said each block and indicating an arrangement mapping and performing said rearrangement in accordance with said selected mapping.

28. The decoding method of claim 22, which decodes an inputted state code to determine if the corresponding frame is stationary or transient, and if transient, performs said steps (a) through (c) for said transient frame and combines said reconstructed signals in said plurality of channels in time sequence into a signal whose length is an integral multiple of the length of said block, and if stationary, performs for said stationary frame the steps of:

(d) reading out of said combined codebook at least one combined vector corresponding to at least one vector quantization index inputted for said stationary frame;

(e) rearranging elements of said combined vector in a predetermined sequence to generate a normalized signal of a single channel; and (f) decoding a normalization gain from a gain index inputted for said stationary frame and de-normalizing said normalized signal of said single channel by said normalization gain and outputting it as a reconstructed signal.

29. The decoding method of claim 28, wherein said step (c) comprises the steps of:

(c-1) decoding spectral envelopes from spectral indexes respectively inputted in said plurality of channels and multiplying said de-normalized signals by said spectral envelopes to obtain frequency domain coefficients; and (c-2) frequency-time transforming said frequency domain coefficients in said plurality of channels into time domain signals and outputting them as said reconstructed signals of said plurality of channels.

30. The decoding method of claim 28, wherein when said frame is stationary, said step (f) comprises the steps of:

(f-1) decoding a spectral envelope from an envelope index inputted for said stationary frame and multiplying said de-normalized signal by said spectral envelope to obtain frequency domain coefficients; and (f-2) frequency-time transforming said frequency domain coefficients into a time domain signal and outputting it as said reconstructed signal.

31. The decoding method of claim 30, wherein said step (f-1) is a step of reproducing said de-normalized signal into fine structure coefficients, de-normalizing said fine structure coefficients by a residual envelope predicted from a previous frame to obtain residual coefficients and multiplying said residual coefficients by said spectral envelope to obtain said frequency domain coefficients.

32. The decoding method of claim 31, wherein said residual envelope is obtained as the envelope of residual coefficients obtained in said step (f-1) in a previous stationary frame.

33. The decoding method of claim 31, wherein said residual envelope is obtained from a spectral envelope decoded from an envelope index in one block in a previous transient frame.

34. The decoding method of claim 29, wherein when said state code indicates a transient frame, said spectral envelope in one block reproduced in said step (c-1) are used in common to all blocks in said frame in each channel.

35. The decoding method of claim 22, wherein said step (c) includes, in a predetermined one of said plurality of channels, a step of obtaining said de-normalized signal as a difference signal and adding a reconstructed signal of a previous block to said difference signal of the current block to obtain a reconstructed signal of said current block.

36. A code which collectively codes signals of a plurality of channels, comprising:

power normalization means provided in each of said plurality of channels, which calculates, for each block of a predetermined length, the power of a signal of said block, determines the weight of said signal on the basis of said power, normalizes said signal of said block by said power to generate a normalized signal, and outputs a gain index indicating the normalization gain;

signal combining means which combines said normalized signals from said power normalization means of said plurality of channels in a predetermined sequence to generate at least one sequence of signal vectors;

weight combining means which combines said weights from said power normalization means of said plurality of channels in the same sequence as that of said normalized signals to generate at least one sequence of weight vectors; and vector quantization means which vector quantizes said signal vectors by said weight vectors and outputs quantization indexes indicating the quantized vectors;

wherein said quantization indexes and said gain indexes are output as part of the results of coding of said signals of said plurality of channels.

37. The coder of claim 36, which further comprises: residual envelope calculation means which obtains frequency domain coefficients by time-frequency transforming said signal of said block in each of said plurality of channels, calculates the envelope of said frequency domain coefficients and normalizes said frequency domain coefficients by said envelope to obtain residual coefficients; and weight calculation means which determines said weight of said signal of said block on the basis of the power of said residual coefficients; and wherein said power normalization means is means which normalizes said residual coefficients of said block by said power to obtain the resulting normalized residual coefficients as said normalized signal.

38. The coder of claim 37, wherein said time-frequency transformation by said residual envelope calculation means is a modified discrete cosine transformation.

39. The coder of claim 37, wherein said residual envelope calculation means in said each channel comprises: linear predictive coding analysis means which makes a linear predictive coding analysis of said signal of said block to obtain prediction coefficients; coefficient quantization means which quantizes said prediction coefficients and outputs an index indicating the quantization; and an envelope calculation means which calculates said envelope by Fourier transforming said quantized prediction coefficients; wherein said index indicating the quantization of said prediction coefficients is outputted as information corresponding to said envelope, as part of said coding results.

40. The coder of claim 37, wherein said residual envelope calculation means in said each channel comprises: absolute value means which calculates the absolute value of said frequency domain coefficients of said block; inverse Fourier transform means which transforms said absolute value to a time domain signal by an inverse Fourier transformation; linear predictive coding analysis means which makes a linear predictive coding analysis of said time domain signal to obtain prediction coefficients; coefficient quantization means which quantizes said prediction coefficients and outputs an index indicating said quantized prediction coefficients; and envelope calculation means which Fourier transforms said quantized prediction coefficients to obtain said envelope; wherein an index indicating the quantization of said prediction coefficients is outputted as information corresponding to said envelope, as part of said coding results.

41. The coder of claim 37, wherein said residual envelope calculating means in said each channel comprises: scaling factor calculation means which splits said frequency domain coefficients into a plurality of subbands and determines a scaling factor representing the frequency domain coefficients of each of said plurality of subbands; and scaling factor quantization means which quantizes said scaling factor of said each subband; wherein an index indicating said quantized scaling factor is outputted as information corresponding to said envelope, as part of said coding results.

42. The coder of claim 36, which further comprises:
memory means having prestored therein a plurality of different arrangement mappings;

a plurality of sets of said signal combining means, said weight combining means and said vector quantization means, provided in correspondence with said plurality of different arrangement mappings;

comparison means which is supplied with quantization distortions resulting from vector quantization of said normalized signals from said power normalization means of said plurality of channels by said plurality of sets of means, compares said quantization distortions and outputs a code indicating an arrangement mapping corresponding to that one said plurality of sets of means which provided the minimum quantization distortion; and select means which responds to said code from said comparison means to selectively output the corresponding one of quantization indexes from said plurality of sets of means; and said corresponding quantization index and a code indicating said selected arrangement mapping are outputted as part of said coding results.

43. The coder of claim 36, which further comprises prediction means provided in a predetermined one of said plurality of channels, which performs prediction processing of said signal of said block in said predetermined channel to generate a difference signal, and wherein said power normalization means is means which calculates the power of said difference signal, determines said weight of said signal and normalizes said difference signal by said power into said normalized signal.

44. The coder of claim 36, which further comprises:
state decision means which decides whether each fixed-period frame of an input signal of a single channel is stationary or transient;

frame segmentation means which, when said frame is transient, segments said input signal of said frame into said fixed-length blocks for distribution as said signals of said plurality of channels;

stationary frame power normalization means which calculates the power of said input signal of said steady-state frame, determines the weight of said input signal of said frame on the basis of said power, normalizes said input signal of said stationary frame in said single channel by said power to obtain a stationary frame normalized signal, and outputs a stationary frame gain index indicating the normalization gain;

stationary frame signal combining means which rearranges said stationary frame normalized signal of said input signal of said stationary frame to generate at least one sequence of stationary frame signal vectors;

stationary frame weight combining means which rearranges said weight of said input signal of said stationary frame in the same sequence as that of said normalized signal of said input signal to generate at least one sequence of stationary frame weight vectors; and stationary frame vector quantization means which has a stationary frame codebook having prestored therein a plurality of different quantized vectors of the same length as said stationary frame signal vectors in correspondence with respective indexes, searches said codebooks, selects, for said stationary frame normalized signal, that one of said quantized vectors which corresponds to the minimum one of weighted distances by said stationary frame weight vectors, and determines the quantization index corresponding to said selected quantized vector;

wherein said stationary frame gain index and said stationary frame quantization index are outputted as part of the results of said input signal in said stationary frame.

45. The coder of claim 44, which further comprises:

stationary frame residual envelope calculation means which time-frequency transforms said input signal of said stationary frame into frequency domain coefficients, calculates the spectral envelope of said input signal of said stationary frame, normalizes said frequency domain coefficients by said spectral envelope into residual coefficients;

residual envelope prediction means which predicts the envelope of said residual coefficients from residual coefficients of a previous frame;

residual envelope normalization means which normalized said residual coefficients by said predicted envelope into fine structure coefficients; and stationary frame power normalization means which calculates the average power of said fine structure coefficients, normalizes said fine structure coefficients by said average power into normalized fine structure coefficients and outputs them as said stationary frame normalized signal;

wherein a stationary frame gain index indicating said average power of said fine structure coefficients and an envelope index indicating said stationary frame spectral envelope are outputted as part of said coding results.

46. A decoder for decoding signals coded by collectively vector quantizing signals of a plurality of channels through use of one combined codebook, comprising:

a combined codebook which has prestored therein combined vectors in correspondence with respective quantization indexes and from which is read out at least one of said combined vectors corresponding to at least one quantization index inputted for each block of a fixed length;

inverse arrangement means which rearranges components of said at least one combined vector in predetermined sequences to form normalized signals of a plurality of channels; and de-normalization means which decodes normalization gains from gain indexes inputted for each block of fixed length and de-normalizes said normalized signals of said plurality of channels by said normalization gains and outputs them as reconstructed signals of said plurality of channels.

47. The decoder of claim 46, further comprising:

frequency domain coefficient reproducing means provided in each of said plurality of channels, which decodes a spectral envelope from an envelope index inputted in said each block and multiplies said de-normalized signal by said spectral envelope to obtain frequency domain coefficients; and frequency-time transformation means provided in each of said plurality of channels, which frequency-time transforms said frequency domain coefficients of said each channel into a time domain signal for each said block and outputs it as said reconstructed signal of said each channels.

48. The decoder of claim 46 or 47, further comprising frame combining means which combines said time domain signals of said plurality of channels in time sequence to form at least one combined reproduced signal.

49. The decoder of claim 46, which further comprises memory means having prestored a plurality of different arrangement mappings and wherein said inverse arrangement means selects one of said plurality of arrangement mappings in said memory means on the basis of an index inputted for said each block and indicating an arrangement mapping and performs said rearrangement in accordance with said selected mapping.

50. The decoder of claim 46, further comprising:

frame combining means which decodes an inputted state code to determine if the corresponding frame is stationary or transient and which, when said frame is transient, performs the signal reconstruction by said de-normalization means of said plurality of channels and combines reconstructed signals obtained in said plurality of channels in said each block in time sequence to form a signal of a frame length which is an integral multiple of said each block;

a stationary frame combined codebook which has prestored therein combined vectors for stationary frame in correspondence with stationary frame indexes;

stationary frame rearrangement means whereby components of at least one combined vector read out of said combined codebook in correspondence with at least one input quantization index are rearranged into a normalized signal of a single channel; and stationary frame de-normalization means which de-normalizes said normalized signal of said single channel by a normalization gain decoded from a gain index inputted for said stationary frame.

51. The decoder of claim 50, further comprising:

multiplier means provided in each of said plurality of channels, which multiplies said de-normalized signal by a spectral envelope decoded from an inputted envelope index; and frequency-time transformation means provided in each of said plurality of channels, which frequency-time transforms said frequency domain coefficients into a time domain signal and outputs it as said reconstructed signal.

52. The decoder of claim 50, further comprising:

residual coefficient reproducing means which obtains frequency domain coefficients from said de-normalized signal by use of a spectral envelope decoded from an envelope index inputted in said stationary frame; and frequency-time transformation means which frequency-time transforms said frequency domain coefficients into a time domain signal and outputs it as said reconstructed signal.

53. The decoder of claim 52, wherein said de-normalized signal from said stationary frame rearrangement in said stationary frame is fine structure coefficients and said residual coefficient reproducing means comprises:

residual envelope prediction means which predicts a residual envelope from residual coefficients of a previous frame;

residual envelope de-normalization means which de-normalizes said fine structure coefficients by said predicted residual envelope to obtain the residual coefficients of the current frame; and multiplier means which multiplies said residual coefficients by said spectral envelope to obtain said frequency domain coefficients.

54. The decoder of claim 46, wherein said de-normalized signal in a predetermined one of said plurality of channels is a difference signal and which further comprises interframe prediction means which adds a reconstructed signal of a previous block said difference signal of the current block to obtain a reconstructed signal of the current block.

* * * * *